United States Patent [19]

Koyama

[11] Patent Number: 5,293,569
[45] Date of Patent: Mar. 8, 1994

[54] MAGNETO-OPTICAL RECORDING/REPRODUCING APPARATUS INCLUDING AN OPTICAL HEAD WITH AN OPTICAL ELEMENT HAVING A PLURALITY OF PRISMS

[75] Inventor: Osamu Koyama, Kawasaki, Japan

[73] Assignee: Canon Kabushiki Kaisha, Tokyo, Japan

[21] Appl. No.: 758,685

[22] Filed: Sep. 12, 1991

[30] Foreign Application Priority Data

Sep. 13, 1990 [JP] Japan .................................. 2-245716
Sep. 13, 1990 [JP] Japan .................................. 2-245717
Sep. 13, 1990 [JP] Japan .................................. 2-245718

[51] Int. Cl.$^5$ .............................................. G11B 7/00
[52] U.S. Cl. ...................................... 369/112; 369/13; 369/44.23; 369/110
[58] Field of Search .............. 369/112, 109, 110, 118, 369/111, 44.37, 44.38, 121, 44.23, 44.24, 44.12, 44.11, 13; 359/40

[56] References Cited

U.S. PATENT DOCUMENTS

| | | | |
|---|---|---|---|
| 4,464,741 | 8/1984 | Compaan | 369/112 |
| 4,644,516 | 2/1987 | Musha | 369/112 |
| 4,689,780 | 8/1987 | Ohara et al. | 369/112 |
| 4,730,899 | 3/1988 | Kime et al. | 369/112 |
| 4,803,579 | 2/1989 | Koyama | 360/114 |
| 4,813,032 | 3/1989 | Koyama | 369/13 |
| 4,953,124 | 8/1990 | Koyama | 365/122 |
| 5,029,261 | 7/1991 | Koyama et al. | 250/201.5 |
| 5,073,888 | 12/1991 | Takahashi | 369/110 |
| 5,113,387 | 5/1992 | Goldsmith et al. | 369/112 |

FOREIGN PATENT DOCUMENTS

| | | |
|---|---|---|
| 51-107121 | 9/1976 | Japan . |
| 64-82348 | 3/1989 | Japan . |
| 3-102647 | 4/1991 | Japan .................. 369/112 |
| 3-104033 | 5/1991 | Japan .................. 369/112 |
| 3-116557 | 5/1991 | Japan .................. 369/112 |

OTHER PUBLICATIONS

Patent Abstracts of Japan, Kokai No. 63-149842, vol. 12, No. 413, Nov. 1988.
Patent Abstracts of Japan, Kokai No. 01-138632, vol. 13, No. 391, Aug. 1989.

*Primary Examiner*—Aristotelis Psitos
*Assistant Examiner*—Nabil Hindi
*Attorney, Agent, or Firm*—Fitzpatrick, Cella, Harper & Scinto

[57] ABSTRACT

An optical head for a magneto-optical recording/ reproducing apparatus includes a semiconductor laser, an object lens for condensing a light beam from the laser onto a magneto-optical recording medium, an optical element disposed in an optical path from the laser to the lens, the optical element including three substantially right-angled prisms, and light detectors. The emitted light beam enters a first end face of a first substantially right-angled prism made of a uniaxial crystal of the optical element. Part of the light beam is reflected by a second end face of the first prism to exit from a third end face for separation into first and second light beams. These light beams are focused by the object lens as first and second light spots on the recording medium. Reflected light beams from the recording medium enter the first prism from the third end face thereof, partially pass through the second end face thereof to enter a second substantially right-angled prism made of a uniaxial crystal, emit from a second end face of the second prism, enter a third substantially right-angled prism from a first end face thereof which is joined to the second end face of the second prism, and then exit from the third prism almost perpendicularly to separate the first and second reflected light beams into first and second emergent light beams and third and fourth emergent light beams. The light detectors detect these emergent beams from the third prism. The optical head allocates the quantity of light from the semiconductor laser to the two spots.

58 Claims, 24 Drawing Sheets

FIG. 6
(1)
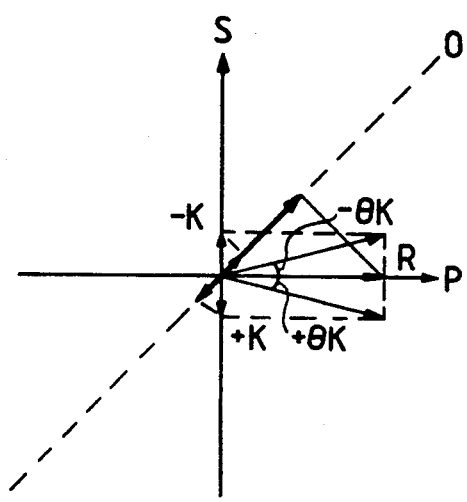
(2)
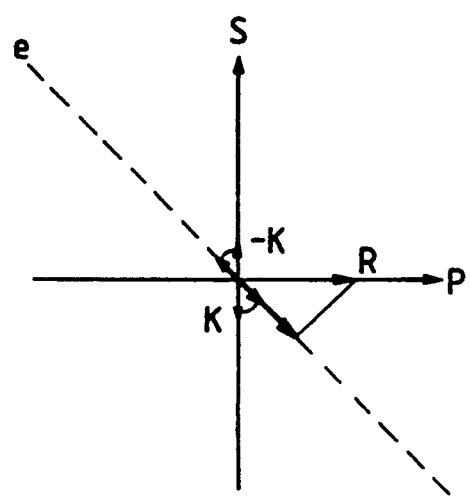
(3)
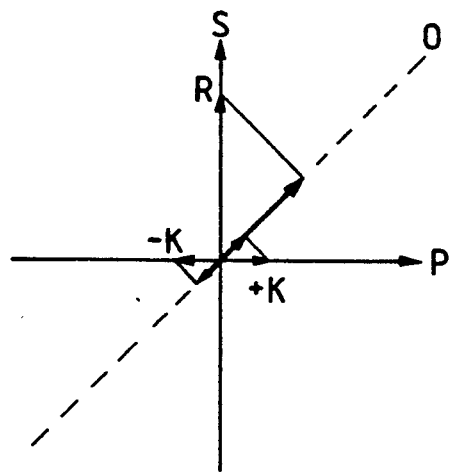
(4)
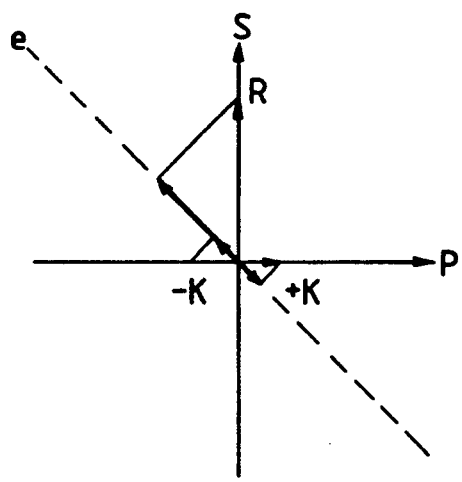

FIG. 24
FIG. 25
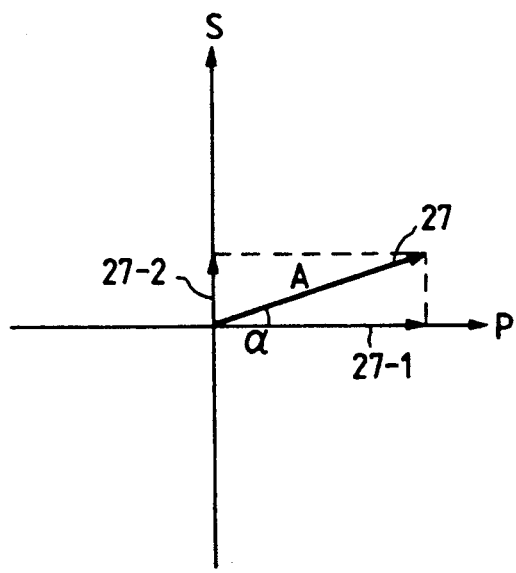
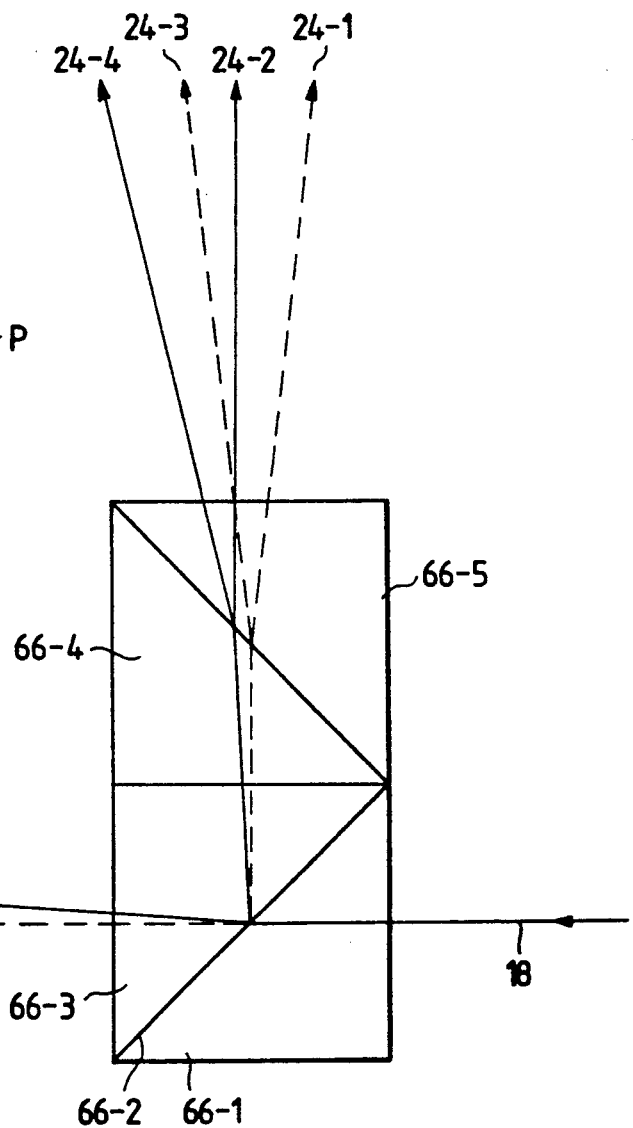

FIG. 26
(1)
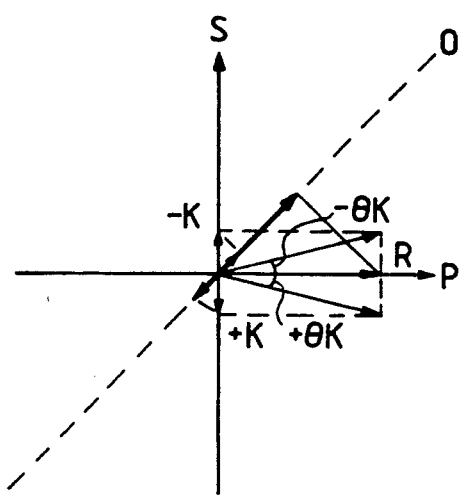
(2)
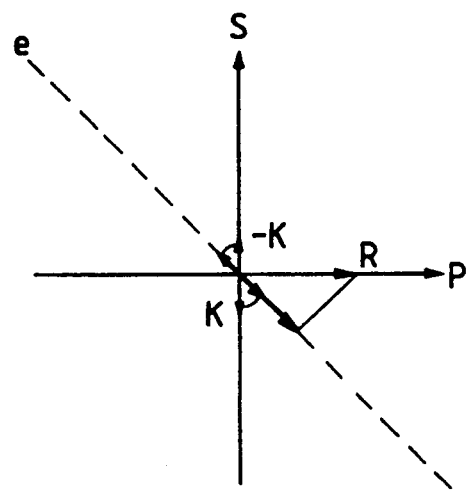
(3)
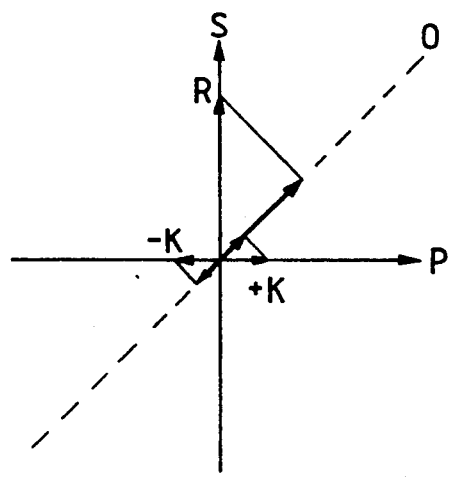
(4)
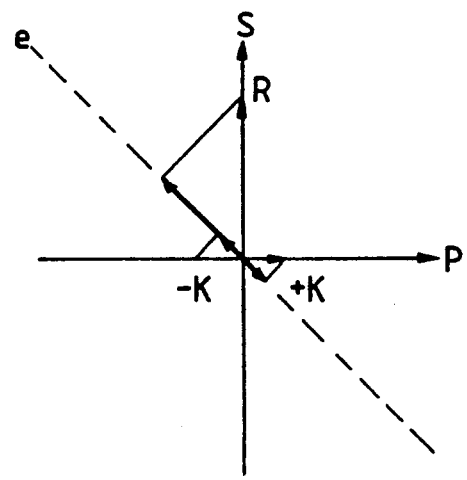

MAGNETO-OPTICAL RECORDING/REPRODUCING APPARATUS INCLUDING AN OPTICAL HEAD WITH AN OPTICAL ELEMENT HAVING A PLURALITY OF PRISMS

BACKGROUND OF THE INVENTION

1. Field of the Invention

The present invention relates to a magneto-optical recording/reproducing apparatus, and more particularly to an optical head for a magneto-optical recording/reproducing apparatus in which an overwrite and a verification immediately after recording can be performed simultaneously by a single laser beam source.

2. Related Background Art

As disclosed in Japanese Patent Laid-Open No. 51-107121, there has been proposed an overwritable magneto-optical disk which adopts a system to modulate a magnetic field applied to a magneto-optical recording medium in accordance with information to be recorded. Also, Japanese Patent Laid-Open No. 64-82348, by way of example, proposes an optical disk apparatus that, in addition to the above system, a plurality of beams for recording and verification are arranged over a track to permit all steps of erasing —recording—reproducing while a disk is making a turn, with an aim of improving data processing speed for magneto-optical disks.

The prior art will now be described with reference to FIGS. 1 and 2 In FIG. 1, denoted by 1 is a magneto-optical disk as a rotating recording carrier which has, on a disk-like transparent substrate 103, a magneto-optical recording medium (film) 101 having a magneto-optical effect and a protective film 102. Light emitted from a light source comprising a semiconductor laser 2, for example, is converted by a collimator lens 3 into a parallel beam and then by a beam shaping optical system 4 into a beam having a circular distribution of the light intensity. Subsequently, the light is separated by a diffraction grating 5 into a plurality of beams (i.e., three beams of 0th and ±1st orders) which enter a condensing lens 7 through a beam splitter 6. The light beams condensed by the lens 7 impinge upon the disk 1 from the side of the disk substrate 103 to form small spots of about 1 μm diameter on the recording film 101. The condensing lens 7 is attached to an actuator 8 so that the focal point is always on the recording film following vertical deflections of the disk 1 and the spots are always on a desired track following eccentric offset of information recording tracks on the disk. The reflected light from the disk 1 passes through the condensing lens 7 and is reflected by the beam splitter 6 to be led to a signal detection optical system 9 for detecting a magneto-optical signal and optical spot control signals in relation to a focus deviation, a track deviation, etc.

FIG. 2 shows respective light spots on the recording film and the intensity of those light spots during periods of recording and reproduction. The following description will be made in connection with the case where three light spots are formed by the diffraction grating. A central spot $SP_2$ corresponds to the diffracted light of 0th order, while $SP_1$ and $SP_3$ correspond to the diffracted light of ±1st order. Taking a disk rotating direction as shown, the light spots $SP_3$, $SP_2$, $SP_1$ pass over some point on the disk in this order. Accordingly, it is possible to assign $SP_2$ to a recording/erasing spot and $SP_1$ to a reproduction spot for error check. The light intensity ratio of one spot to the other is set such that, during the period of recording, the reproduction spot has reproduction power and the recording/erasing spot has recording power. This setting can be optionally determined by changing the structure of the diffraction grating 5. When the reproduction power is 1 mW and the recording power is 7 mW, for example, it is only required for the light intensity ratio to be 1:7.

FIG. 2 also shows a radiation power of the laser beam source during the periods of reproduction and recording. During the reproduction period, the laser 2 is operated to emit a beam at low power $P_1$. At this time, $SP_2$ has the reproduction power to (a) reproduce a magneto-optical signal, (b) reproduce a signal of address information or the like in the case of disks that such information is previously formed in the form of rugged pits, (c) detect a focus deviation signal, and (d) detect a track deviation signal. $SP_1$ is not used here because of low power.

Next, during the recording period, the laser 2 is operated to emit a beam at high power $P_w$. At this time, $SP_2$ serves as a light spot for recording/ erasing, i.e., overwrite. Upon irradiation of the laser beam at high power, the temperature of the recording film 101 is raised to lower a degree of magnetization and coercive force. On this occasion, when a magnetic field with its polarity inverted depending on the information to be recorded is applied by a magnetic head 10, the recording film 101 is fixedly magnetized, while being cooled, in the direction of the magnetic field applied. Since the previous information is erased upon a rise in the temperature of the recording film 101, it is possible to simultaneously erase old information and record new information, i.e., to perform an overwrite. During the recording period, $SP_2$ also detects both the focus deviation signal and the track deviation signal. On the other hand, $SP_1$ now has the reproduction power and thus serves to reproduce the magneto-optical signal for error check immediately after recording.

The signal detection optical system 9 will be next explained. In the illustrated prior art, the detection optical system comprising a $\lambda/2$ plate 901 and a polarizing beam splitter 903. The focus deviation signal is detected using a lens 902 and light detectors 904, 905 arranged at respective positions spaced forwardly and rearwardly of the focus point by the same distance, to thereby obtain the focus deviation signal from changes in size of the light spots on the light detectors. Further, the track deviation signal is detected by the so-called push-pull technique.

In the above prior art, however, because of using the diffraction grating 5 to create the recording/ erasing (overwrite) spot $SP_2$ and the reproduction (verification) spot $SP_1$ for error check, there has produced the spot $SP_3$ which is not necessary for the specific purpose. Thus, the quantity of light emitted from the semiconductor laser 2 has been wasted in an amount assigned to the spot $SP_3$, thereby requiring a semiconductor laser of higher output power and a collimator lens 3 of higher N.A. to compensate for the wasted light amount.

Moreover, an angle adjustment for placing the plural spots from the diffraction grating 5 on the same track has been time consuming and hence costly.

Due to manufacture errors in the diffraction grating 5, it has been also difficult to keep constant a light amount ratio of the overwrite spot $SP_2$ to the verification spot $SP_1$ and a spacing between those two spots on the track.

In addition, detecting the magneto-optical signal has required complex and expensive optical parts such as the $\lambda/2$ plate 901 and the polarizing beam splitter 903.

SUMMARY OF THE INVENTION

In view of the foregoing problems in the prior art, an object of the present invention is to provide an inexpensive and compact optical system for detecting a magneto-optical signal, which can allocate the quantity of light from a semiconductor laser to the overwrite spot $SP_2$ and the verification spot $SP_1$ in predetermined amounts precisely without any waste, and which is simple in aligning two spots on a track.

According to one aspect of the present invention, the problems in the prior art are solved by providing an optical system arranged such that:

(1) a light beam emitted from a single semiconductor laser beam source enters a first end face of a first substantially right-angled prism made of a uniaxial crystal and part of the light beam is reflected by a second end face of the first substantially right-angled prism to exit from a third end face thereof almost perpendicular to the first end face for separation into first and second light beams having their polarized directions orthogonal to each other, the uniaxial crystal of the first substantially right-angled prism having an optical axis almost coincident with a propagating direction of the reflected light beam from the second end face, the light beam emitted from the semiconductor laser beam source having its polarized direction inclined at a predetermined angle from the optical axis of the uniaxial crystal;

(2) the first and second light beams exiting from the first substantially right-angled prism are focused by an object lens, as small first and second light spots spaced in a track moving direction, on the same track of a magneto-optical recording medium;

(3) first and second reflected light beams from the magneto-optical recording medium enter the first substantially right-angled prism from the third end face thereof, partially pass through the second end face thereof to enter a second substantially right-angled prism made of a uniaxial crystal from a first end face thereof which is joined to the second end face of the first substantially right-angled prism, emit from a second end face of the second substantially right-angled prism almost perpendicular to the first end face thereof, enter a third substantially right-angled prism made of glass from a first end face thereof which is joined to the second end face of the second substantially right-angled prism, and then exit from a second end face of the third substantially right-angled prism almost perpendicularly, so that the two reflected light beams are each separated into two emergent light beams having their polarized directions orthogonal to each other, i.e., so that the first reflected light beam is separated into first and second emergent light beams and the second reflected light beam is separated into third and fourth emergent light beams; and (4) the second substantially right-angled prism has an optical axis inclined 45° with respect to the polarized directions of the first and second light beams exiting from the third end face of the first substantially right-angled prism.

According to another aspect of the present invention, the problems in the prior art are solved by providing an optical system arranged such that:

(5) a light beam emitted from a single semiconductor laser beam source enters a first end face of a first substantially right-angled prism made of a uniaxial crystal and part of the light beam is reflected by a second end face of the first substantially right-angled prism to exit from a third end face thereof almost perpendicular to the first end face for separation into first and second light beams having their polarized directions orthogonal to each other, the uniaxial crystal of the first substantially right-angled prism having an optical axis almost coincident with a propagating direction of the reflected light beam from the second end face, the light beam emitted from the semiconductor laser beam source having its polarized direction inclined at a predetermined angle from the optical axis of the uniaxial crystal;

(6) the first and second light beams exiting from the first substantially right-angled prism are focused by an object lens, as small first and second light spots spaced in a track moving direction, on the same track of a magneto-optical recording medium;

(7) first and second reflected light beams from the magneto-optical recording medium enter the first substantially right-angled prism from the third end face thereof, partially pass through the second end face thereof to enter a second substantially right-angled prism made of a uniaxial crystal from a first end face thereof which is joined to the second end face of the first substantially right-angled prism, emit from a second end face of the second substantially right-angled prism almost perpendicular to the first end face thereof, enter a third substantially right-angled prism made of a uniaxial crystal from a first end face thereof which is joined to the second end face of the second substantially right-angled prism, and then exit from a second end face of the third substantially right-angled prism almost perpendicularly, so that the two reflected light beams are each separated into two emergent light beams having their polarized directions orthogonal to each other, i.e., so that the first reflected light beam is separated into first and second emergent light beams and the second reflected light beam is separated into third and fourth emergent light beams; and (8) the second substantially right-angled prism has an optical axis inclined 45° with respect to the polarized directions of the first and second light beam exiting from the third end face of the first substantially right-angled prism, the third substantially right-angled prism having an optical axis orthogonal to the optical axis of the second substantially right-angled prism.

According to still another aspect of the present invention, the problems in the prior art are solved by providing an optical system arranged such that:

(9) a light beam emitted from a single semiconductor laser beam source enters a first end face of a first prism made of a uniaxial crystal, partially passes through a second end face of the first prism, enters a second substantially right-angled prism made of glass from a first end face thereof which is joined to the second end face of the first prism, and then exits from the second end face of the second substantially right-angled prism for separation into first and second light beams having their polarized directions orthogonal to each other;

(10) the first prism made of the uniaxial crystal has an optical axis lying in a plane perpendicular to a propagating direction of the light beam emitted from the semiconductor laser beam source, the light beam emitted from the semiconductor laser beam source having its polarized direction inclined at a predetermined angle from the optical axis of the uniaxial crystal;

(11) the first and second light beams exiting from the second substantially right-angled prism made of glass are focused by an object lens, as small first and second light spots spaced in a track moving direction, on the same track of a magneto-optical recording medium, the first and second light spots having their polarized directions almost parallel or perpendicular to the track;

(12) first and second reflected light beams from the magneto-optical recording medium enter the second substantially right-angled prism made of glass from the second end face thereof, are partially reflected by the first end face thereof, and then exit from a third end face thereof;

(13) first and second reflected light beams exiting from the third end face of the second substantially right-angled prism made of glass enter a composite member consisting of third and fourth substantially right-angled prisms both made of a uniaxial crystal and joined to each other, so that the two reflected light beams are each separated into two emergent light beams having their polarized directions orthogonal to each other, i.e., so that the first reflected light beam is separated into first and second emergent light beams and the second reflected light beam is separated into third and fourth emergent light beams; and

(14) the third substantially right-angled prism made of the uniaxial crystal has an optical axis inclined 45° with respect to the polarized directions of the first and second reflected light beams exiting from the third end face of the second substantially right-angled prism made of glass, the fourth substantially right-angled prism made of the uniaxial crystal having an optical axis orthogonal to the optical axis of the third substantially right-angled prism.

BRIEF DESCRIPTION OF THE DRAWINGS

FIGS. 6(1) to 6(4) are diagrams for explaining a manner of detecting a magneto-optical signal in the optical system of the present invention.

FIG. 24 is a diagram for explaining the polarized direction of a semiconductor laser in the optical system of the present invention shown in FIG. 23.

FIG. 25 is a diagram for explaining how a light beam is separated in the optical system of the present invention shown in FIG. 23.

FIGS. 26(1) to (4) are diagrams for explaining a manner of detecting a magneto-optical signal in the optical system of the present invention shown in FIG. 23.

DESCRIPTION OF THE PREFERRED EMBODIMENTS

An optical system for a magneto-optical recording-/reproducing apparatus of the present invention will be described with reference to FIGS. 3 to 7.

Figure 3:
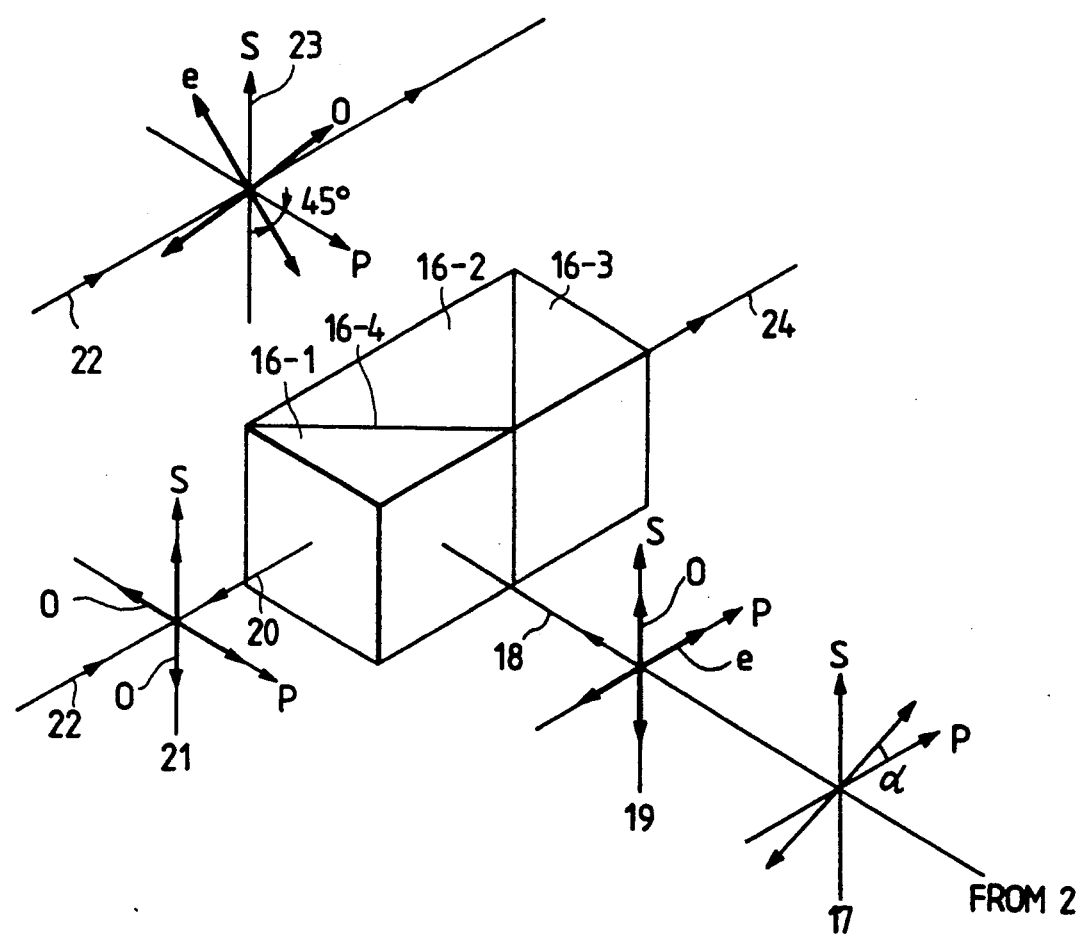
FIG. 3 is a diagram for explaining an arrangement of an optical system for a magneto-optical recording/reproducing apparatus of the present invention.
Figure 4:
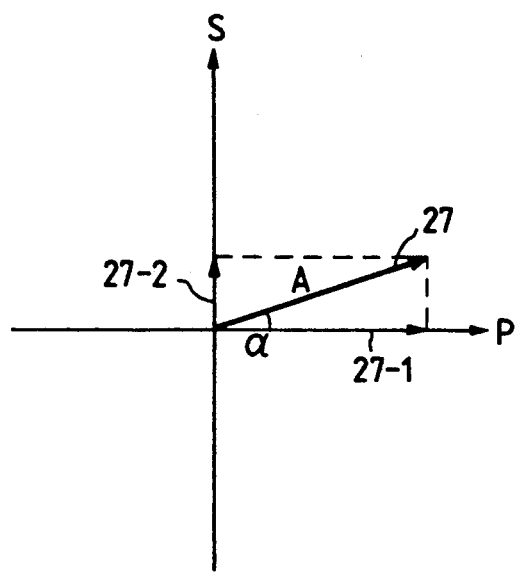
FIG. 4 is a diagram for explaining the polarized direction of a semiconductor laser in the optical system of the present invention.

As shown in FIG. 3, the optical system of the present invention comprises a composite member 16 consisting of two uniaxial crystal right-angled prisms 16-1, 16-2 and a glass right-angled prism 16-3 joined together. A half mirror 16-4 is evaporated on the joined surface between prisms 16-1 and 16-2. A light beam 18 from a semiconductor laser 2 (not shown) enters the uniaxial crystal right-angled prism 16-1. Assuming that a P-polarized direction and an S-polarized direction for the joined surface between prisms 16-1 and 16-2 are defined as shown in a coordinate system 17, the light beam 18 has its polarized direction inclined $\alpha°$ from the P-axis. The optical axis (refractive index $n_e$ for extraordinary rays) of the uniaxial crystal 16-1 is in a direction of the P-axis, for example, and will be referred to as an e-axis. Likewise, the S-axis direction exhibits a refractive index $n_o$ for ordinary rays and will be referred to as an o-axis. The light beam 18 (with an amplitude A) incident upon 16-1 is thought of as having two amplitude components 27-1 and 27-2, as shown in FIG. 4:

$$\text{direction of e-axis: } A\cos\alpha \quad (1)$$

$$\text{direction of o-axis: } A\sin\alpha \quad (2)$$

The amplitude component 27-1 in the direction of the e-axis is subjected to an action of the refractive index $n_e$ for extraordinary rays and the amplitude component 27-2 in the direction of the o-axis is subjected to an action of the refractive index $n_o$ for ordinary rays, so that the incident beam advances through the crystal while being converted into elliptically polarized light.

A light beam 20 reflected by the half mirror 16-4 is subjected to an action of the refractive index $n_o$ for ordinary rays in both the directions of the P- and S-axes as shown in a coordinate system 21. Of the light beam 18, therefore, the beam subjected to an action of the refractive index for extraordinary rays has an emergent angle $\theta_{11}$ below from the Snell's law, given an incident angle upon the half mirror 16-4 being $\theta_o$:

$$n_o \sin\theta_{11} = n_e \sin\theta_o \quad (3)$$

$$\theta_{11} = \sin^{-1}\left(\frac{n_e \sin\theta_o}{n_o}\right)$$

Also, an emergent angle $\theta_{12}$ of the beam subjected to an action of the refractive index for ordinary rays is given by:

$$n_o \sin\theta_{12} = n_o \sin\theta_o \quad (4)$$

$$\theta_{12} = \theta_o$$

Figure 5:
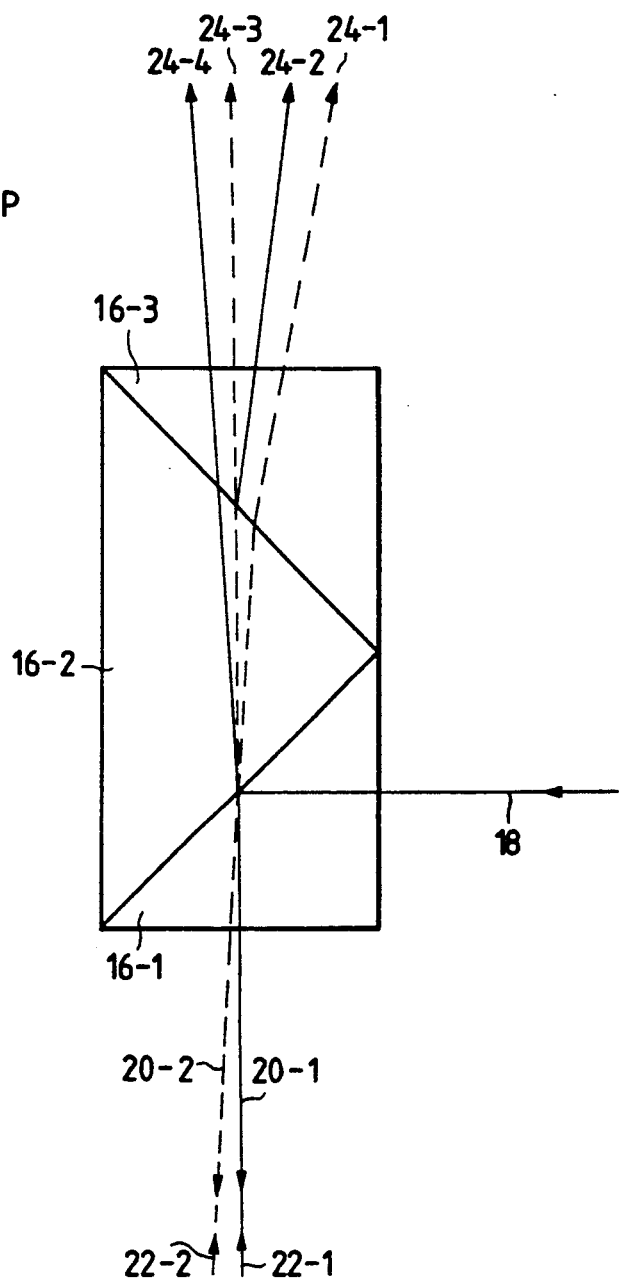
FIG. 5 is a diagram for explaining how a light beam is separated in the optical system of the present invention.

It is thus found that the above two beams are separated into two polarized lights orthogonal to each other. This behavior is shown in FIG. 5. Specifically, of the light beam 18, the beam subjected to the action of the refractive index for extraordinary rays is reflected as a P-polarized light 20-2 at the emergent angle of $\theta_{11} \neq \theta_o$, whereas the beam subjected to the action of the refractive index for ordinary rays is reflected as an S-polarized light 20-1 at the emergent angle of $\theta_{12} \neq \theta_o$.

In the embodiment of FIG. 3, assuming that quartz is selected as the uniaxial crystal, the refractive index $n_e$ for extraordinary rays and the refractive index $n_o$ for ordinary rays are respectively 1.54749 and 1.53859 at the semiconductor laser's wavelength of $\lambda=790$ nm, and the incident angle $\theta_o$ is 45°, for example, the emergent angles are given by:

$$\theta_{11} = 45.3324°$$

$$\theta_{12} = \theta_o = 45°$$

A resulting separation angle of the two beams in air becomes about 0.51°. In this way, the separation angle is determined by the refractive indexes for extraordinary rays and ordinary rays, with the result that its variations due to manufacture errors and other causes are very small. Angle $\theta_o$ can be freely selected to be any angle near 45°. For example, it may be selected such that both the overwrite beam and the verification beam have their angles of view almost equal to each other with respect to an object lens (not shown) for condensing light spots on a magneto-optical disk as a magneto-optical recording medium. Moreover, the emergent end face of 16-1 may be inclined on the order of 1° to 2° so that the light beams returning from the beam exit surface of 16-1 will not enter light detectors (not shown).

The light amount ratio of the reflected light beams 20-1 to 20-2 can be selected by changing $\alpha$. The light amount ratio of the overwrite spot to the verification spot is expressed below from above Equations (1) and (2):

$$\frac{1}{\tan^2\alpha} \quad (5)$$

The light amount ratio is determined depending on the accuracy of $\alpha$ and thus can be adjusted simply and precisely. When the light amount ratio of 7 is desired, by way of example, it is required to set $\alpha = 20.7°$. In this case, the overwrite spot is P-polarized light and the verification spot is S-polarized light. Of course, by selecting o at an angle near 90°, the above relationship can be reversed such that the overwrite spot is S-polarized light and the verification spot is P-polarized light.

Although 16-4 is explained as a half mirror for the sake of brevity, the present invention is not limited to the half mirror. Assuming that reflectivity for the amplitude of the P-polarized light is $\gamma_p$ and reflectivity for the amplitude of the S-polarized light is $Y_s$, above Equations (1) and (2) are rewritten to:

$$\text{direction of e-axis: } A\gamma_p\cos\alpha \quad (1')$$

$$\text{direction of o-axis: } A\gamma_s\sin\alpha \quad (2')$$

From these Equations (1') and (2'), the light amount ratio is given by:

$$\frac{\gamma_p^2}{\gamma_s^2 \tan^2\alpha} \quad (5')$$

Accordingly, the light amount ratio can be freely selected by changing the reflectivity $\gamma_p$ for the amplitude of the P-polarized light, the reflectivity $\gamma_s$ for the amplitude of the S-polarized light, and the inclination $\alpha$ with respect to the optical axis of the incident light beam 18. Element 16-4 may be either a non-polarizing beam splitter ($\gamma_p^2 \neq = s^2$) or a polarizing beam splitter ($\gamma_p^2 \neq \gamma_s^2$). Further, in the embodiment of FIG. 3, with $\gamma_p^2$ set to a relatively large value, the light beam from the semiconductor laser can be utilized effectively during a period of overwrite.

As explained above, by making the incident light beam enter the uniaxial crystal right-angled prism 16-1 with the polarization plane thereof inclined at a predetermined angle from the optical axis, and introducing the light beam reflected by the half mirror again into the crystal, the overwrite spot and the verification spot can be separated from each other at a desired light amount ratio.

The following is a description about detection of a magneto-optical signal by the optical system of the present invention. It is supposed that, in FIGS. 3 and 5, light beams reflected by the magneto-optical disk (not shown) are 22-1 and 22-2. More specifically, 22-2 is an overwrite beam which is used to reproduce the magneto-optical signal during a period of normal data reading. Beam 22-1 is a verification beam which is used to reproduce the magneto-optical signal immediately after recording in the overwrite period: The uniaxial crystal right-angled prism 16-2 is set such that, as shown in a coordinate system 23, its optical axis (e-axis) is inclined 45° from the P-axis in a plane perpendicular to the light beam 22.

Detection of the magneto-optical signal for each of the two beams will be explained below by referring to FIG. 6. For the sake of brevity, it is supposed that the light amount of the verification beam 22-1 during the overwrite period is equal to the light amount of the overwrite beam 22-2 during the normal reproduction period, amplitude reflectivity for the components of both the beams 22-1 and 22-2 in the polarized directions of the incident beams upon the magneto-optical disk (S-polarization for the verification beam and P-polarization for the overwrite beam) is R, and amplitude reflectivity of the components produced by a Kerr effect in the polarized directions perpendicular to the above ones is K. Given a Kerr's rotation angle being $\pm\theta_k$, the following equation holds:

$$\frac{\pm K}{R} = \tan(\pm\theta_k) \tag{6}$$

The overwrite beam 22-2 will now be explained using (1) and (2) in FIG. 6. The light beam 22-2 enters the uniaxial crystal right-angled prism 16-1 and its P-and S-polarized components are both subjected to the action of the refractive index $n_o$ for ordinary rays. Then, the light beam passes through the half mirror 16-4 and enters the uniaxial crystal right-angled prism 16-2. As shown in FIG. 6(1), an amplitude component $u_o^+$ projected to the o-axis is expressed below when the Kerr's rotation angle is $+\theta_k$;

$$u_o^+ = \frac{1}{\sqrt{2}}(R - K) \tag{7}$$

and is expressed below when the Kerr's rotation angle is $-\theta_k$:

$$u_o^- = \frac{1}{\sqrt{2}}(R + K) \tag{8}$$

The amplitude component $u_o^\pm$ projected to the o-axis behaves following the Snell's law below on assumptions, that the incident angle upon the half mirror 16-4 is $\theta_{11}$ and the emergent angle therefrom is $\theta_{21}$;

$$n_o\sin\theta_{11} = n_o\sin\theta_{21} \tag{9}$$
$$\theta_{21} = \theta_{11}$$

and thus advances straightforward without being refracted.

Also, as shown in FIG. 6(2), an amplitude component $u_e$ projected to the e-axis is expressed below when the Kerr's rotation angle is $\pm\theta_k$ (Equation holds for each corresponding one of double signs);

$$u_e^\pm = \frac{1}{\sqrt{2}}(R \pm K) \tag{10}$$

The amplitude component $u_e^\pm$ projected to the e-axis behaves following the Snell's law below and Equation (3) on assumptions that the incident angle upon the half mirror 16-4 is $\theta_{11}$ the emergent angle therefrom is $\theta_{22}$;

$$n_o\sin\theta_{11} = n_e\sin\theta_{22} \tag{11}$$

$$\theta_{22} = \sin^{-1}\left(\frac{n_o\sin\theta_{11}}{n_e}\right)$$
$$= \theta_o$$

and thus separates from $u_o^\pm$ by being refracted.

Next, the verification beam 22-1 will be explained using (3) and (4) in FIG. 6. The light beam 22-1 enters the uniaxial crystal right-angled prism 16-1 and its P- and S-polarized components are both subjected to the action of the refractive index no for ordinary rays. Then, the light beam passes through the half mirror 16-4 and enters the uniaxial crystal right-angled prism 16-2. As shown in FIG. 6(3), an amplitude component $u_o^\pm$ projected to the o-axis is expressed below when the Kerr's rotation angle is $\pm\theta_k$ (Equation holds for each corresponding one of double signs);

$$u_o^{\pm\prime} = \frac{1}{\sqrt{2}}(R \pm K) \tag{12}$$

The amplitude component $u_o^{\pm\prime}$ projected to the o-axis behaves following the Snell's law below on assumptions that the incident angle upon the half mirror 16-4 is $\theta_o$ and the emergent angle therefrom is $\theta_{23}$;

$$n_o\sin\theta_0 = n_o\sin\theta_{23} \tag{13}$$
$$\theta_{23} = \theta_o$$

and thus advances straightforward without being refracted.

Also, as shown in FIG. 6(4), an amplitude component $u_e^{\pm\prime}$ projected to the e-axis is expressed below when the Kerr's rotation angle is $+\theta_k$ (Equation holds for each corresponding one of double signs);

$$u_e^{\pm'} = \frac{1}{\sqrt{2}} (R \mp K) \quad (13')$$

The amplitude component $u_e^{\pm'}$ projected to the e-axis behaves following the Snell's law below on assumptions that the incident angle upon the half mirror 16-4 is $\theta_o$ the emergent angle therefrom is $\theta_{24}$;

$$n_o \sin\theta_o = n_e \sin\theta_{24} \quad (14)$$

$$\theta_{24} = \sin^{-1}\left(\frac{n_o \sin\theta_o}{n_e}\right)$$

and thus separates from $u_o^{\pm'}$ by being refracted.

To put it in short, the two light beams are separated through the uniaxial crystal right-angled prism 16-2 into three beams given by the component $u_o^{\pm}$ of the overwrite beam projected to the o-axis, the component $u_e^{\pm}$ of the overwrite beam projected to the e-axis and the component $u_o^{\pm'}$ of the verification beam projected to the o-axis ($\theta_{22} = \theta_{23}$), and the component $u_e^{\pm'}$ of the verification beam projected to the e-axis (see FIG. 5).

There will be further explained refraction of the beams at the joined surface between the uniaxial crystal right-angled prism 16-2 and the glass prism 16-3. A component $u_o^{\pm}$ of the overwrite beam projected to the o-axis behaves following the Snell's law below on assumptions that the refractive index of glass is $n_g$, the incident angle upon the above joined surface and the emergent angle therefrom is $\theta_{41}$, and then exits as a beam 24-1 from 16-3:

$$\theta_{31} = 90° - \theta_{21} = 90° - \theta_{11} \quad (15)$$
$$n_o \sin\theta_{31} = n_g \sin\theta_{41}$$

$$\theta_{41} = \sin^{-1}\left(\frac{n_o \sin\theta_{31}}{n_g}\right) = \sin^{-1}\left(\frac{n_o \cos\theta_{11}}{n_g}\right)$$

A component $u_e^{\pm}$ of the overwrite beam projected on the e-axis behaves following the Snell's law below on assumptions that the incident angle upon the above joined surface is $\theta_{32}$ and the emergent angle therefrom is $\theta_{42}$, and then exits as a beam 24-3 from 16-3:

$$\theta_{32} = 90° - \theta_{22} = 90° - \theta_o \quad (16)$$
$$n_e \sin\theta_{32} = n_g \sin\theta_{42}$$

$$\theta_{42} = \sin^{-1}\left(\frac{n_e \sin\theta_{32}}{n_g}\right) = \sin^{-1}\left(\frac{n_e \cos\theta_o}{n_g}\right)$$

A component $u_o^{\pm'}$ of the verification beam projected to the o-axis behaves following the Snell's law below on assumptions that the incident angle upon the above joined surface is $\theta_{33}$ and the emergent angle therefrom is $\theta_{43}$, and then exits as a beam 24-2 from 16-3:

$$\theta_{33} = 90° - \theta_{23} = 90° - \theta_o \quad (17)$$
$$n_o \sin\theta_{33} = n_g \sin\theta_{43}$$

$$\theta_{43} = \sin^{-1}\left(\frac{n_o \sin\theta_{33}}{n_g}\right) = \sin^{-1}\left(\frac{n_o \cos\theta_o}{n_g}\right)$$

Further, a component $u_e^{\pm'}$ of the verification beam projected to the e-axis behaves following the Snell's law below on assumptions that the incident angle upon the above joined surface is $\theta_{34}$ and the emergent angle therefrom is $\theta_{44}$, and then exits as a beam 24-4 from 16-3:

$$\theta_{34} = 90° - \theta_{24} \quad (18)$$
$$n_e \sin\theta_{34} = n_g \sin\theta_{44}$$

$$\theta_{44} = \sin^{-1}\left(\frac{n_e \sin\theta_{34}}{n_g}\right) = \sin^{-1}\left(\frac{n_e \cos\theta_{24}}{n_g}\right)$$

As will be apparent from Equations (15) to (18), the four beams 24-1 to 24-4 are exited from 16-3.

In the embodiment of FIG. 3, assuming that quartz is selected as the uniaxial crystals 16-1 and 16-2, the refractive index $n_e$ for extraordinary rays and the refractive index $n_o$ for ordinary rays are respectively 1.54749 and 1.53859 at the semiconductor laser's wavelength of $\lambda = 790$ nm, $\theta_o$ is 45°, $\theta_{11}$ is 45.3324°, and vitreous material (e.g., BaFl) having a refractive index almost equal to $n_e$ is selected as the glass 16-3, for example, the emergent angles are given by:

$\theta_{41} = 44.343°$ $\theta_{42} = 45.000°$ $\theta_{43} = 44.671°$ $\theta_{44} = 45.329°$ A resulting separation angle of every two beams becomes 0.33° in the glass 16-3 and 0.51° in air.

In this way, the overwrite beam and the verification beam can be each separated into two beams, making it possible to detect the magneto-optical signal for each beam.

In calculating the intensities of the four beams, as regards to the overwrite beam, the intensities $I_1^{\pm}$, $I_3^{\pm}$ of the components (beams (24-1 and 24-3) respectively projected to the o-axis and the e-axis are expressed by;

$$I_1^{\pm} = \{u_o^{\pm}\}^2 = \tfrac{1}{2}(R \mp K)^2 \approx \tfrac{1}{2}(R^2) \mp RK \quad (19)$$

$$I_3^{\pm} = \{u_e^{\pm}\}^2 = \tfrac{1}{2}(R + K)^2 \approx \tfrac{1}{2}(R^2) \quad (20)$$

where $R^2 >> K^2$ is assumed; the magneto-optical signal is obtained by differentially amplifying those two components.

Likewise, as regards to the verification beam, the intensities $I_2^{\pm}$, $I_4^{\pm}$, of the components (beams 24'and 24-4) respectively projected to the o-axis and the e-axis are expressed by;

$$I_2^{\pm} = \{u_o^{\pm'}\}^2 = \tfrac{1}{2}(R \mp k)^2 \approx \tfrac{1}{2}(R^2) \pm RK \quad (21)$$

$$I_4^{\pm} = \{u_e^{\pm'}\}^2 = \tfrac{1}{2}(R \mp K)^2 \approx \tfrac{1}{2}(R^2) \mp RK \quad (22)$$

where $R^2 >> K^2$ is assumed; the magneto-optical signal is obtained by differentially amplifying those two components.

Note that although the uniaxial crystal prism 16-2 is handled as a right-angled prism in the foregoing explanation of FIG. 3 for simplicity of calculations, the present invention is not limited to use of the right-angled prism.

As described above, a single light beam is separated by the uniaxial crystal prism 16-1 into the overwrite beam and the verification beam which are polarized in directions orthogonal to each other and have a predetermined light amount ratio, followed by entering the magneto-optical disk such that the two beams are condensed as an overwrite spot and a verification spot on the disk. The respective beams reflected by the disk are passed through the uniaxial crystal right-angled prism 16-2 which is joined to prism 16-1 and has the optical axis inclined by an angle of 45° with respect to the polarized direction of the incident beams upon the magneto-optical disk in the plane perpendicular to the reflected beams, and then through the glass prism 16-3 joined to prism 16-2, thereby being separated into four beams each pair having the polarized directions orthogonal to each other. From differential outputs of those two paired beams, the magneto-optical signal can be obtained for each of the overwrite beam and the verification beam.

Next, a magneto-optical disk apparatus using the optical system of the present invention will be described with reference to FIG. 7.

Light from a semiconductor laser 2 is converted by a collimator lens 3 into a parallel beam which enters a composite prism 16 of quartz. The polarized direction of the semiconductor laser 2 is inclined 20.7° from the P-axis on a coordinate system 17 defined, as shown, by the P- and S-polarized directions for the prism 16. A quartz prism 16-1 has its optical axis in the direction of the P-axis with a half mirror 16-4 ($\gamma_p^2=0.5$, $\gamma_2^2=0.5$) evaporated on the joined surface between the quartz prisms 16-1 and 16-2. The light beam reflected by half mirror 16-4 is separated into a P-polarized beam 20-2 and an S-polarized beam 20-1, followed by exiting from 16-1. When the P-polarized beam (dotted line) is used as an overwrite beam and the S-polarized beam (solid line) is used as a verification beam, the light amount ratio of the overwrite beam to the verification beam is 7:1 and the separation angle therebetween is about 30'. The beams bent by a bending mirror 25 toward an object lens 7 are focused by the object lens 7 as an overwrite spot $SP_2$ and a verification spot $SP_1$ on a track 104 of a magneto-optical disk 1. These two spots are correctly positioned on a desired track by an actuator (not shown) holding the object lens 7.

Figure 8:
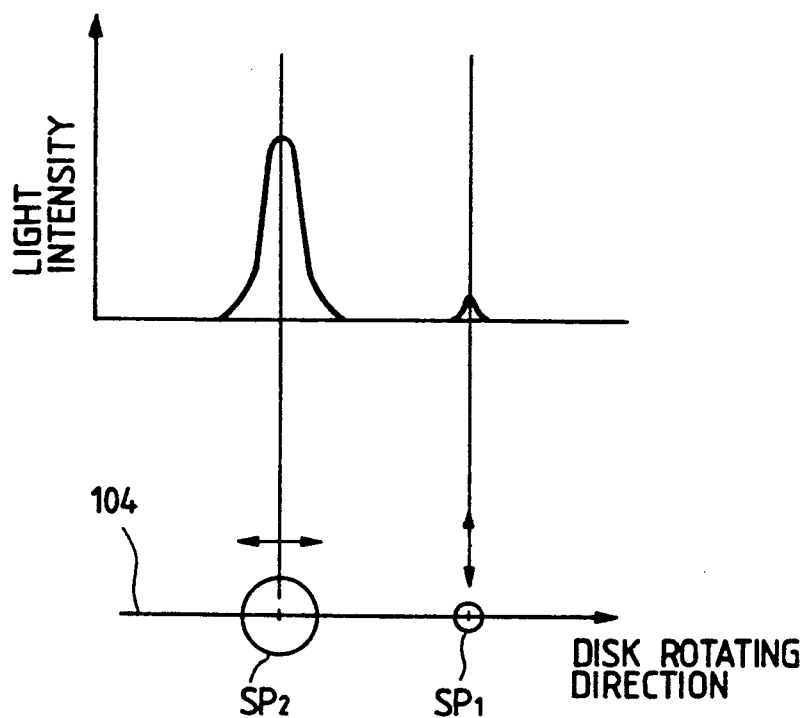
FIG. 8 is a diagram for explaining spots on a track in the magneto-optical disk apparatus of FIG. 7.

FIG. 8 schematically shows states of the overwrite spot $SP_2$ and the verification spot $SP_1$ focused on the track 104 of the magneto-optical disk 1. As shown, $SP_2$ is located on the upstream side in the disk rotating direction and $SP_1$ is located on the downstream side. With the above arrangement, because positioning accuracy of the two spots with respect to the track 104 can be determined by inclining accuracy of the bending mirror 25, the precise alignment can be simply achieved.

Figure 7:
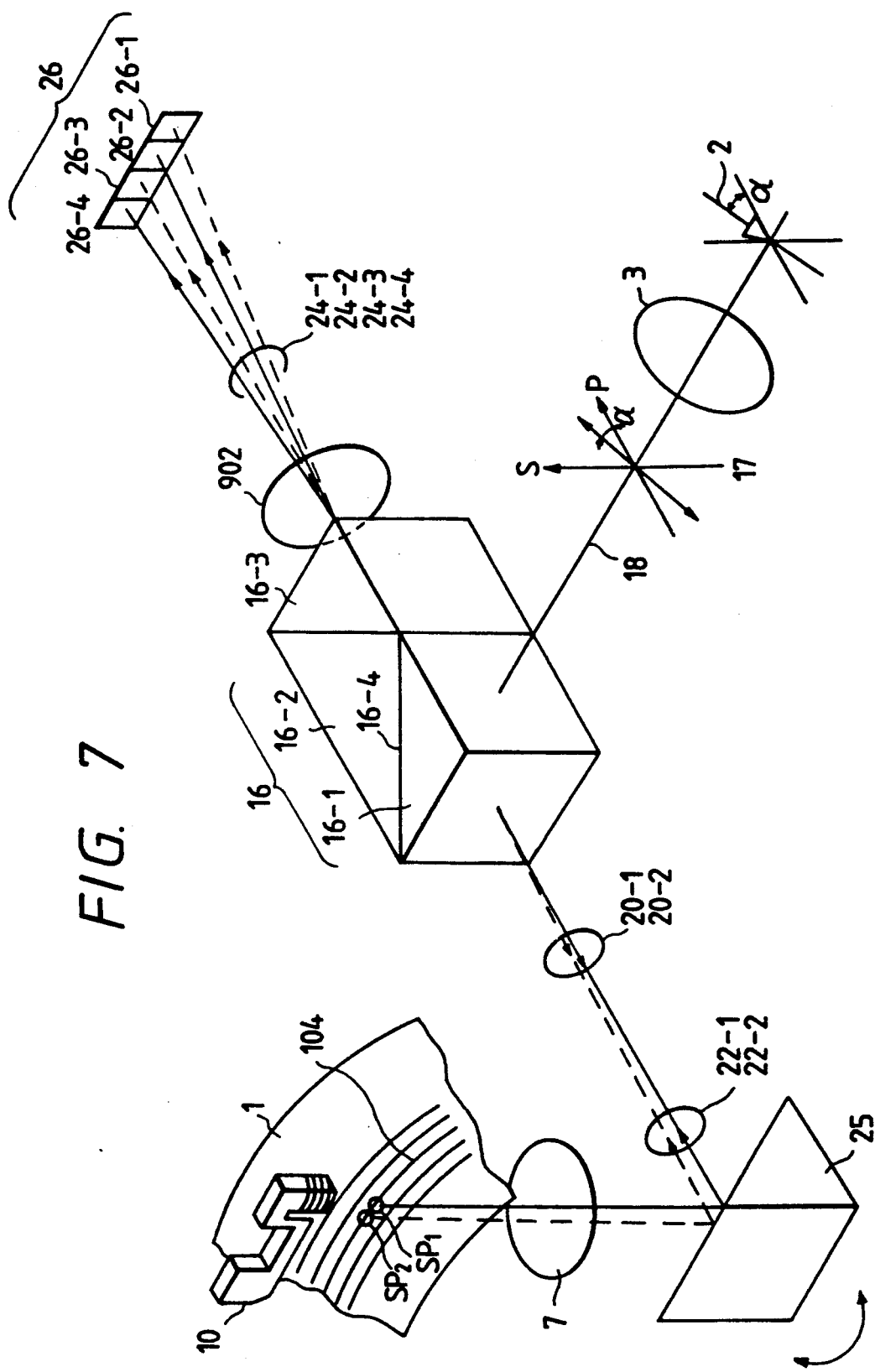
FIG. 7 is a diagram of one embodiment of a magneto-optical disk apparatus using the optical system of the present invention.

In the case of the embodiment shown in FIG. 7, the overwrite spot is polarized parallel to the track and the verification spot is polarized perpendicular to the track.

Figure 1:
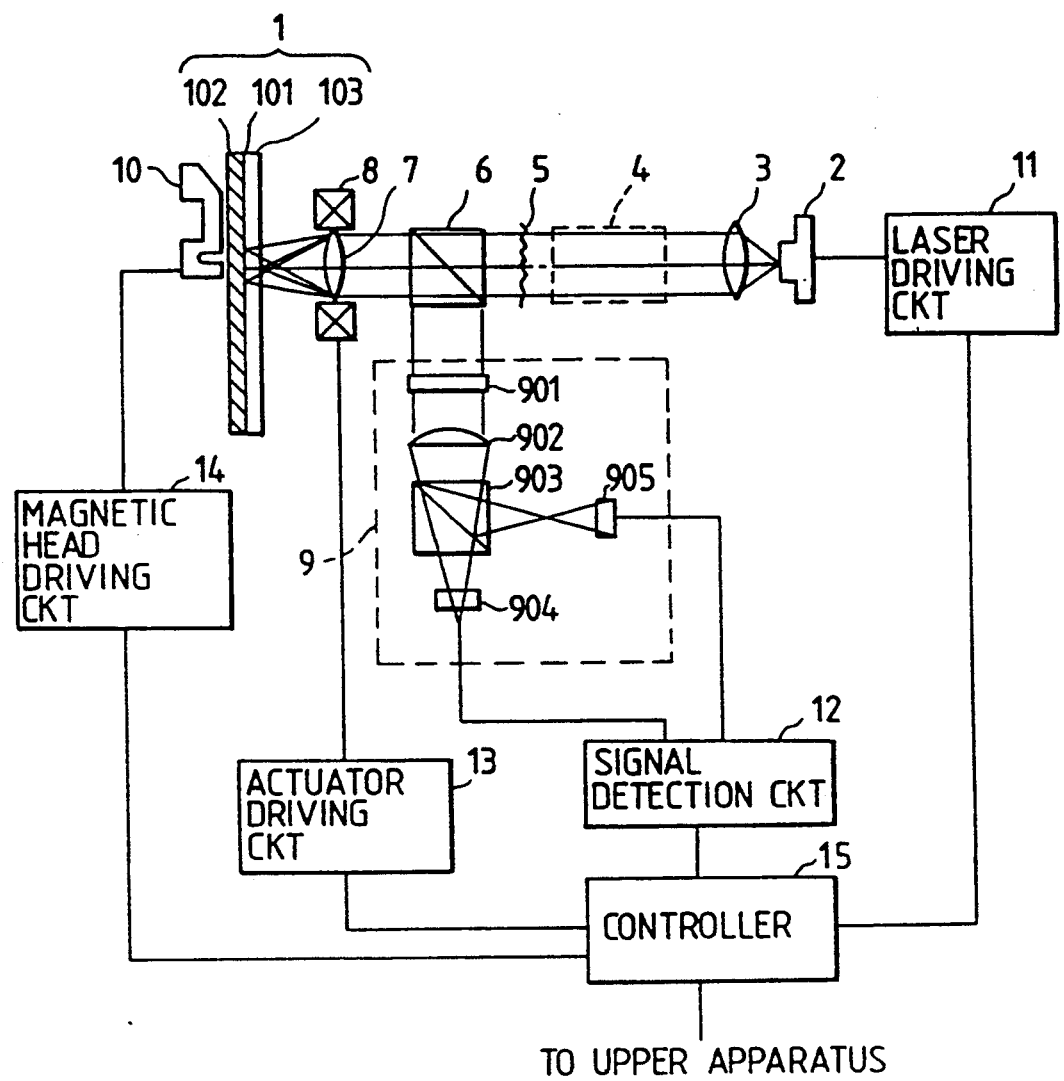
FIGS. 1 and 2 are diagrams for explaining an optical system for a magneto-optical recording/reproducing apparatus of the prior art.
Figure 2:
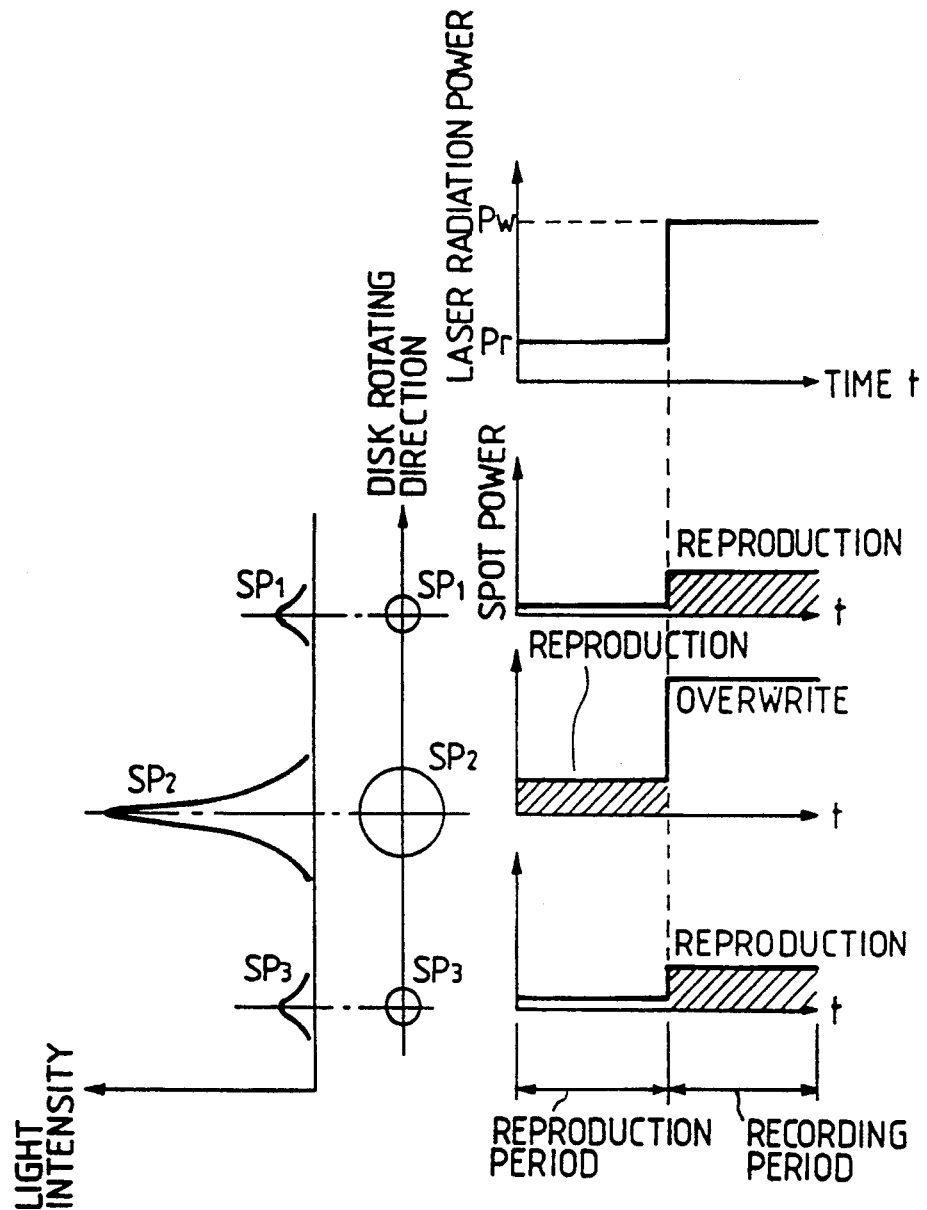

As with the prior art of FIG. 2, during a period of normal reproduction, the semiconductor laser 2 is operated to emit the beam at low power and the overwrite spot $SP_2$ is used as a reproduction spot. In the case of this low power operation, the verification spot $SP_1$ is not used.

During a period of overwrite, the semiconductor laser 2 is operated to emit the beam at high power and $SP_2$ is used as an overwrite spot. Upon irradiation of the laser beam at high power, the temperature of the aforesaid magneto-optical film 101 is raised to lower a degree of magnetization and coercive force so that the information already recorded on the disk is erased. Simultaneously, when a magnetic field with its polarity inverted depending on the information to be recorded is applied by a magnetic field head 10, the magneto-optical film 101 is fixedly magnetized, while being cooled, in the direction of the magnetic field applied, thereby completing the overwrite. At this time, the verification spot has reproduction power to reproduce the magneto-optical signal immediately after recording.

The light beams reflected by the magneto-optical disk are converted by the object lens 7 again 10 into parallel beams (an overwrite beam 22-2, a verification beam 22-1), which are then reflected by the bending mirror 25 to return to the composite prism 16 of quartz. After passing through the half mirror 16-4, the quartz prism 16-2 and the glass prism 16-3, those two beams are separated into four beams 24-1 to 24-4 as shown in FIG. 3. Beams 24-1 and 24-3 represent the overwrite beams (dotted lines), whereas 24-2 and 24-4 represent the verification beams (solid lines) These beams 24-1 to 24-4 are condensed by a condensing lens 902 onto a light detector 26. Corresponding to the four beams, the light detector 26 comprises four units of light detectors 26-1 to 26-4. Given the focal distance of the condensing lens 902 being 30 mm, the four beams are focused on the light detectors with a spacing on the order of 300 μm therebetween.

Figure 9:
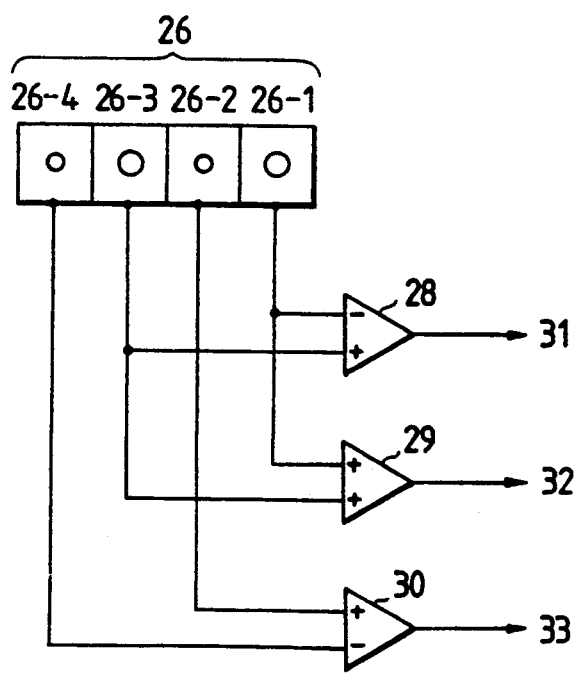
FIG. 9 is a diagram for explaining an information signal detection system in the magneto-optical disk apparatus of FIG. 7.

FIG. 9 shows a manner of detecting signals. In the case of normal reproduction, outputs from the light detectors 26-1 and 26-3 upon which the overwrite beams 24-1 and 24-3 impinge are used. Denoted by 28 is a differential amplifier which produces a magneto-optical signal 31 below based on Equations (19) and (20):

$$\text{magneto-optical signal } 31 \propto I_3^{\pm} - I_1^{\pm} \qquad (23)$$

Denoted by 29 is an adder which produces a pre-format signal 32 when pre-formatted information is provided on the disk in the form of rugged pits:

$$\text{pre-format signal } 32 \propto I_3^{\pm} + I_1^{\pm} \qquad (24)$$

During the overwrite period, outputs from the light detectors 26-2 and 26-4 upon which the verification beams 24-2 and 24-4 impinge are used. Denoted by 30 is a differential amplifier which produces a magneto-optical signal 33 below based on Equations (21) and (22):

$$\text{magneto-optical signal } 33 \propto I_2^{\pm} - I_4^{\pm} \qquad (25)$$

Figure 10:
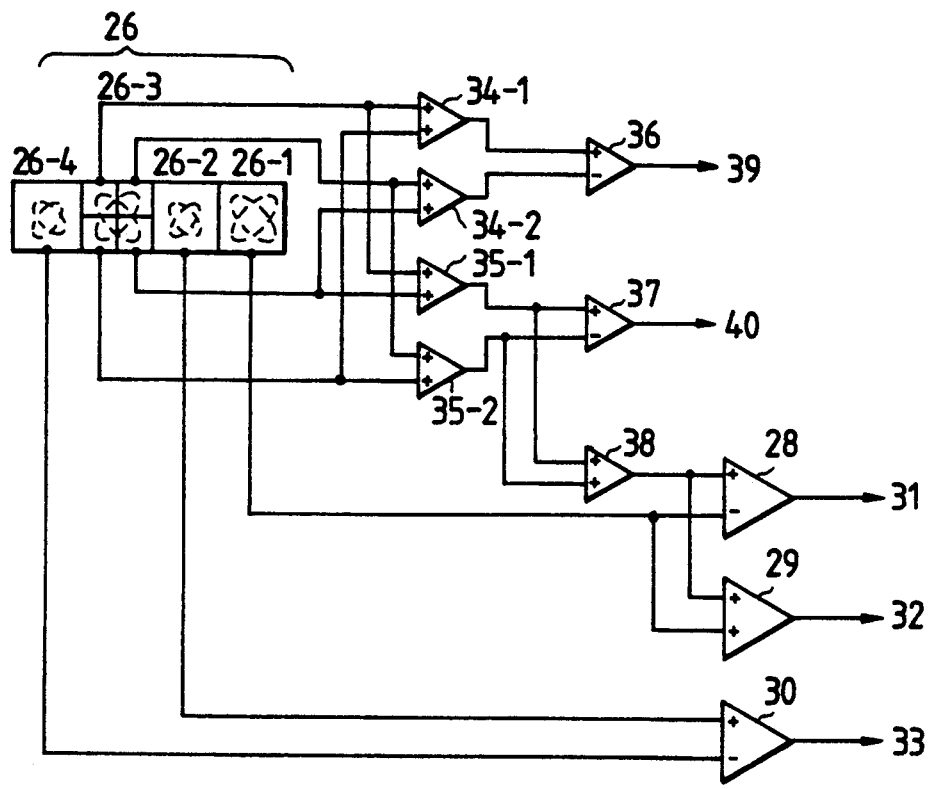
FIG. 10 is a diagram for explaining a servo signal detection system in the magneto-optical disk apparatus of FIG. 7.

Then, FIG. 10 shows a manner of detecting servo signals. When the astigmatism technique is applied to an AF system (which only requires providing a cylindrical lens or the like behind the condensing lens 902) and the push-pull technique is applied to an AT system, it is preferable that 26-1 or 26-3 upon which the overwrite beam 24-1 or 24-3 impinges is selected as a light detector for detecting servo signals. In the embodiment of FIG. 7, particularly, since 24-3 has the smaller angle of view with respect to the condensing lens 902, a light spot suitable for obtaining the servo signals is formed on 26-3.

The light detector 26-3 is further divided into four parts. As regards to AT, the sums of outputs of every two light detector parts, which are divided by a division line resulted by projection of a diffraction pattern from the track, are respectively taken by adders 34-1 and 34-2, following which an AT signal 39 is obtained through a differential amplifier 36. As regards to AF, the sums of the outputs of every two light detector parts, which are located in diagonal relation to each other, are respectively taken by adders 35-1 and 35-2, following which an AF signal 40 is obtained through a differential amplifier 37. Those servo signals are derived in bands separate from the magneto-optical signal 31 and the pre-format signal 32. Denoted by 38 is an adder which outputs the sum of the four light detector parts, the sum corresponding to the output of the light detector 26-3 in FIG. 9.

Figure 11:
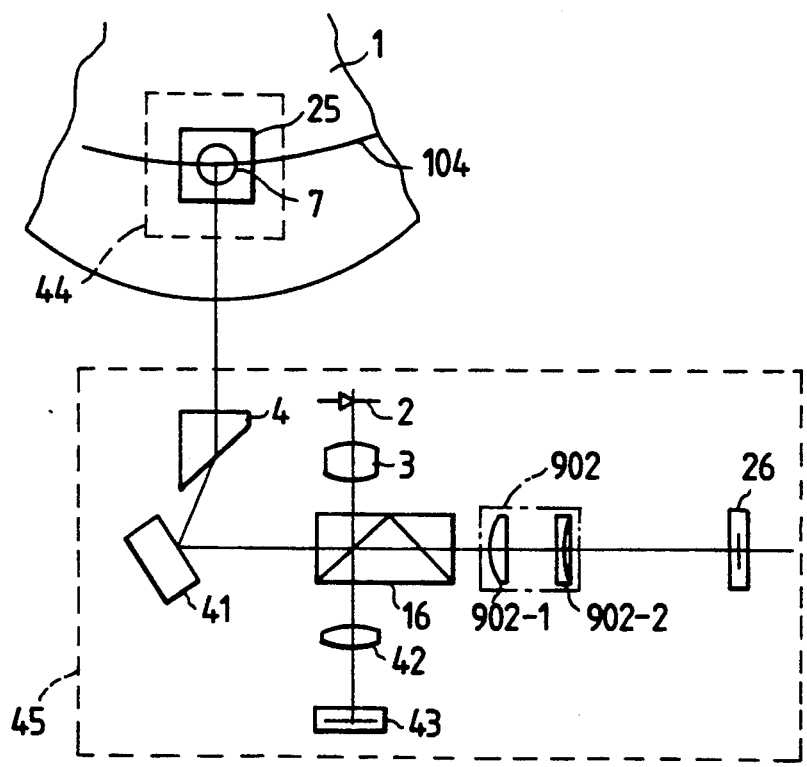
FIG. 11 is a diagram of another embodiment of the magneto-optical disk apparatus using the optical system of the present invention.

FIG. 11 shows another embodiment of the magneto-optical disk apparatus.

As with the embodiment of FIG. 7, light from a semiconductor laser 2 is converted by a collimator lens 3 into a parallel beam which enters a composite prism 16 of quartz. The light beam reflected by prism 16 is separated into an overwrite beam and a verification beam (both not shown) which impinge upon a galvanic mirror 41. These two beams are deflected by the galvanic mirror 41 in a direction perpendicular to the track for tracking control. Denoted by 4 is a beam shaping prism for shaping each beam, which is emitted from the semiconductor laser 2 and has anisotropic four field patterns, into substantially isotropic patterns. With a beam shaping ratio set to about 2, the separation angle of the overwrite beam and the verification beam becomes 15', i.e., a half of the angle in the embodiment of FIG. 7, enabling to narrow a spacing between two spots on a magneto-optical disk 1. FIG. 11 also shows an example of the magneto-optical disk apparatus in which the semiconductor laser and the light detector are disposed in a stationary section 45, and a movable section 44 comprising an object lens 7 and a bending mirror 25 is used for coarse seeking in the radial direction of the disk. In this type of apparatus, arranging the beam shaping prism 4 at such a position gives rise to the following four advantages:

(1) The separation angle of the overwrite beam and the verification beam can be made smaller to moderate a demand on off-axial performance of the object lens 7;

(2) With the smaller separation angle, fluctuations in distribution of the light amount over the entrance pupil of the object lens 7, depending on whether the movable section 44 is in an inner peripheral area of the disk or in an outer peripheral area thereof, can be reduced so that the light spots are satisfactorily focused on the disk 1;

(3) The narrower spot spacing on the disk can moderate a demand on inclining accuracy of the bending mirror 25. (The accuracy only half of that in the embodiment of FIG. 7 is sufficient.); and (4) Since the separation angle of the two beams for providing the magneto-optical signal remains the same as in the embodiment of FIG. 7, the wide beam spacing can be taken on the light detector. (This permits shortening the focal distance of the condensing lens 902 and thus making the optical system compact).

The reflected beams from the magneto-optical disk 1 enter the composite prism 16 of quartz again, like the embodiment of FIG. 7, through the object lens 7, the bending mirror 25, the beam shaping prism 4 and the galvanic mirror 41 successively. These two beams are separated into four beams each pair having the polarized directions orthogonal to each other, followed by reaching the light detector 26 through a condensing lens 902-1 and a cylindrical lens 902-2. The cylindrical lens 902-2 is to perform AF servo control using the astigmatism technique, and has its generatrix rotated 45° with respect to a diffraction pattern from the track.

Further, of the light emitted from the semiconductor laser 2, the beam having passed through the composite prism 16 of quartz is condensed by a lens 42 onto a light detector 43 and used for monitoring output power of the semiconductor laser.

In the optical head for the magneto-optical recording/reproducing apparatus according to this aspect of the present invention, as described above, a light beam emitted from a semiconductor laser beam source enters a first end face of a first substantially right-angled prism made of a uniaxial crystal and part of the light beam is reflected by a second end face of the first substantially right-angled prism to exit from a third end face thereof almost perpendicular to the first end face for separation into first and second light beams having their polarized directions orthogonal to each other, the uniaxial crystal of the first substantially right-angled prism having an optical axis almost coincident with a propagating direction of the reflected light beam from the second end face, the light beam emitted from the semiconductor laser beam source having its polarized direction inclined at a predetermined angle from the optical axis of the uniaxial crystal; the first and second light beams exiting from the first substantially right-angled prism are focused by an object lens, as small first and second light spots spaced in a track moving direction, on the same track of a magneto-optical recording medium; first and second reflected light beams from the magneto-optical recording medium enter the first substantially right-angled prism from the third end face thereof, partially pass through the second end face thereof to enter a second substantially right-angled prism made of a uniaxial crystal from a first end face thereof which is joined to the second end face of the first substantially right-angled prism, emit from a second end face of the second substantially right-angled prism almost perpendicular to the first end face thereof, enter a third substantially right-angled prism made of glass from a first end face thereof which is joined to the second end face of the second substantially right-angled prism, and then exit from a second end face of the third substantially right-angled prism almost perpendicularly, so that the two reflected light beams are each separated into two emergent light beams having their polarized directions orthogonal to each other, i.e., so that the first reflected light beam is separated into first and second emergent light beams and the second reflected light beam is separated into third and fourth emergent light beams; and the second substantially right-angled prism has an optical axis inclined 45° with respect to the polarized directions of the first and second light beams exiting from the third end face of the first substantially right-angled prism.

With the magneto-optical recording/reproducing apparatus using the optical system of the present invention to simultaneously permit an overwrite and a verification immediately after recording by a single laser beam source, as explained above, the light beam from the semiconductor laser can be effectively allocated to an overwrite beam and a verification beam at a predetermined ratio, making it possible to employ a semiconductor laser of low output power and a collimator lens of low N.A.

Furthermore, the spots focused from two beams can be simply arranged on the same track. The light amount ratio of one spot to the other and the spacing therebetween also can be simply kept constant In addition, the optical system for detecting a magneto-optical signal is simplified, which leads to a reduction in the production cost.

Another embodiment of the optical system of the present invention will be described with reference to FIGS. 12 to 16.

Figure 12:
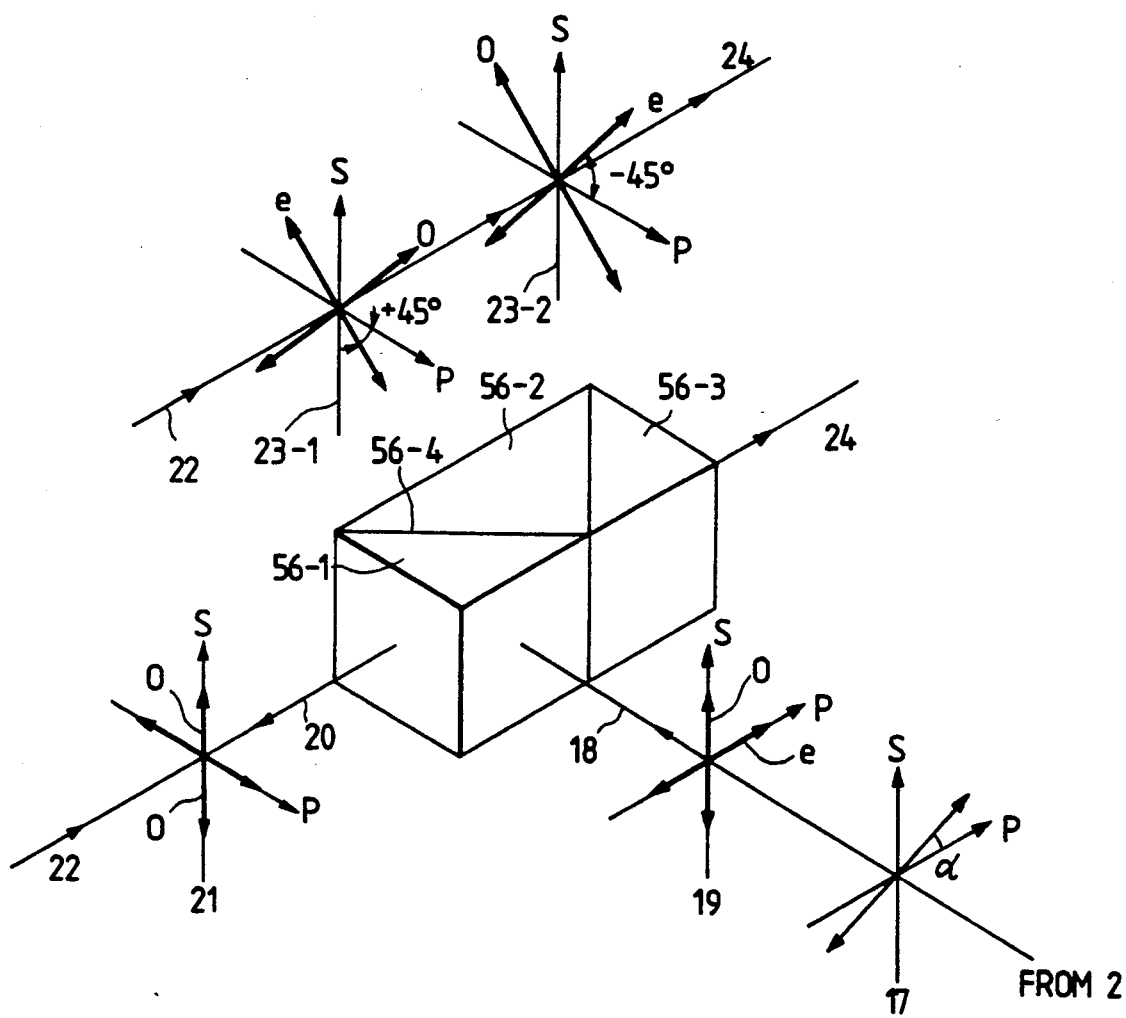
FIG. 12 is a diagram for explaining another arrangement of an optical system for the magneto-optical recording/reproducing apparatus of the present invention.
Figure 13:
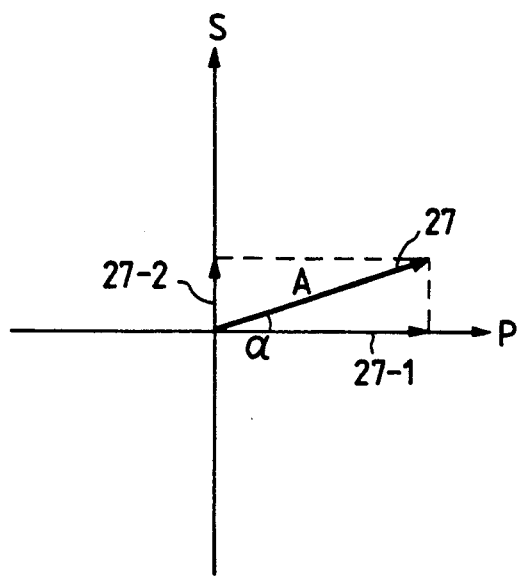
FIG. 13 is a diagram for explaining the polarized direction of the semiconductor laser in the optical system of the present invention shown in FIG. 12.

As shown in FIG. 12, the optical system of this embodiment comprises a composite member 56 consisted of three uniaxial crystal right-angled prisms 56-1, 56-2 and 56-3 joined together A half mirror 56-4 is evaporated on the joined surface between prisms 56-1 and 56-2. A light beam 18 from a semiconductor laser 2 (not shown) enters the uniaxial crystal right-angled prism 56-1. Assuming that a P-polarized direction and an S-polarized direction for the joined surface between prisms 56-1 and 56-2 are defined as shown in a coordinate system 17, the light beam 18 has its polarized direction inclined $\alpha°$ from the P-axis. The optical axis (refractive index $n_e$ for extraordinary rays) of the uniaxial crystal 56-1 is in a direction of the P-axis, for example, and will be referred to as an e-axis. Likewise, the S-axis direction exhibits a refractive index $n_o$ for ordinary rays and will be referred to as an o-axis. The light beam 18 (with an amplitude A) incident upon 56-1 is thought as having two amplitude components 27-1 and 27-2, as shown in FIG. 13:

direction of e-axis: $A\cos\alpha$  (1)

direction of o-axis: $A\sin\alpha$  (2)

The amplitude component 27-1 in the direction of the e-axis is subjected to an action of the refractive index $n_e$ for extraordinary rays and the amplitude component 27-2 in the direction of the o-axis is subjected to an action of the refractive index $n_o$ for ordinary rays, so that the incident beam advances through the crystal while being converted into elliptically polarized light.

A light beam 20 reflected by the half mirror 56-4 is subjected to an action of the refractive index $n_o$ for ordinary rays in the directions of both the P-and S-axes as shown in a coordinate system 21. Of the light beam 18, therefore, the beam subjected to the has an emergent angle $\theta_{11}$ below from the Snell's law, given an incident angle upon the half mirror 56-4 being $\theta_o$:

$$n_o \sin\theta_{11} = n_e \sin\theta_o \quad (3)$$

$$\theta_{11} = \sin^{-1}\left(\frac{n_e \sin\theta_o}{n_o}\right)$$

Also, an emergent angle $\theta_{12}$ of the beam subjected to the action of the refractive index for ordinary rays is given by:

$$n_o \sin\theta_{12} = n_o \sin\theta_o \quad (4)$$
$$\theta_{12} = \theta_o$$

Figure 14:
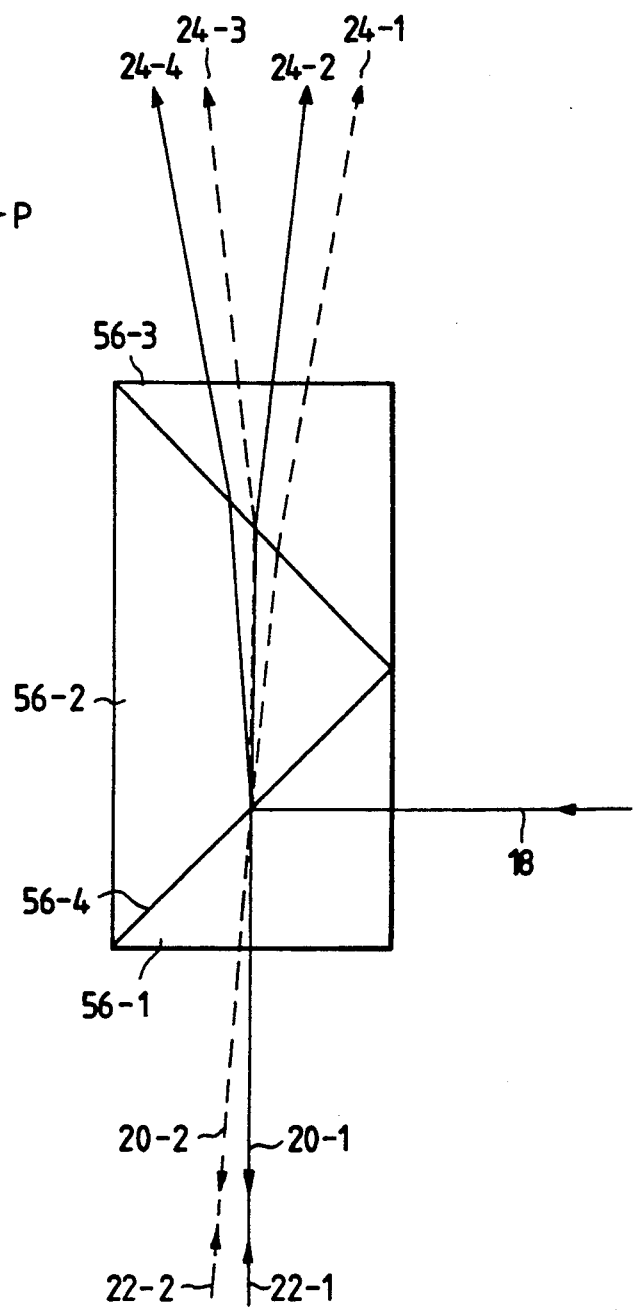
FIG. 14 is a diagram for explaining how a light beam is separated in the optical system of the present invention shown in FIG. 12.

It is thus found that the above two beams are separated into two polarized lights orthogonal to each other. This behavior is shown in FIG. 14. Specifically, of the light beam 18, the beam subjected to the action of the refractive index for extraordinary rays is reflected as a P-polarized light 20-2 at the emergent angle of $\theta_{11}\ne\theta_o$, whereas the beam subjected to the action of the refractive index for ordinary rays is reflected as an S-polarized light 20-1 at the emergent angle of $\theta_{12}=\theta_o$.

In the embodiment of FIG. 12, assuming that quartz is selected as the uniaxial crystal, the refractive index $n_e$ for extraordinary rays and the refractive index $n_c$ for ordinary rays are respectively 1.54749 and 1.53859 at the semiconductor laser's wavelength of $\lambda=790$ nm, and the incident angle $\theta_o$ is 45°, for example, the emergent angles are given by:

$\theta_{11}=45.3324°$ $\theta_{12}=\theta_o=45°$

A resulting separation angle of the two beams in air becomes about 0.51°. In this way, the separation angle is determined by the refractive indexes for extraordinary rays and ordinary rays, with the result that its variations due to manufacture errors and other causes are very small.

Angle $\theta_o$ can be freely selected to be any angle near 45°. For example, it may be selected such that both the overwrite beam and the verification beam have their angles of view almost equal to each other with respect to an object lens (not shown) for condensing light spots on a magneto-optical disk as a magneto-optical recording medium. Moreover, the emergent end face of prism 56-1 may be inclined on the order of 1° to 2° so that the light beams returning from the beam exit surface of 56-1 will not enter light detectors (not shown).

The light amount ratio of the reflected light beam 20-1 to 20-2 can be selected by changing $\alpha$. The light amount ratio of the overwrite spot to the verification spot is expressed below from above Equations (1) and (2):

$$\frac{1}{\tan^2\alpha} \quad (5)$$

The light amount ratio is determined depending on the accuracy of $\alpha$ and thus can be adjusted simply and precisely. When the light amount ratio of 7 is desired, by way of example, it is required to set $\alpha =20.7°$. In this case, the overwrite spot is P-polarized light and the verification spot is S-polarized light. Of course, by selecting $\alpha$ at an angle near 90°, the above relationship can be reversed such that the overwrite spot is S-polarized light and the verification spot is P-polarized light.

Although 56-4 is explained as a half mirror for the sake of brevity, the present invention is not limited to the half mirror. Assuming that reflectivity for the amplitude of the P-polarized light is $\gamma_p$ and reflectivity for the amplitude of the S-polarized light is $\gamma_s$, above Equations (1) and (2) are rewritten to:

direction of e-axis: $A\gamma_p\cos\alpha$  (1')

direction of o-axis: $A\gamma_s\sin\alpha$  (2')

From these Equations (1') and (2'), the light amount ratio is given by:

$$\frac{\gamma_p^2}{\gamma_s^2 \tan^2\alpha} \quad (5')$$

Accordingly, the light amount ratio can be freely selected by changing the reflectivity $\gamma_p$ for the amplitude of the P-polarized light, the reflectivity $\gamma_s$ for the amplitude of the S-polarized light, and the inclination o with respect to the optical axis of the incident light beam 18. Element 56-4 may be either a non-polarizing beam splitter ($\gamma_p^2 \neq \gamma_s^2$) or a polarizing beam splitter ($\gamma_p^2 \neq \gamma_s^2$). Further, in the embodiment of FIG. 12, with $\gamma_p^2$ set to a relatively large value, the light beam from the semiconductor laser can be utilized effectively during a period of overwrite.

As explained above, by making the incident light beam enter the uniaxial crystal right-angled prism 56-1 with the polarization plane thereof inclined at a predetermined angle from the optical axis, and introducing the light beam reflected by the half mirror again into the crystal, the overwrite spot and the verification spot can be separated from each other at a desired light amount ratio.

The following is a description about detection of a magneto-optical signal by the optical system of this embodiment. It is supposed that, in FIGS. 12 and 14, light beams reflected by the magneto-optical disk (not shown) are 22-1 and 22-2. More specifically, 22-2 is an overwrite beam which is used to reproduce the magneto-optical signal during a period of normal data reading. Beam 22-1 is a verification beam which is used to reproduce the magneto-optical signal immediately after recording in the overwrite period. The uniaxial crystal right-angled prism 56-2 is set such that, as shown in a coordinate system 23-1, its optical axis (e-axis) is inclined 45° from the P-axis optical axis in a plane perpendicular to the light beam 22.

Furthermore, the uniaxial crystal right-angled prism 56-3 is set such that, as shown in a coordinate system 23-2, its optical axis (e-axis) is inclined 45° from the P-axis in the plane perpendicular to the light beam 22 and is also perpendicular to the optical axis of the uniaxial crystal right-angled prism 56-2.

Detection of the magneto-optical signal for each of the two beams will be explained below by referring to FIG. 15. For the sake of brevity, it is supposed that the light amount of the verification beam 22-1 during the overwrite period is equal to the light amount of the overwrite beam 22-2 during the normal reproduction period, amplitude reflectivity for the components of both the beams 22-1 and 22-2 in the polarized directions of the incident beams upon the magneto-optical disk (S-polarization for the verification beam and P-polarization for the overwrite beam) is R, and amplitude reflectivity of the components produced by a Kerr effect in the polarized directions perpendicular to the above ones is K. Given a Kerr's rotation angle being $\pm\theta_k$, the following equation holds:

$$\frac{\pm K}{R} = \tan(\pm\theta_k) \quad (6)$$

The overwrite beam 22-2 will now be explained using (1) and (2) in FIG. 15. The light beam 22-2 enters the uniaxial crystal right-angled prism 56-1 and its P- and S-polarized components are both subjected to the action of the refractive index $n_o$ for ordinary rays. Then, the light beam passes through the half mirror 56-4 and enters the uniaxial crystal right-angled prism 56-2. As shown in FIG. 6(1), an amplitude component $u_o^+$ projected to the o-axis is expressed below when the Kerr's rotation angle is $+\theta_k$;

$$u_o^+ = \frac{1}{\sqrt{2}}(R - K) \quad (7)$$

and is expressed below when the Kerr's rotation angle is $-\theta_k$:

$$u_o^- = \frac{1}{\sqrt{2}}(R + K) \quad (8)$$

The amplitude component $u_o^\pm$ projected to the o-axis behaves following the Snell's law below on assumptions that the incident angle upon the half mirror 56-4 is $\theta_{11}$ and the emergent angle therefrom is $\theta_{21}$;

$$n_o \sin\theta_{11} = n_o \sin\theta_{21} \quad (9)$$
$$\theta_{21} = \theta_{11}$$

and thus advances straightforward without being refracted.

Figure 15:
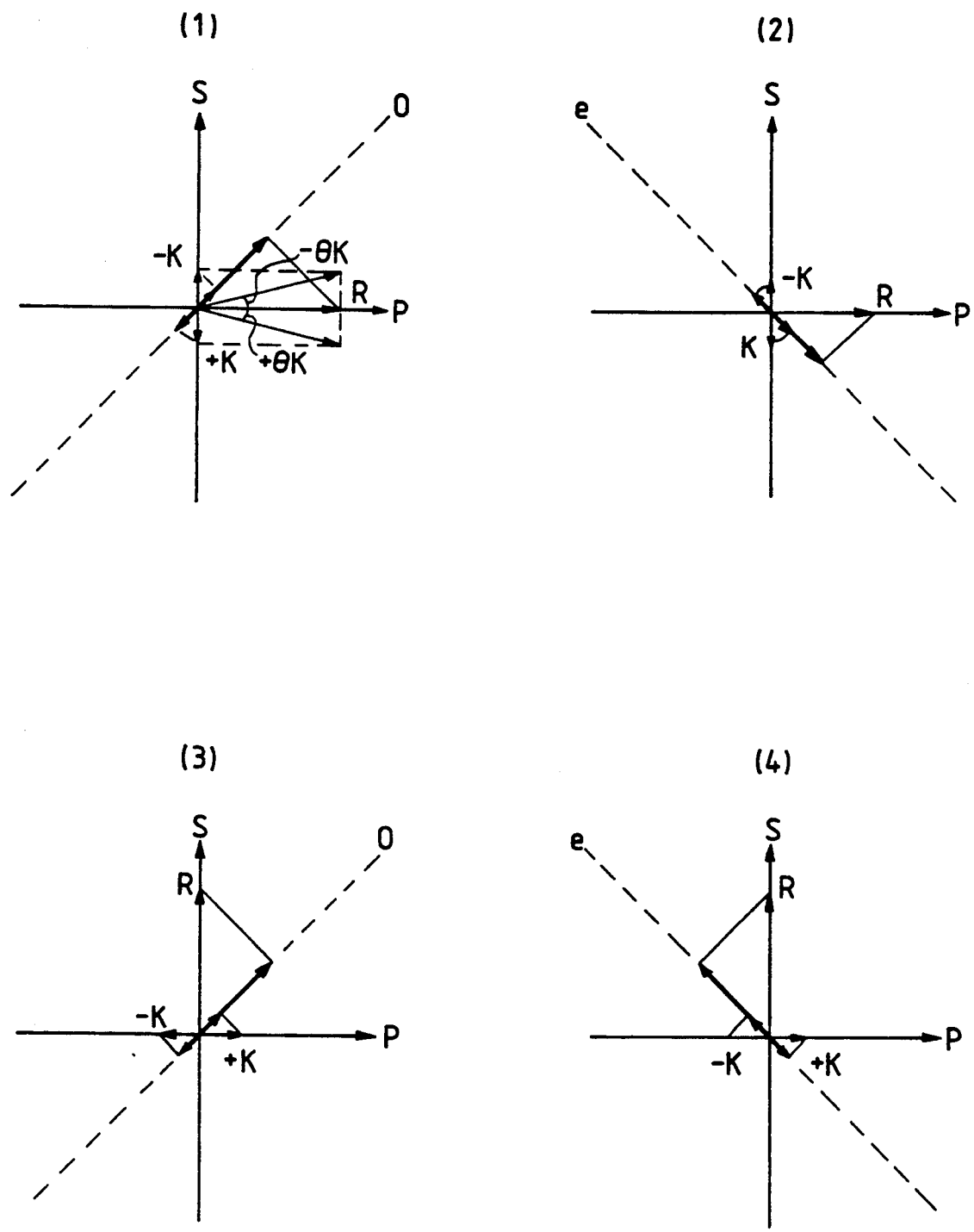
FIGS. 15(1) to (4) are diagrams for explaining a manner of detecting a magneto-optical signal in the optical system of the present invention shown in FIG. 12.

Also, as shown in FIG. 15(2), an amplitude component $u_e$ projected to the e-axis is expressed below when the Kerr's rotation angle is $\pm\theta_k$ (Equation holds for each corresponding one of double signs);

$$u_e^\pm = \frac{1}{\sqrt{2}}(R \pm K) \quad (10)$$

The amplitude component $u_e^\pm$ projected to the e-axis behaves following the Snell's law below and Equation (3) on assumptions that the incident angle upon the half mirror 56-4 is $\theta_{11}$ and the emergent angle therefrom is $\theta_{22}$;

$$n_o \sin\theta_{11} = n_e \sin\theta_{22} \quad (11)$$

$$\theta_{22} = \sin^{-1}\left(\frac{n_o \sin\theta_{11}}{n_e}\right)$$
$$= \theta_o$$

and thus separates from $u_o^\pm$ by being refracted.

Next, the verification beam 22-1 will be explained using (3) and (4) in FIG. 15. The light beam 22-1 enters the uniaxial crystal right-angled prism 56-1 and its P- and S-polarized components are both subjected to the action of the refractive index $n_o$ for ordinary rays. Then, the light beam passes through the half mirror 56-4 and enters the uniaxial crystal right-angled prism 56-2. As shown in FIG. 15(3), an amplitude component $u_o'$ projected to the o-axis is expressed below when the Kerr's rotation angle is $\pm\theta_l$ (Equation holds for each corresponding one of double signs);

$$u_o^{\pm'} = \frac{1}{\sqrt{2}}(R \pm K) \quad (12)$$

The amplitude component $u_o^{\pm'}$ projected to the o-axis behaves following the Snell's law below on assumptions that the incident angle upon the half mirror 56-1 is $\theta_o$ and the emergent angle therefrom is $\theta_{23}$;

$$n_o \sin\theta_o = n_o \sin\theta_{23} \quad (13)$$
$$\theta_{23} = \theta_o$$

and thus advances straightforward without being refracted.

Also, as shown in FIG. 15(4), an amplitude component $u_e^{\pm'}$ projected to the e-axis is expressed below when the Kerr's rotation angle $\pm\theta_k$ (Equation holds for each corresponding one of double signs);

$$u_e^{\pm'} = \frac{1}{\sqrt{2}} (R \mp K) \quad (13')$$

The amplitude component $u_e^{\pm'}$ projected to the e-axis behaves following the Snell's law below on assumptions that the incident angle upon the half mirror 56-4 is $\theta_o$ and the emergent angle therefrom is $\theta_{24}$;

$$n_o \sin\theta_o = n_e \sin\theta_{24} \quad (14)$$

$$\theta_{24} = \sin^{-1}\left(\frac{n_o \sin\theta_o}{n_e}\right)$$

and thus separates from $u_o^{\pm'}$ by being refracted.

To put it in short, the two light beams are separated through the uniaxial crystal right-angled prism 56-2 into three beams given by the component $u_o^{35}$ of the overwrite beam projected to the o-axis, the component $u_e^{\pm}$ of the overwrite beam projected to the e-axis and the component $u_o^{\pm'}$ of the verification beam projected to the o-axis ($\theta_{22}=\theta_{23}$), and the component $u_e^{\pm'}$ of the verification beam projected to the e-axis (see FIG. 14).

There will be further explained refraction of the beams at the joined surface between the uniaxial crystal right-angled prisms 56-2 and 56-3. A component $u_{o\text{-}e}^{\pm}$ of the overwrite beam projected to the o-axis in 56-2 and then projected to the e-axis in 56-3 behaves following the Snell's law below on assumptions that the incident angle upon the above joined surface is $\theta_{31}$ and the emergent angle therefrom is $\theta_{41}$, and then exits as a beam 24-1 from 56-3.

$$\theta_{31} = 90° - \theta_{21} = 90° - \theta_{11} \quad (15)$$
$$n_o \sin\theta_{31} = n_e \sin\theta_{41}$$

$$\theta_{41} = \sin^{-1}\left(\frac{n_o \sin\theta_{31}}{n_e}\right) = \sin^{-1}\left(\frac{n_o \cos\theta_{11}}{n_e}\right)$$

A component $u_{e\text{-}o}^{\pm}$ of the overwrite beam projected to the e-axis in 56-2 and then projected to the o-axis in 56-3 behaves following the Snell's law below on assumptions that the incident angle upon the above joined surface is $\theta_{32}$ and the emergent angle therefrom is $\theta_{42}$, and then exits as a beam 24-3 from 56-3:

$$\theta_{32} = 90° - \theta_{22} = 90° - \theta_o \quad (16)$$
$$n_e \sin\theta_{32} = n_o \sin\theta_{42}$$

$$\theta_{42} = \sin^{-1}\left(\frac{n_e \sin\theta_{32}}{n_o}\right) = \sin^{-1}\left(\frac{n_e \cos\theta_o}{n_o}\right)$$

A component $u_{o\text{-}e}^{\pm'}$ of the verification beam projected to the o-axis in 56-2 and then projected to the e-axis in 56-3 behaves following the Snell's law below on assumptions that the incident angle upon the above joined surface is $\theta_{33}$ and the emergent angle therefrom is $\theta_{43}$, and then exits as a beam 24-2 from 56-3:

$$\theta_{33} = 90° - \theta_{23} = 90° - \theta_o \quad (17)$$
$$n_o \sin\theta_{33} = n_e \sin\theta_{43}$$

$$\theta_{43} = \sin^{-1}\left(\frac{n_o \sin\theta_{33}}{n_e}\right) = \sin^{-1}\left(\frac{n_o \cos\theta_o}{n_e}\right)$$

Further, a component $u_{e\text{-}o}^{\pm'}$ of the verification beam projected to the e-axis in 56-2 and then projected to the o-axis in 56-3 behaves following the Snell's law below on assumptions that the incident angle upon the therefrom is $\theta_{44}$, and then exits as a beam 24-4 from 56-3:

$$\theta_{34} = 90° - \theta_{24} \quad (18)$$
$$n_e \sin\theta_{34} = n_o \sin\theta_{44}$$

$$\theta_{44} = \sin^{-1}\left(\frac{n_e \sin\theta_{34}}{n_o}\right) = \sin^{-1}\left(\frac{n_e \cos\theta_{24}}{n_o}\right)$$

As will be apparent from Equations (15) to (18), the four beams 24-1 to 24-4 are exited from 56-3.

In the embodiment of FIG. 12, assuming that quartz is selected as the uniaxial crystals 56-1, 56-2 and 56-3, the refractive index ne for extraordinary rays and the refractive index no for ordinary rays are respectively 1.54749 and 1.53859 at the semiconductor laser's wavelength of $\lambda=790$ nm, $\theta_o$ is 45°, and $\theta_{11}$ is 45.3324°, for example, the emergent angles are given by:

$\theta_{41}=44.343°$ $\theta_{42}=45.332°$ $\theta_{43}=44.671°$ $\theta_{44}=45.665°$ In the uniaxial crystal 56-3, resulting separation angles between 24-1 and 24-2 and between 24-3 and 24-4 are each 0.33°, whereas a resulting separation angle between 24-2 and 24-3 is 0.66°. These separation angles become 0.51° and 1.02° in air, respectively. In this way, the overwrite beam and the verification beam can be each separated into two beams, making it possible to detect the magneto-optical signal for each beam.

Calculating the intensities of the four beams, as regards to the overwrite beam, the intensities $I_1^\pm$, $I_3^\pm$ of the components (beams 24-1 and 24-3) projected to the o-axis and the e-axis in opposite orders are expressed by;

$$I_1^\pm = \{u_{o\text{-}e}^\pm\}^2 = \tfrac{1}{4}(R\mp K)^2 \approx \tfrac{1}{4}(R^2)\mp RK \quad (19)$$

$$I_3^\pm = \{u_{e\text{-}o}^\pm\}^2 = \tfrac{1}{4}(R\pm K)^2 \approx \tfrac{1}{4}(R^2)\pm RK \quad (20)$$

where $r^2 >> K^2$ is assumed; the magneto-optical signal is obtained by differentially amplifying those two components.

Likewise, as regards to the verification beam, the intensities $I_2^\pm$, $I_4^\pm$ of the components (beams 24-2 and 24-4) projected to the o-axis and the e-axis in opposite orders are expressed by;

$$I_2^\pm = \{u_{o\text{-}e}^{\pm'}\}^2 = \tfrac{1}{4}(R\pm K)^2 \approx \tfrac{1}{4}(R^2)\pm RK \quad (21)$$

$$I_4^\pm = \{u_{e\text{-}o}^{\pm'}\}^2 = \tfrac{1}{4}(R\mp K)^2 \approx \tfrac{1}{4}(R^2)\mp RK \quad (22)$$

where $r^2 >> K^2$ is assumed; the magneto-optical signal is obtained by differentially amplifying those two components.

Note that although the uniaxial crystal prisms 56-2 and 56-3 are handled as right-angled prisms in the foregoing explanation of FIG. 12 for simplicity of calculations, the present invention is not limited to use of the right-angled prisms.

As described above, a single light beam is separated by the uniaxial crystal prisms 56-1 into the overwrite beam and the verification beam which are polarized in directions orthogonal to each other and have a predetermined light amount ratio, followed by entering the magneto-optical disk such that the two beams are condensed as an overwrite spot and a verification spot on the disk. The respective beams reflected by the disk are passed through the uniaxial crystal right-angled prism 56-2 which is joined to 56-1 and has the optical axis inclined by an angle of 45° with respect to the polarized direction of the incident beams upon the magneto-optical disk in the plane perpendicular to the reflected beams, and then through the uniaxial crystal right-angled prism 56-3 which is joined to 56-2 and has the optical axis perpendicular that of 56-2, thereby being separated into four beams each pair having the polarized directions orthogonal to each other. From differential outputs of those two paired beams, the magneto-optical signal can be obtained for each of the overwrite beam and the verification beam.

Next, a magneto-optical disk apparatus using the optical system of this embodiment will be described with reference to FIG. 16.

Light from a semiconductor laser 2 is converted by a collimator lens 3 into a parallel beam which enters a composite prism 56 of quartz. The polarized direction of the semiconductor laser 2 is inclined 20.7° from the P-axis on a coordinate system 17 defined, as shown, by the P- and S-polarized directions for the prism 56. A quartz prism 16-1 has its optical axis in the direction of the P-axis with a half mirror 56-4 ($\gamma_p^2=0.5$, $\gamma_3^2=0.5$) evaporated on the joined surface between the quartz prisms 56-1 and 56-2. The light beam reflected by 56-4 is separated into a P-polarized beam 20-2 and an S-polarized beam 20-1, followed by exiting from 56-1. When the P-polarized beam (dotted line) is used as an overwrite beam and the S-polarized beam (solid line) is used as a verification beam, the light amount ratio of the overwrite beam to the verification beam is 7:1 and the separation angle therebetween is about 30'. The beams bent by a bending mirror 25 toward an object lens 7 are focused by the object lens 7 as an overwrite spot $SP_2$ and a verification spot $SP_3$ on a track 104 of a magneto-optical disk 1. These two spots are correctly positioned on a desired track by an actuator (not shown) holding the object lens 7.

Figure 17:
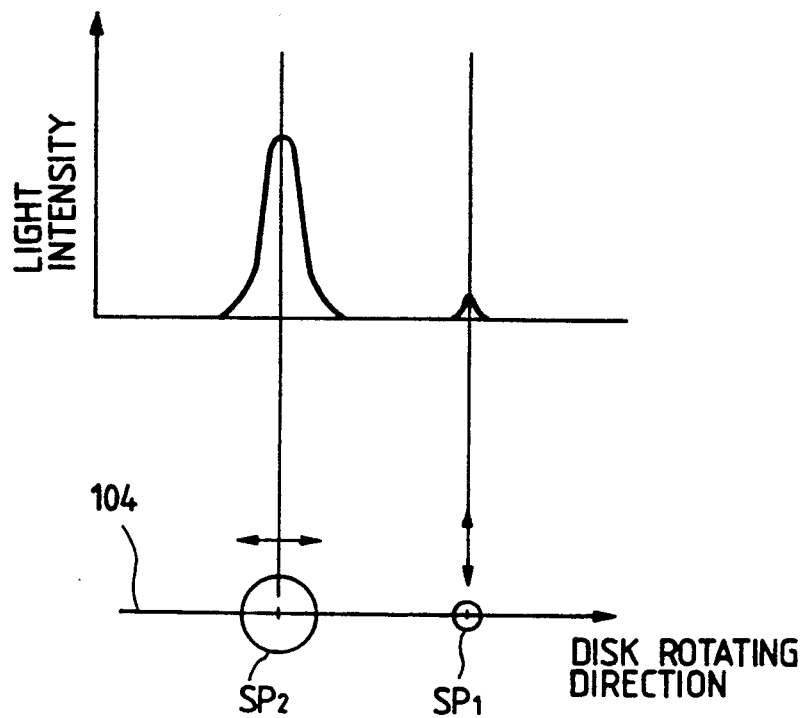
FIG. 17 is a diagram for explaining spots on a track in the magneto-optical disk apparatus of FIG. 16.

FIG. 17 schematically shows states of the overwrite spot $SP_2$ and the verification spot $SP_1$ focused on the track 104 of the magneto-optical disk 1. As shown, $SP_2$ is located on the upstream side in 20 the disk rotating direction and $SP_1$ is located on the downstream side. With the above arrangement, because positioning accuracy of the two spots with respect to the track 104 can be determined by inclining accuracy of the bending mirror 25, the precise alignment can be simply achieved.

In the case of the embodiment shown in FIG. 17, the overwrite spot is polarized parallel to the track and the verification spot is polarized perpendicular to the track.

As with the prior art of FIG. 2, during a period of normal reproduction, the semiconductor laser 2 is operated to emit the beam at low power and the overwrite spot $SP_2$ is used as a reproduction spot. In the case of this low power operation, the verification spot $SP_1$ is not used.

During a period of overwrite, the semiconductor laser 2 is operated to emit the beam at high power and $SP_2$ is used as an overwrite spot. Upon irradiation of the laser beam at high power, the temperature of the aforesaid magneto-optical film 101 is raised to lower a degree of magnetization and coercive force so that the information already recorded on the disk is erased. Simultaneously, when a magnetic field with its polarity inverted depending on the information to be recorded is applied by a magnetic head 10, the magneto-optical film 101 is fixedly magnetized, while being cooled, in the direction of the magnetic field applied, thereby completing the overwrite. At this time, the verification spot has reproduction power to reproduce the magneto-optical signal immediately after recording.

The light beams reflected by the magneto-optical disk are converted by the object lens 7 again into parallel beams (an overwrite beam 22-2, a verification beam 22-1) which are then reflected by the bending mirror 25 to return to the composite prism 56 of quartz. After passing through the half mirror 56-4 and the quartz prisms 56-2 and 56-3, those two beams are separated into four beams 24-1 to 24-4 as shown in FIG. 14. Beams 24-1 and 24-3 represent the overwrite beams (dotted lines), whereas 24-2 and 24-4 represent the verification beams (solid lines). These beams 24-1 to 24-4 are condensed by a condensing lens 902 onto a light detector 26. Corresponding to the four beams, the light detector 26 comprises four units of light detectors 26-1 to 26-4. Given the focal distance of the condensing lens 902 being 30 mm, the four beams are focused on the light detectors with a spacing of 300 $\mu$m between 24-1 and 24-2 and between 24-3 and 24-4 and a spacing of 600 $\mu$m between 4-2 and 24-3.

Figure 18:
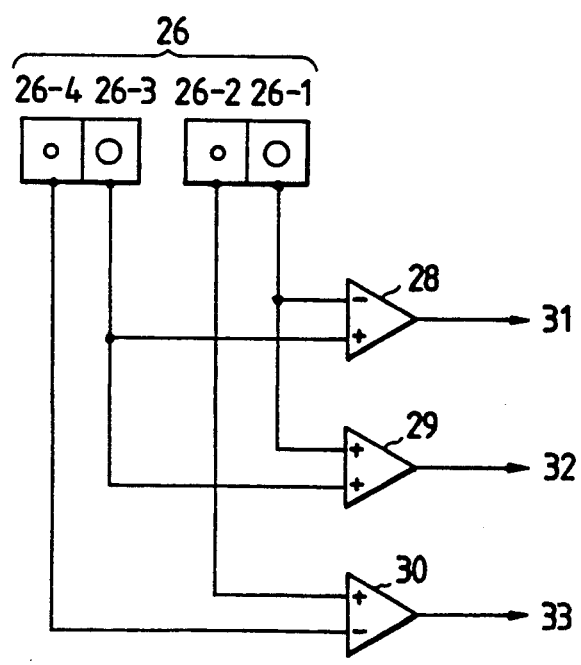
FIG. 18 is a diagram for explaining an information signal detection system in the magneto-optical disk apparatus of FIG. 16.

FIG. 18 shows a manner of detecting signals. In the case of normal reproduction, outputs from the light detectors 26-1 and 26-3 upon which the overwrite beams 24-1 and 24-3 impinge are used. Denoted by 28 is a differential amplifier which produces a magneto-optical signal 31 below based on Equations (19) and (20):

$$magneto\text{-}optical\ signal\ 31 \propto I_3^{\pm} - I_1^{\pm} \tag{23}$$

Denoted by 29 is an adder which produces a pre-format signal 32 when pre-formatted information is provided on the disk in the form of rugged pits:

$$pre\text{-}format\ signal\ 32 \propto I_3^{\pm} + I_1^{\pm} \tag{24}$$

During the overwrite period, outputs from the light detectors 26-2 and 26-4 upon which the verification beams 24-2 and 24-4 impinge are used. Denoted by 30 is a differential amplifier which produces a magneto-optical signal 33 below based on Equations (21) and (22):

$$magneto\text{-}optical\ signal\ 33 \propto I_2^{\pm} - I_4^{\pm} \tag{25}$$

Figure 19:
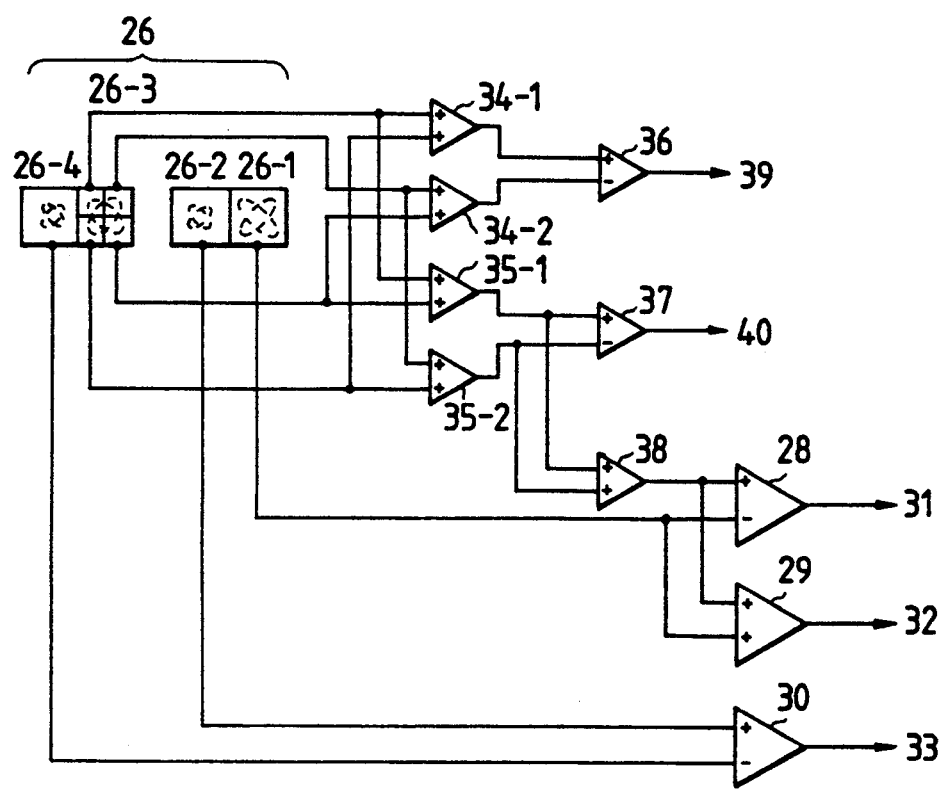
FIG. 19 is a diagram for explaining a servo signal detection system in the magneto-optical disk apparatus of FIG. 16.

Then, FIG. 19 shows a manner of detecting servo signals. When the astigmatism technique is applied to an AF system (which only requires providing a cylindrical lens or the like behind the condensing lens 902) and the push-pull technique is applied to an AT system, it is preferable that 26-1 or 26-3 upon which the overwrite beam 24-1 or 24-3 impinges is selected as a light detector for detecting servo signals. In the embodiment of FIG. 16, particularly, since 24-3 has the smaller angle of view with respect to the condensing lens 902, a light spot suitable for obtaining the servo signals is formed on 26-3.

The light detector 26-3 is further divided into four parts. As regards to AT, the sums of the outputs of every two light detector parts, which are divided by a division line resulting from projection of a diffraction pattern from the track, are respectively taken by adders 34-1 and 34-2, following which an AT signal 39 is obtained through a differential amplifier 36. As regards to AF, the sums of outputs of every two light detector parts, which are located in diagonal relation to each other, are respectively taken by adders 35-1 and 35-2, following which an AF signal 40 is obtained through a differential amplifier 37. Those servo signals are derived in bands separate from the magneto-optical signal 31 and the pre-format signal 32. Denoted by 38 is an adder which outputs the sum of the four light detector parts, the sum corresponding to the output of the light detector 26-3 in FIG. 18.

Figure 20:
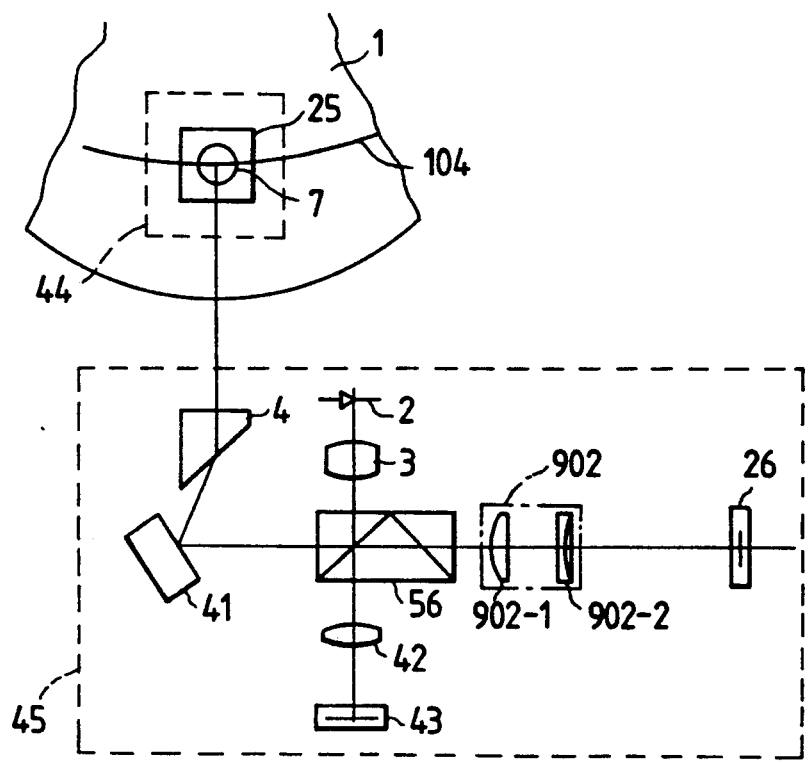
FIG. 20 is a diagram of another embodiment of the magneto-optical disk apparatus using the optical system of the present invention shown in FIG. 12.

FIG. 20 shows another embodiment of the magneto-optical disk apparatus.

Figure 16:
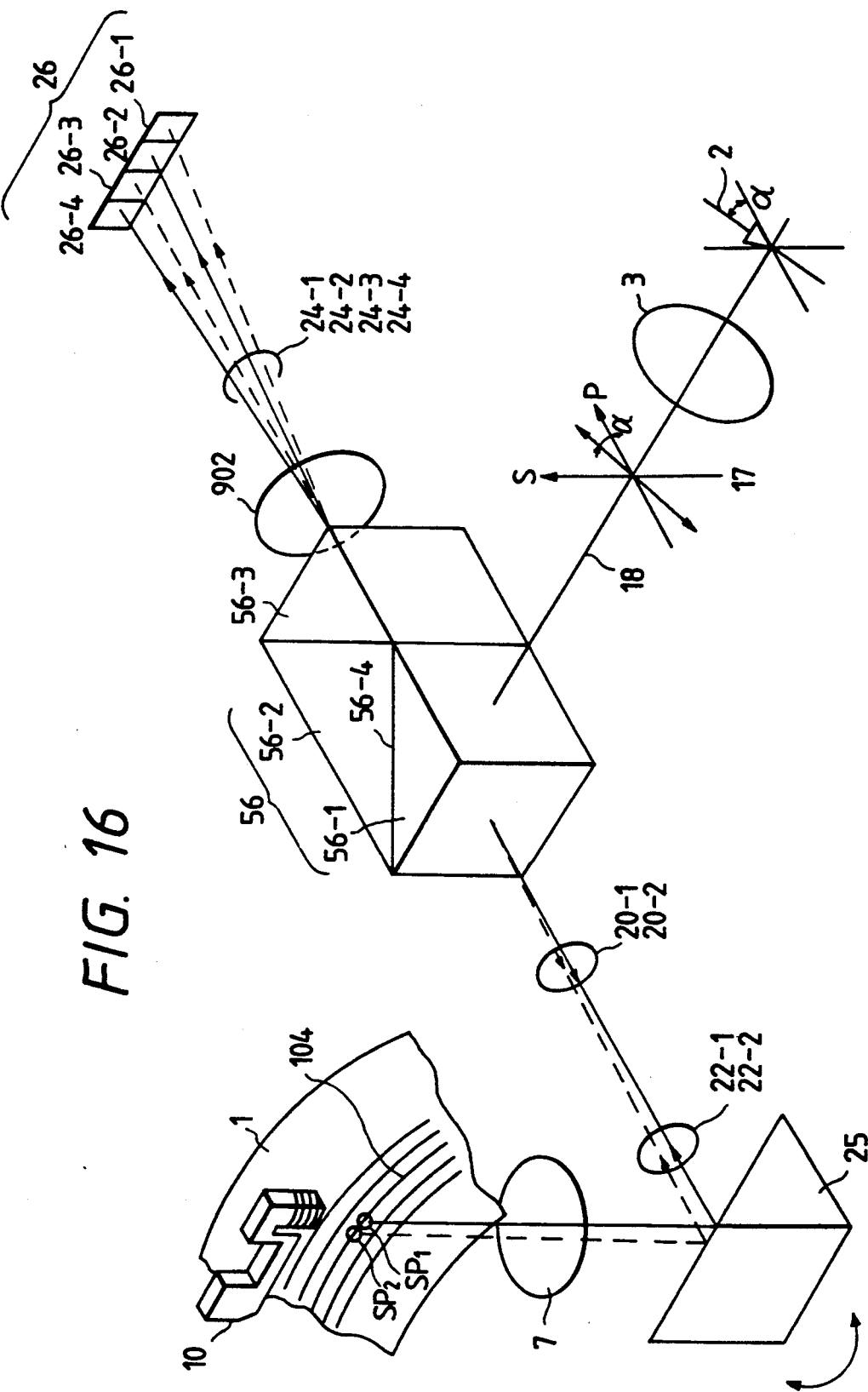
FIG. 16 is a diagram of one embodiment of a magneto-optical disk apparatus using the optical system of the present invention shown in FIG. 12.

As with the embodiment of FIG. 16, light from a semiconductor laser 2 is converted by a collimator lens 3 into a parallel beam which enters a composite prism 56 of quartz. The light beam reflected by 56 is separated into an overwrite beam and a verification beam (both not shown) which impinge upon a galvanic mirror 41. These two beams are deflected by the galvanic mirror 41 in a direction perpendicular to the track for tracking control. Denoted by 4 is a beam shaping prism for shaping each beam, which is emitted from the semiconductor laser 2 and has anisotropic four field patterns, into substantially isotropic patterns With a beam shaping ratio set to about 2, the separation angle of the overwrite beam and the verification beam becomes 15' i.e. half of the angle in the embodiment of FIG. 16, enabling narrowing a spacing between two spots on a magneto-optical disk 1. FIG. 20 also shows an example of the magneto-optical disk apparatus in which the semiconductor laser and the light detector are disposed in a stationary section 45, and a movable section 44 comprising an object lens 7 and a bending mirror 25 is used for coarse seeking in the radial direction of the disk. In this type of apparatus, arranging the beam shaping prism 4 at such a position gives rise to the following four advantages:

(1) The separation angle of the overwrite beam and the verification beam can be made smaller to moderate a demand on off-axial performance of the object lens 7;

(2) With the smaller separation angle, fluctuations in distribution of the light amount over the entrance pupil of the object lens 7, depending on whether the movable section 44 is in an inner peripheral area of the disk or in an outer peripheral area thereof, can be reduced so that the light spots are satisfactorily focused on the disk 1;

(3) The narrower spot spacing on the disk can moderate a demand on inclining accuracy of the bending mirror 25. (The accuracy only half of that in the embodiment of FIG. 16 is sufficient); and (4) Since the separation angle of the two beams for providing the magneto-optical signal remains the same as in the embodiment of FIG. 16, the wide beam spacing can be taken on the light detector. (This permits shortening the focal distance of the condensing lens 902 and thus makes the optical system compact).

The reflected beams from the magneto-optical disk 1 enter the composite prism 56 of quartz again, like the embodiment of FIG. 16, through the object lens 7, the bending mirror 25, the beam shaping prism 4 and the galvanic mirror 41 successively. These two beams are separated into four beams each pair having the polarized directions orthogonal to each other, followed by reaching the light detector 26 through a condensing lens 902-1 and a cylindrical lens 902-2. The cylindrical lens 902-2 performs AF servo control using the astigmatism technique, and has its generatrix rotated 45° with respect to a diffraction pattern from the track.

Further, of the light emitted from the semiconductor laser 2, the beam having passed through the composite prism 56 of quartz is condensed by a lens 42 onto a light detector 43 and used for monitoring output power of the semiconductor laser.

Other embodiments according to this aspect of the present invention will be described below with reference to FIGS. 21 and 22.

Figure 21:
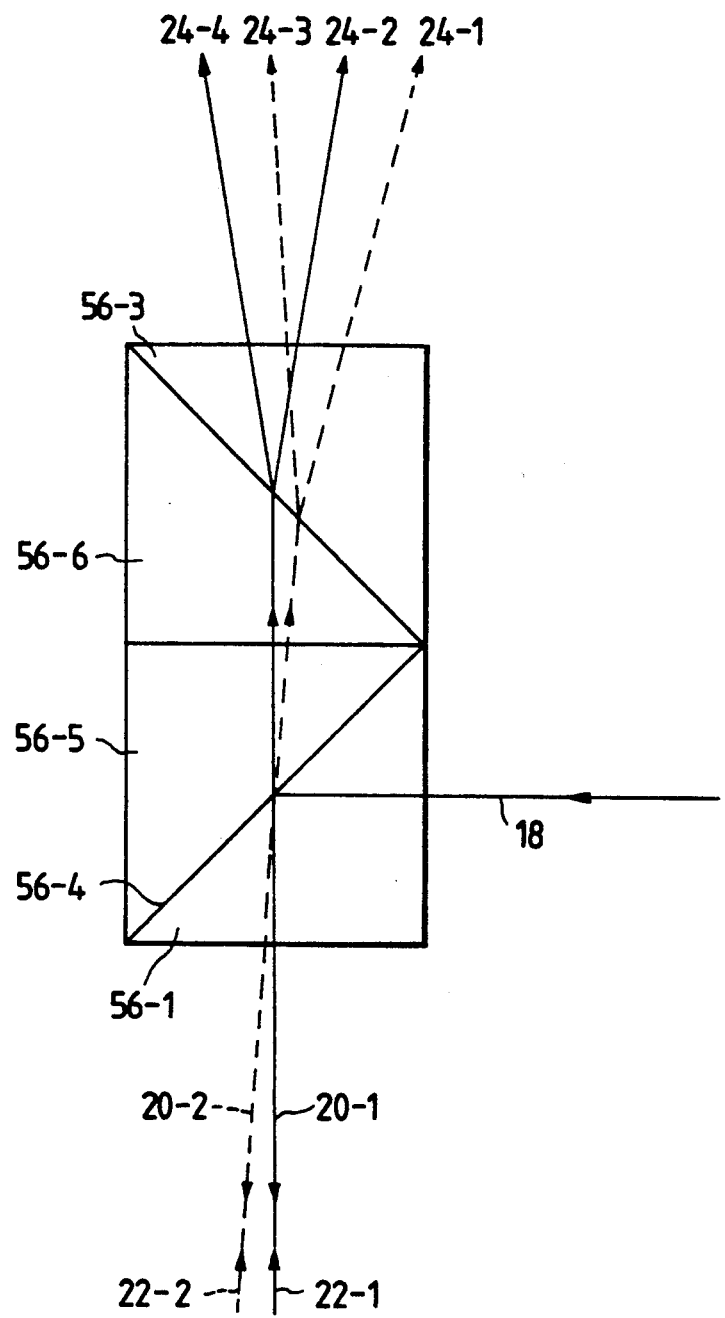
FIG. 21 is a diagram of still another embodiment of the magneto-optical disk apparatus using the optical system of the present invention shown in FIG. 12.

In FIG. 21, uniaxial crystal right-angled prisms 56-1 and 56-3 are the same as those in FIG. 14. Denoted by 56-5 and 56-6 are also uniaxial crystal right-angled prisms. The optical axis of 56-5 is, like 56-1 in FIG. 14, coincident with the propagating direction of the reflected beams 22-1 and 22-2 from the magneto-optical disk. The optical axis of 56-6 is, like 56-2 in FIG. 14, set inclined +45° from the P-axis in the plane substantially perpendicular to the reflected beams 22-1, 22-2 and also orthogonal to the direction of the optical axis of 56-3. Separation of the overwrite beam 22-2 and the verification beam 22-1 will be explained below. There occurs no new beam separation at the joined surface between 56-1 and 56-5. Because the beams enter the joined surface between 56-5 and 56-6 almost perpendicularly, no new beam separation occurs thereat either. A component $u_{o\text{-}c}\pm$ of the overwrite beam projected to the o-axis in 56-6 and then projected to the e-axis in 56-3 behaves following the Snell's law below assumptions that the incident angle upon the above joined surface is $\theta_{31}$ and the emergent angle therefrom is $\theta_{41}$, and then exits as a beam 24-1 from 56-3:

$$\theta_{31} = 90° - \theta_{21} = 90° - \theta_{11} \quad (26)$$
$$n_o \sin\theta_{31} = n_e \sin\theta_{41}$$

$$\theta_{41} = \sin^{-1}\left(\frac{n_o \cos\theta_{11}}{n_e}\right)$$

A component $u_{e\text{-}o}\pm$ of the overwrite beam projected to the e-axis in 56-6 and then projected to the o-axis in 56-3 behaves following the Snell's law below on assumptions that the incident angle upon the above is $\theta_{42}$, and then exits as a beam 24-3 from 56-3:

$$\theta_{32} = 90° - \theta_{21} = 90° - \theta_{11} \quad (27)$$
$$n_e \sin\theta_{32} = n_o \sin\theta_{42}$$

$$\theta_{42} = \sin^{-1}\left(\frac{n_e \cos\theta_{11}}{n_o}\right)$$

A component $u_{e\text{-}o}\pm'$ of the verification beam projected to the o-axis in 56-6 and then projected to the e-axis in 56-3 behaves following the Snell's law below on assumptions that the incident angle upon the above joined surface is $\theta_{33}$ and the emergent angle therefrom is $\theta_{43}$, and then exits as a beam 24-2 from 56-3:

$$\theta_{33} = 90° - \theta_0 \quad (28)$$
$$n_o \sin\theta_{33} = n_e \sin\theta_{43}$$

$$\theta_{43} = \sin^{-1}\left(\frac{n_o \cos\theta_0}{n_e}\right)$$

Further, a component $u_{e-o}\pm'$ of the verification beam projected to the e-axis in 56-6 and then projected to the o-axis in 56-3 behaves following the Snell's law below on assumptions that the incident angle upon the above joined surface is $\theta_{34}$ and the emergent angle therefrom is $\theta_{44}$, and then exits as a beam 24-4 from 56-3:

$$\theta_{34} = 90° - \theta_0 \quad (29)$$
$$n_e \sin\theta_{34} = n_o \sin\theta_{44}$$

$$\theta_{44} = \sin^{-1}\left(\frac{n_e \cos\theta_0}{n_o}\right)$$

As will be apparent from Equations (26) to (29), 22-1 and 22-2 are exited as the four beams 24-1 to 24-4 56-3. Assuming that quartz is selected as the uniaxial crystal, the refractive index $n_e$ for extraordinary rays and the refractive index $n_o$ for ordinary rays are respectively 1.54749 and 1.53859 at the semiconductor laser's wavelength of $\lambda = 790$ nm, $\theta_O$ is 45°, and $\theta_{11}$ is 45.3324°, for example, the emergent angles are given by:

$$\theta_{41} = 44.343 +$$
$$\theta_{42} = 45.000°$$
$$\theta_{43} = 44.671°$$
$$\theta_{44} = 45.332°$$

A resulting separation angle between the adjacent two beams is 0.33° in the uniaxial crystal right-angled prism 56-3 and 0.51° in air. The magneto-optical signal can be detected in a like manner to that mentioned before by referring to FIGS. 18 and 19.

In FIG. 21, the uniaxial crystal right-angled prism 56-5 may be formed of glass. In this case, by properly selecting the refractive index of glass, the emergent angles of 24-1 to 24-4 from 56-3 can be changed.

Further, in FIG. 21, 56-6 and 56-5 may not be joined to each other. Also, 56-1, 56-6 and 56-5, 56-3 may be arranged separately.

Figure 22:
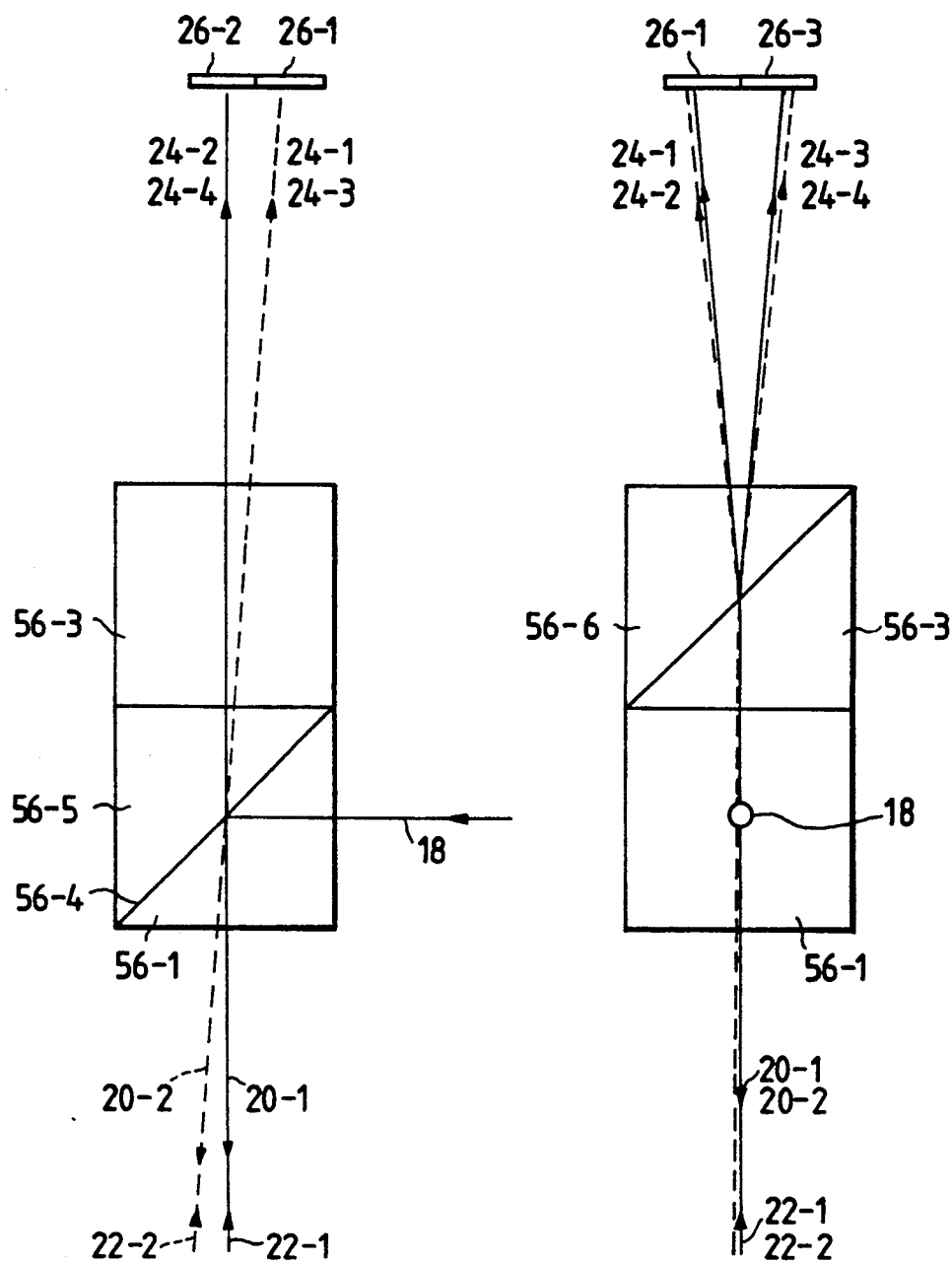
FIG. 22 is a diagram of still another embodiment of the magneto-optical disk apparatus using the optical system of the present invention shown in FIG. 12.

As an alternative arrangement, in FIG. 21, a joined member of 56-1 and 56-5 may be rotated 90° with respect to a joined member of 56-6 and 56-3 as shown in FIG. 22. This case is sometimes advantageous in layout of the light detectors because the beams 24-1 to 24-4 are not aligned on a line. In FIG. 22, 56-5 may be also formed of glass It is also possible to form either one of 56-6 and 56-3 of glass.

In the optical head for the magneto-optical recording/reproducing apparatus according to this aspect of the present invention, as described above, a light beam emitted from a semiconductor laser beam source enters a first end face of a first substantially right-angled prism made of a uniaxial crystal and part of the light beam is reflected by a second end face of the first substantially right-angled prism to exit from a third end face thereof almost perpendicular to the first end face for separation into first and second light beams having their polarized directions orthogonal to each other, the uniaxial crystal of the first substantially right-angled prism having an optical axis almost coincident with a propagating direction of the reflected light beam from the second end face, the light beam emitted from the semiconductor laser beam source having its polarized direction inclined at a predetermined angle from the optical axis of the uniaxial crystal; the first and second light beams exiting from the first substantially right-angled prism are focused by an object lens, as small first and second light spots spaced in a track moving direction, on the same track of a magneto-optical recording medium; first and second reflected light beams from the magneto-optical recording medium enter the first substantially right-angled prism from the third end face thereof, partially pass through the second end face thereof to enter a second substantially right-angled prism made of a uniaxial crystal from a first end face thereof which is joined to the second end face of the first substantially right-angled prism, emit from a second end face of the second substantially right-angled prism almost perpendicular to the first end face thereof, enter a third substantially right-angled prism made of a uniaxial crystal from a first end face thereof which is joined to the second end face of the second substantially right-angled prism, and then exit from a second end face of the third substantially right-angled prism almost perpendicularly, so that the two reflected light beams are each separated into two emergent light beams having their polarized directions orthogonal to each other, i.e., so that the first reflected light beam is separated into first and second emergent light beams and the second reflected light beam is separated into third and fourth emergent light beams; and the second substantially right-angled prism has an optical axis inclined 45° with respect to the polarized directions of the first and second light beams exiting from the third end face of the first substantially right-angled prism, the third substantially right-angled prism having an optical axis orthogonal to the optical axis of the second substantially right angled prism.

With the magneto-optical recording/reproducing apparatus using the optical system of the present invention to simultaneously permit an overwrite and a verification immediately after recording by a single laser beam source, as explained above, the light beam from the semiconductor laser can be effectively allocated to an overwrite beam and a verification beam at a predetermined ratio, making it possible to employ a semiconductor laser of low output power and a collimator lens of low N.A.

Furthermore, the spots focused from two beams can be simply arranged on the same track. The light amount ratio of one spot to the other and the spacing therebetween also can be simply kept constant. In addition, the optical system for detecting a magneto-optical signal is simplified, which leads to a reduction in the production cost.

Still another embodiment of the optical system of the present invention will be described with reference to FIGS. 23 to 27.

Figure 23:
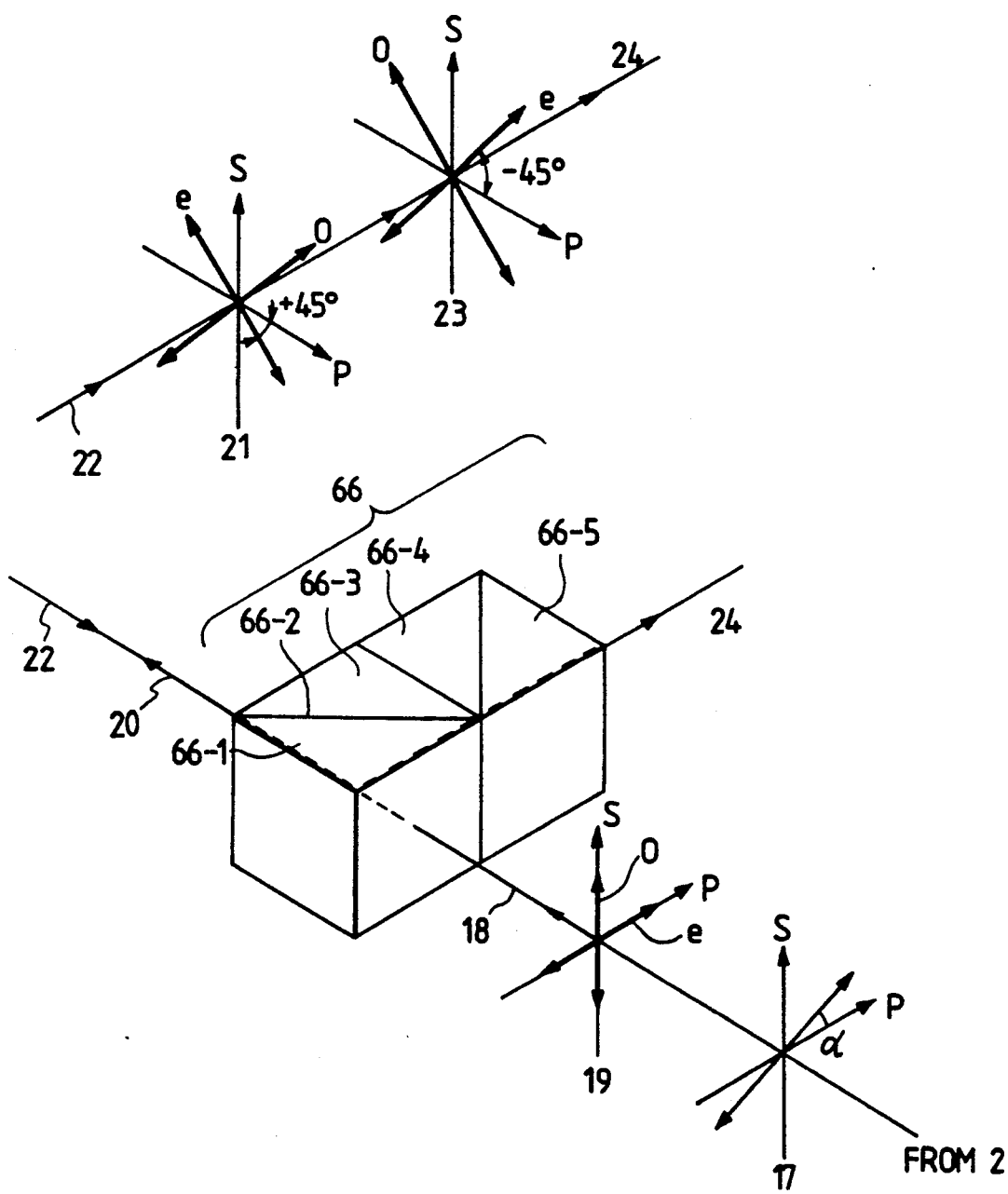
FIG. 23 is a diagram for explaining still another arrangement of an optical system for the magneto-optical recording/reproducing apparatus of the present invention.

As shown in FIG. 23, the optical system of this embodiment comprises a uniaxial crystal right-angled prism 66-1, a glass right-angled prism 66-3 and two uniaxial crystal right-angled prisms 66-4 and 66-5, all joined together, with a half mirror 66-2 evaporated on the joined surface between 66-1 and 66-3.

A light beam 18 from a semiconductor laser 2 (not shown) enters the uniaxial crystal right-angled prism 66-1. Assuming that a P-polarized direction and an S-polarized direction for the joined surface between 66-1 and 66-3 are defined as shown in a coordinate system 17, the light beam 18 has its polarized direction inclined $\alpha°$ from the P-axis. The optical axis (refractive index $n_e$ for extraordinary rays) of the uniaxial crystal 66-I is in a direction of the P-axis, for example, and will be referred to as an e-axis. Likewise, the S-axis direction exhibits a refractive index $n_o$ for ordinary rays and will be referred to as an o-axis. The light beam 18 (with an amplitude A) incident upon 66-1 is though of as having two amplitude components 27-1 and 27-2, as shown in FIG. 24:

*direction of e-axis: $A\cos\alpha$* (1)

*direction of o-axis: $A\sin\alpha$* (2)

The amplitude component 27-1 in the direction of the e-axis is subjected to an action of the refractive index $n_e$ for extraordinary rays and the amplitude component 27-2 in the direction of the o-axis is subjected to an action of the refractive index $n_o$ for ordinary rays, so that the incident beam advances through the crystal while being converted into elliptically polarized light.

A light beam 20 having passed through the half mirror 66-2 is subjected to an action of the refractive index $n_g$ of glass in the directions of both the P- and S-axes as shown in a coordinate system 21. Of the light beam 18, therefore, the beam subjected to the action of the refractive index for extraordinary rays has an emergent angle $\theta_{11}$ from the Snell's law, given an incident angle upon the half mirror 66-2 being $\theta_O$:

$$n_g \sin\theta_{11} = n_e \sin\theta_0 \tag{3}$$

$$\theta_{11} = \sin^{-1}\left(\frac{n_e \sin\theta_0}{n_g}\right)$$

Also, an emergent angle $\theta hd 12$ of the beam subjected to the action of the refractive index for ordinary rays is given by:

$$n_g \sin\theta_{12} = n_o \sin\theta_0 \tag{4}$$

$$\theta_{12} = \sin^{-1}\left(\frac{n_o \sin\theta_0}{n_g}\right)$$

It is thus found that the above two beams are separated into two polarized lights orthogonal to each other. This behavior is shown in FIG. 25. Specifically, of the light beam 18, the beam subjected to the action of the refractive index for extraordinary rays passes as a P-polarized light 20-2 through the half mirror 66-2 at the emergent angle $\theta_{11}$, whereas the beam subjected to the action of the refractive index for ordinary rays passes as an S-polarized light 20-1 through the half mirror 66-2 at the emergent angle $\theta_{12}$.

In the embodiment of FIG. 23, assuming that quartz is selected as the uniaxial crystal, glass (e.g., BaFl) meeting $n_g \simeq n_e$ is selected as vitreous material for simplicity, and the refractive index $n_e$ for extraordinary rays and the refractive index $n_o$ for ordinary rays are respectively 1.54749 and 1.53859 at the semiconductor laser's wavelength of $\lambda = 790$ nm, and the incident angle $\theta_O$ is 45°, for example, the emergent angles are given by:

$$\theta_{11} \propto 45°$$

$$\theta_{12} = 44.6714°$$

A resulting separation angle of the two beams in air becomes about 0.51°. In this way, the separation angle is determined by the refractive indexes for extraordinary rays and ordinary rays and the refractive index of the vitreous material, with the result that its variations due to manufacture errors and other causes are very small.

Angle $\Theta_O$ can be freely selected to be any angle near 45°. For example, it may be selected such that both the overwrite beam and the verification beam have their angles of view almost equal to each other with respect to an object lens (not shown) for condensing light spots on a magneto-optical disk as a magneto-optical recording medium. Moreover, the emergent end face of 66-3 may be inclined on the order of 1° to 2° so that light beams returning from the beam exit surface of 66-3 will not enter light detectors (not shown).

The light amount ratio of the reflected light beam 20-1 to 20-2 can be selected by changing $\alpha$. The light amount ratio of the overwrite spot to the verification spot is expressed below from above Equations (1) and (2):

$$\frac{1}{\tan^2\alpha} \tag{5}$$

The light amount ratio is determined depending on the accuracy of $\alpha$ and thus can be adjusted simply and precisely. When the light amount ratio of 7 is desired, by way of example, it is required to set $\alpha = 20.7°$. In this case, the over-write spot is O-polarized light and the verification spot is S-polarized light. Of course, by selecting $\alpha$ at an angle near 90°, the above relationship can be reversed such that the overwrite spot is S-polarized light and the verification spot is P-polarized light.

Although 66-2 is explained as a half mirror for the sake of brevity, the present invention is not limited to the half mirror. Assuming that transmissivity for the amplitude of the P-polarized light is $t_p$ and transmissivity for the amplitude of the S-polarized light is $t_s$, above Equations (1) and (2) are rewritten to:

*direction of e-axis: $At_p \cos\alpha$* (1')

*direction of x-axis: $At_s \sin\alpha$* (2')

From these Equations (1') and (2'), the light amount ratio is given by:

$$\frac{t_p^2}{t_s^2 \tan^2\alpha} \tag{5'}$$

Accordingly, the light amount ratio can be freely selected by changing the transmissivity $t_p$ for the amplitude of the P-polarized light, the transmissivity $t_s$ for the amplitude of the S-polarized light, and the inclination $\alpha$ with respect to the optical axis of the incident light beam 18. Element 66-2 may be either a non-polarizing beam splitter ($t_p^2 = t_s^2$) or a polarizing beam splitter ($t_p^2 \neq t_s^2$). Further, in the embodiment of FIG. 23, with $t_p^2$ set to a relatively large value, the light beam from the semiconductor laser can be utilized effectively during a period of overwrite.

As explained above, by making the incident light beam enter the uniaxial crystal right-angled prism 66-1 with the polarization plane thereof inclined at a predetermined angle from the optical axis, and introducing the light beam passed through the half mirror into the glass, the over-write spot and the verification spot can be separated from each other at a desired light amount ratio.

The following is a description about detection of a magneto-optical signal by the optical system of this embodiment. It is supposed that, in FIGS. 23 and 25, light beams reflected by the magneto-optical disk (not shown) are 22-1 and 22-2. More specifically, 22-2 is an overwrite beam which is used to reproduce the magneto-optical signal during a period of normal data reading. Beam 22-1 is a verification beam which is used to reproduce the magneto-optical signal immediately after recording in the overwrite period. The uniaxial crystal right-angled prism 66-4 is set such that, as shown in a coordinate system 21, its optical axis (e-axis) is inclined $+45°$ from the P-axis in a plane perpendicular to the light beam 22.

Furthermore, the uniaxial crystal right-angled prism 66-5 is set such that, as shown in a coordinate system 23, its optical axis (e-axis) is inclined $-45°$ from the P-axis in the plane perpendicular to the light beam 22 and is also perpendicular to the optical axis of the uniaxial crystal right-angled prism 66-4.

Detection of the magneto-optical signal for each of the two beams will be explained below by referring to FIG. 26. For the sake of brevity, it is supposed that the light amount of the verification beam 22-1 during the overwrite period is equal to the light amount of the overwrite beam 22-2 during the normal reproduction period, amplitude reflectivity for the components of both the beams 22-1 and 22-2 in the polarized directions of the incident beams upon the magneto-optical disk (S-polarization for the verification beam and P-polarization for the overwrite beam) is R, and amplitude reflectivity of the components produced by a Kerr effect in the polarized directions perpendicular to the above ones is K. Given a Kerr's rotation angle being $\pm\theta_k$, the following equation holds:

$$\frac{\pm K}{R} = \tan(\pm\theta_k) \qquad (6)$$

The overwrite beam 22-2 will now be explained using (1) and (2) in FIG. 26. The light beam 22-2 enters the glass right-angled prism 66-3 and its P- and S-polarized components are both subjected to the action of the refractive index $n_g$ of glass. Then, the light beam is reflected by the half mirror 66-2 and enters the uniaxial crystal right-angled prism 66-4. As shown in FIG. 26(1), an amplitude component $u_o^+$ projected to the o-axis is expressed below when the Kerr's rotation angle is $+\theta_k$;

$$u_o^+ = \frac{1}{\sqrt{2}}(R-K) \qquad (7)$$

and is expressed below when the Kerr's rotation angle is $-\theta_k$:

$$u_o^- = \frac{1}{\sqrt{2}}(R+K) \qquad (8)$$

The amplitude component $u_o^\pm$ projected to the o-axis behaves following the Snell's law below an assumptions that the incident angle upon the uniaxial crystal right-angled prism 66-4 is $45°-\theta_{11}$ and the emergent angle therefrom is $\theta_{21}$;

$$n_o\sin_{21} = n_g\sin(45° - \theta_{11}) \qquad (9)$$

$$\theta_{21} = \sin^{-1}\left(\frac{n_g\sin(45° - \theta_{11})}{n_o}\right)$$

$$\approx 0$$

and thus advances nearly straightforward.

Also, as shown in FIG. 26(2), an amplitude component $u_e$ projected to the e-axis is expressed below when the Kerr's rotation angle is $\pm\theta_k$ (Equation holds for each corresponding one of double signs);

$$u_e^\pm = \frac{1}{\sqrt{2}}(R \pm K) \qquad (10)$$

The amplitude component $u_e^\pm$ projected to the e-axis behaves following the Snell's law below on assumptions that the incident angle upon the uniaxial crystal light-angled prism 66-4 is $45°-\theta_{11}$ and the emergent angle therefrom is $\theta_{22}$;

$$n_e\sin_{22} = n_g\sin(45° - \theta_{11}) \qquad (11)$$

$$\theta_{22} = \sin^{-1}\frac{n_g\sin(45° - \theta_{11})}{n_e}$$

$$\approx 0$$

and thus $u_e^\pm$ is not separated from $u_o^\pm$ and advances nearly straightforward.

Next, the verification beam 22-1 will be explained using (3) and (4) in FIG. 26. The light beam 22-1 enters the glass right-angled prism 66-3 and its P- and S-polarized components are both subjected to the action of the refractive index $n_g$ of glass. Then, the light beam is reflected by the half mirror 66-2 and enters the uniaxial crystal right-angled prism 66-4. As shown in FIG. 26(3), an amplitude component $u_o'$ projected to the o-axis is expressed below when the Kerr's rotation angle is $\pm\theta_k$ (Equation holds for each corresponding one of double signs);

$$u_o^{\pm\prime} = \frac{1}{\sqrt{2}}(R \pm K) \qquad (12)$$

The amplitude component $u_o^{\pm\prime}$ projected to the o-axis behaves following the Snell's law below on assumptions that the incident angle upon the uniaxial crystal right-angled prism 66-4 is $45°-\theta_{12}$ and the emergent angle therefrom is $\theta_{23}$:

$$n_o\sin_{23} = n_g\sin(45° - \theta_{12}) \qquad (13)$$

$$\theta_{23} = \sin^{-1}\left(\frac{n_g\sin(45° - \theta_{12})}{n_o}\right)$$

Also, as shown in FIG. 26(4), an amplitude component $u_e^{\pm\prime}$ projected to the e-axis is expressed below when the Kerr's rotation angle is $\pm\theta_k$ (Equation holds for each corresponding one of double signs);

$$u_e^{\pm\prime} = \frac{1}{\sqrt{2}}(R \mp K) \qquad (13')$$

The amplitude component $u_e^{\pm\prime}$ projected to the e-axis behaves following the Snell's law below on assumptions that the incident angle upon the uniaxial crystal right-angled prism 66-4 is $45° - \theta_{12}$ and the emergent angle therefrom is $\theta_{24}$;

$$n_e \sin\theta_{24} = n_g \sin(45° - \theta_{12}) \quad (14)$$

$$\theta_{24} = \sin^{-1}\left(\frac{n_g \sin(45° - \theta_{12})}{n_e}\right)$$

$$\approx 45° - \theta_{12}$$

and thus separates from $u_o^{\pm\prime}$ slightly.

There will be further explained refraction of the beams at the joined surface between the uniaxial crystal right-angled prisms 66-4 and 66-5. A component $u_{o\text{-}e}^\pm$ of the overwrite beam projected to the o-axis in 66-4 and then projected to the e-axis in 66-5 behaves following the Snell's law below on assumptions that the incident angle upon the above joined surface is $\theta_{31}$ and the emergent angle therefrom is $\theta_{41}$, and then exits as a beam 24-1 from 66-5:

$$\theta_{31} = 45° + \theta_{21} \quad (15)$$

$$n_o \sin\theta_{31} = n_e \sin\theta_{41}$$

$$\theta_{41} = \sin^{-1}\left(\frac{n_o \sin\theta_{31}}{n_e}\right) \approx \sin^{-1}\left(\frac{n_o \sin 45°}{n_e}\right)$$

A component $u_{e\text{-}o}^\pm$ of the overwrite beam projected to the e-axis in 66-4 and then projected to the o-axis in 66-5 behaves following the Snell's law below on assumptions that the incident angle upon the above joined surface is $\theta_{32}$ and the emergent angle therefrom is $\theta_{42}$, and then exits as a beam 24-3 from 66-5:

$$\theta_{32} = 45° + \theta_{22} \quad (16)$$

$$n_e \sin\theta_{32} = n_o \sin\theta_{42}$$

$$\theta_{42} = \sin^{-1}\left(\frac{n_e \sin\theta_{32}}{n_o}\right) \approx \sin^{-1}\left(\frac{n_e \sin 45°}{n_o}\right)$$

A component $u_{o\text{-}e}^{\pm\prime}$ of the verification beam projected to the o-axis in 66-4 and then projected to the e-axis in 66-5 behaves following the Snell's law below on assumptions that the incident angle upon the above joined surface is $\theta_{33}$ and the emergent angle therefrom is $\theta_{43}$, and then exits as a beam 24-2 from 66-5:

$$\theta_{33} = 45° + \theta_{23} \quad (17)$$

$$n_o \sin\theta_{33} = n_e \sin\theta_{43}$$

$$\theta_{43} = \sin^{-1}\left(\frac{n_o \sin\theta_{33}}{n_e}\right)$$

$$= \sin^{-1}\left(\frac{n_o \sin(45° + \theta_{23})}{n_e}\right)$$

Further, a component $u_{e\text{-}o}^{\pm\prime}$ of the verification beam projected to the e-axis in 66-4 and then projected to the o-axis in 66-5 behaves following the Snell's law below on assumptions that the incident angle upon the above joined surface is $\theta_{34}$ and the emergent angle therefrom is $\theta_{44}$, and then exit as a beam 24-4 from 66-5:

$$\theta_{34} = 45° + \theta_{44} \quad (18)$$

$$n_e \sin\theta_{34} = n_o \sin\theta_{44}$$

$$\theta_{44} = \sin^{-1}\left(\frac{n_e \sin\theta_{34}}{n_o}\right)$$

$$\approx \sin^{-1}\left(\frac{n_e \sin(90° - \theta_{12})}{n_o}\right)$$

As will be apparent from Equations (15) to (18), the four beams 24-1 to 24-4 are exited from 66-5.

In the embodiment of FIG. 23, assuming that quartz is selected as the uniaxial crystals 66-1, 66-4 and 66-5, glass meeting $n_g \approx n_e$ is selected as vitreous material of the glass prism 66-3, the refractive index $n_e$ for extraordinary rays and the refractive index $n_o$ for ordinary rays are respectively 1.54749 and 1.53859 at the semiconductor laser's wavelength of $\lambda = 790$ nm, $\theta_o$ is 45°, and $\theta_{12}$ is 44.6714°, for example, the emergent angles are given by:

$$\theta_{41} = 44.671°$$

$$\theta_{42} = 44.998°$$

$$\theta_{43} = 45.332°$$

$$\theta_{44} = 45.554°$$

A resulting separation angle is 0.33° in the uniaxial crystal 66-5 and 0.51° in air.

In this way, the overwrite beam and the verification beam can be each separated into two beams, making it possible to detect the magneto-optical signal for each beam.

Calculating the intensities of the four beams, as regards to the overwrite beam, the intensities $I_1^\pm$, $I_3^\pm$ of the components (beams 24-1 and 24-3) projected to the o-axis and the e-axis in opposite orders are expressed by;

$$I_1^\pm = \{u_{o\text{-}c}^\pm\}^2 = \tfrac{1}{4}(R \mp K)^2 = \tfrac{1}{4}(R^2) \mp RK \quad (19)$$

$$I_3^\pm = \{u_{c\text{-}o}^\pm\}^2 = \tfrac{1}{4}(R \pm K)^2 = \tfrac{1}{4}(R^2) \pm RK \quad (20)$$

where $R^2 >> K^2$ is assumed; the magneto-optical signal is obtained by differentially amplifying those two components.

Likewise, as regards to the verification beam, the intensities $I_2^\pm$, $I_4^\pm$ of the components (beams 24-2 and 24-4) projected to the o-axis and the e-axis in opposite orders are expressed by:

$$I_2^\pm = \{u_{o\text{-}c}^{\pm\prime}\}^2 = \tfrac{1}{4}(R \pm K)^2 = \tfrac{1}{4}(R^2) \pm RK \quad (21)$$

$$I_4^\pm = \{u_{c\text{-}o}^{\pm\prime}\}^2 = \tfrac{1}{4}(R \pm K)^2 = \tfrac{1}{4}(R^2) \mp RK \quad (22)$$

where $R^2 >> K^2$ is assumed; the magneto-optical signal is obtained by differentially amplifying those two components.

Note that although the uniaxial crystal prisms 66-2 and 66-5 are handled as right-angled prisms in the foregoing explanation of FIG. 23 for simplicity of calculations, the present invention is not limited to the use of the right-angled prisms.

As described above, a single light beam is separated by the uniaxial crystal prism 66-1 and the glass prism 66-3 into the overwrite beam and the verification beam which are polarized in directions orthogonal to each other and have a predetermined light amount ratio, followed by entering the magneto-optical disk such that the two beams are condensed as an overwrite spot and a verification spot on the disk The respective beams reflected by the disk are passed through the glass prism 66-3, the uniaxial crystal right-angled prism 66-4 which has the optical axis inclined by an angle of 45° with respect to the polarized direction of the incident beams upon the magneto-optical disk in the plane perpendicular to the reflected beams, and further through the uniaxial crystal right-angled prism 66-5 which is joined to 66-4 and has the optical axis perpendicular that of 66-4, thereby being separated into four beams each pair having the polarized directions orthogonal to each other. From differential outputs of those two paired beams, the magneto-optical signal can be obtained for each of the overwrite beams and the verification beam.

Next, a magneto-optical disk apparatus using the optical system of this embodiment will be described with reference to FIG. 27.

Light from a semiconductor laser 2 is converted by a collimator lens 3 into a parallel beam which enters a composite prism 66 of quartz and glass. The polarized direction of the semiconductor laser 2 is inclined 20.7° from the P-axis on a coordinate system 17 defined, as shown, by the P-and S-polarized directions for the prism 66. A quartz prism 66-1 has its optical axis in the direction of the P-axis with a half mirror 66-2 ($t_p^2=0.5$, $t_s^2=0.5$) evaporated on the joined surface between the quartz prism 66-1 and a glass prism 66-3. The light beam having passed through 66-2 is separated into a P-polarized beam 20-2 and an S-polarized beam 20-1, followed by exiting from 66-3. When the P-polarized beam (dotted line) is used as an overwrite beam and the S-polarized beam (solid line) is used as a verification beam, the light amount ratio of the overwrite beam to the verification beam is 7:1 and the separation angle therebetween is about 30'. The beams bent by a bending mirror 25 toward an object lens 7 are focused by the object lens 7 as an overwrite spot SP$_2$ and a verification spot SP$_1$ on a track 104 of a magneto-optical disk 1. These two spots are correctly positioned on a desired track by an actuator (not shown) holding the object lens 7.

Figure 28:
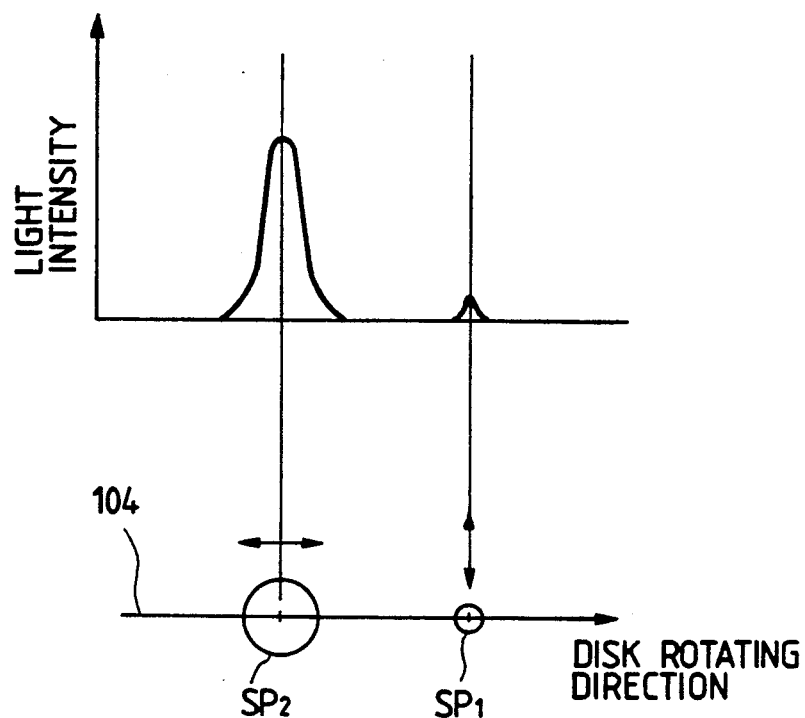
FIG. 28 is a diagram for explaining spots on a track in the magneto-optical disk apparatus of FIG. 27.

FIG. 28 schematically shows states of the overwrite spot SP$_2$ and the verification spot SP$_1$ focused on the track 104 of the magneto-optical disk 1 As shown, SP$_2$ is located on the upstream side in the disk rotating direction and SP$_1$ is located on the downstream side. With the above arrangement, because positioning accuracy of the two spots with respect to the track 104 can be determined by inclining accuracy of the bending mirror 25, the precise alignment can be simply achieved.

Figure 27:
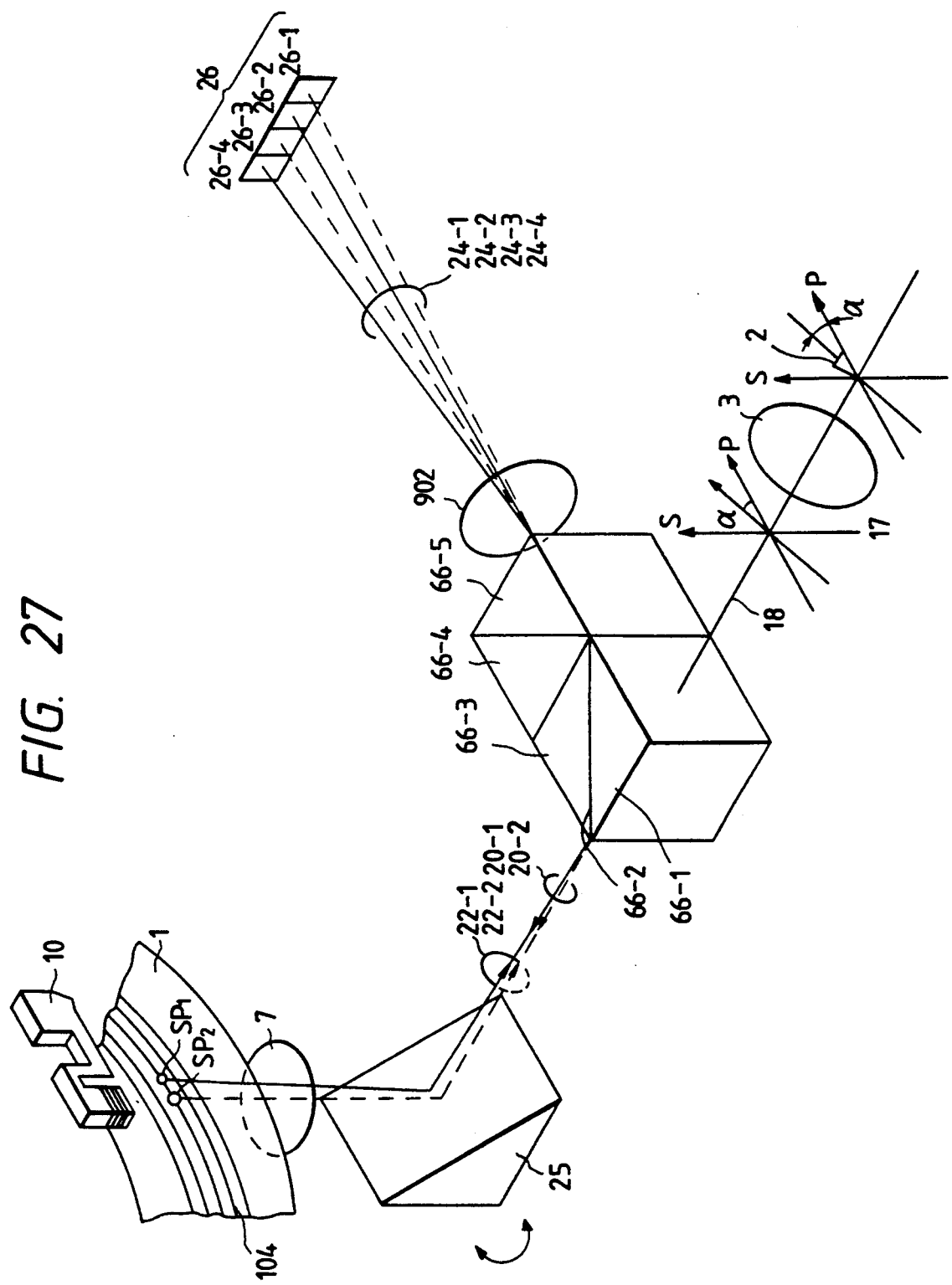
FIG. 27 is a diagram of one embodiment of a magneto-optical disk apparatus using the optical system of the present invention shown in FIG. 23.

In the case of the embodiment shown in FIG. 27, the overwrite spot is polarized parallel to the track and the verification spot is polarized perpendicular to the track.

As with the prior art of FIG. 2, during a period of normal reproduction, the semiconductor laser 2 is operated to emit the beam at low power and the overwrite spot SP$_2$ is used as a reproduction spot. In the case of this low power operation, the verification spot SP$_1$ is not used.

During a period of overwrite, the semiconductor laser 2 is operated to emit the beam at high power and SP$_2$ is used as an overwrite spot. Upon irradiation of the laser beam at high power, the temperature of the aforesaid magneto-optical film 101 is raised to lower a degree of magnetization and coercive force so that the information already recorded on the disk is erased. Simultaneously, when a magnetic field with its polarity inverted depending on the information to be recorded is applied by a magnetic head 10, the magneto-optical film 101 is fixedly magnetized, while being cooled, in the direction of the magnetic field applied, thereby completing the overwrite. At this time, the verification spot has reproduction power to reproduce the magneto-optical signal immediately after recording.

The light beams reflected by the magneto-optical disk are converted by the object lens 7 again into parallel beams (an overwrite beam 22-2, a verification beam 22-1) which are then reflected by the bending mirror 25 to return to the composite prism 66 of quartz and glass. After being reflected by the half mirror 66-2 and then passing through the quartz prisms 66-4 and 66-5, those two beams are separated into four beams 24-1 to 24-4 as shown in FIG. 25. Beams 24-1 and 24-3 represent the overwrite beams (dotted lines), whereas 24-2 and 24-4 represent the verification beams (solid lines). These beams 24-1 to 24-4 are condensed by a condensing lens 902 onto a light detector 26. Corresponding to the four beams, the light detector 26 comprises four units of light detectors 26-1 to 26-4. Given the focal distance of the condensing lens 902 being 30 mm, the four beams are focused on the light detectors with a spacing of 300 μm therebetween.

Figure 29:
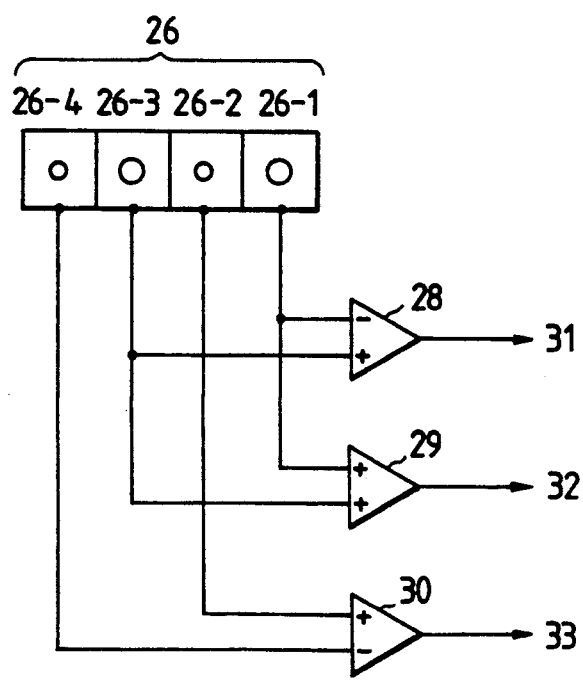
FIG. 29 is a diagram for explaining an information signal detection system in the magneto-optical disk apparatus of FIG. 27.

FIG. 29 shows a manner of detecting signals. In the case of normal reproduction, outputs from the light detectors 26-1 and 26-3 upon which the overwrite beams 24-1 and 24-3 impinge are used. Denoted by 28 is a differential amplifier which produces a magneto-optical signal 31 below based on Equations (19) and (20):

$$magneto\text{-}optical\ signal\ 31 \propto I_3^{\pm} - I_1^{\pm} \qquad (23)$$

Denoted by 29 is an adder which produces a pre-format signal 32 when pre-formatted information is provided on the disk in the form of rugged pits:

$$pre\text{-}format\ signal\ 32 \propto I_3^{\pm} + I_1^{\pm} \qquad (24)$$

During the overwrite period, outputs from the light detectors 26-2 and 26-4 upon which the verification beams 24-2 and 24-4 impinge are used. Denoted by 30 is a differential amplifier which produces a magneto-optical signal 33 below based on Equations (21) and (22):

$$magneto\text{-}optical\ signal\ 33 \propto I_2^{\pm} - I_4^{\pm} \qquad (25)$$

Figure 30:
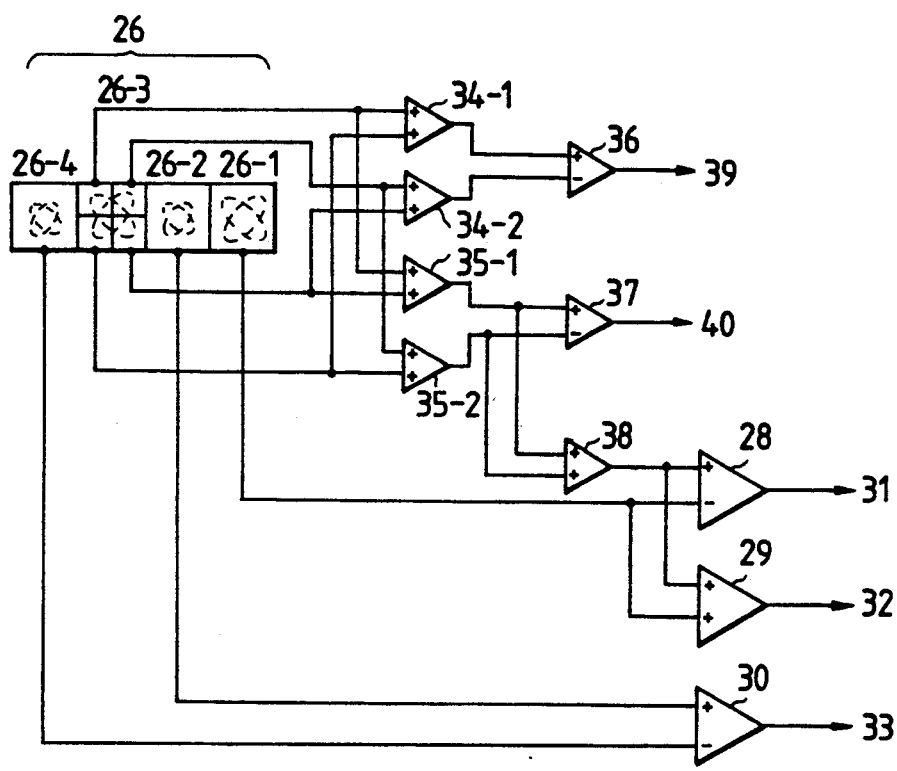
FIG. 30 is a diagram for explaining a servo signal detection system in the magneto-optical disk apparatus of FIG. 27.

Then, FIG. 30 shows a manner of detecting servo signals. When the astigmatism technique is applied to an AF system (which only requires providing a cylindrical lens or the like behind the condensing lens 901) and the push-pull technique is applied to an AT system, it is preferable that 26-1 or 26-3 upon which the overwrite beam 24-1 or 24-3 impinges is selected as a light detector for detecting servo signals. In the embodiment of FIG. 27, particularly, since 24-3 has the smaller angle of view with respect to the condensing lens 902, a light spot suitable for obtaining the servo signals is formed on 26-3.

The light detector 26-3 is further divided into four parts. As regards to AT, the sums of the outputs of every two light detector parts, which are divided by a division line resulting by projection of a diffraction pattern from the track, are respectively taken by adders 34-1 and 34-2, following which an AT signal 39 is obtained through a differential amplifier 36. As regards to AF, the sums of the outputs of every two light detector parts, which are located in diagonal relation to each other, are respectively taken by adders 35-1 and 35-2, following which an AF signal 40 is obtained through a differential amplifier 37. Those servo signals are derived in bands separate from the magneto-optical signal 31 and the pre-format signal 32. Denoted by 38 is an adder which outputs the sum of the four light detector parts, the sum corresponding to the output of the light detector 26-3 in FIG. 29.

Figure 31:
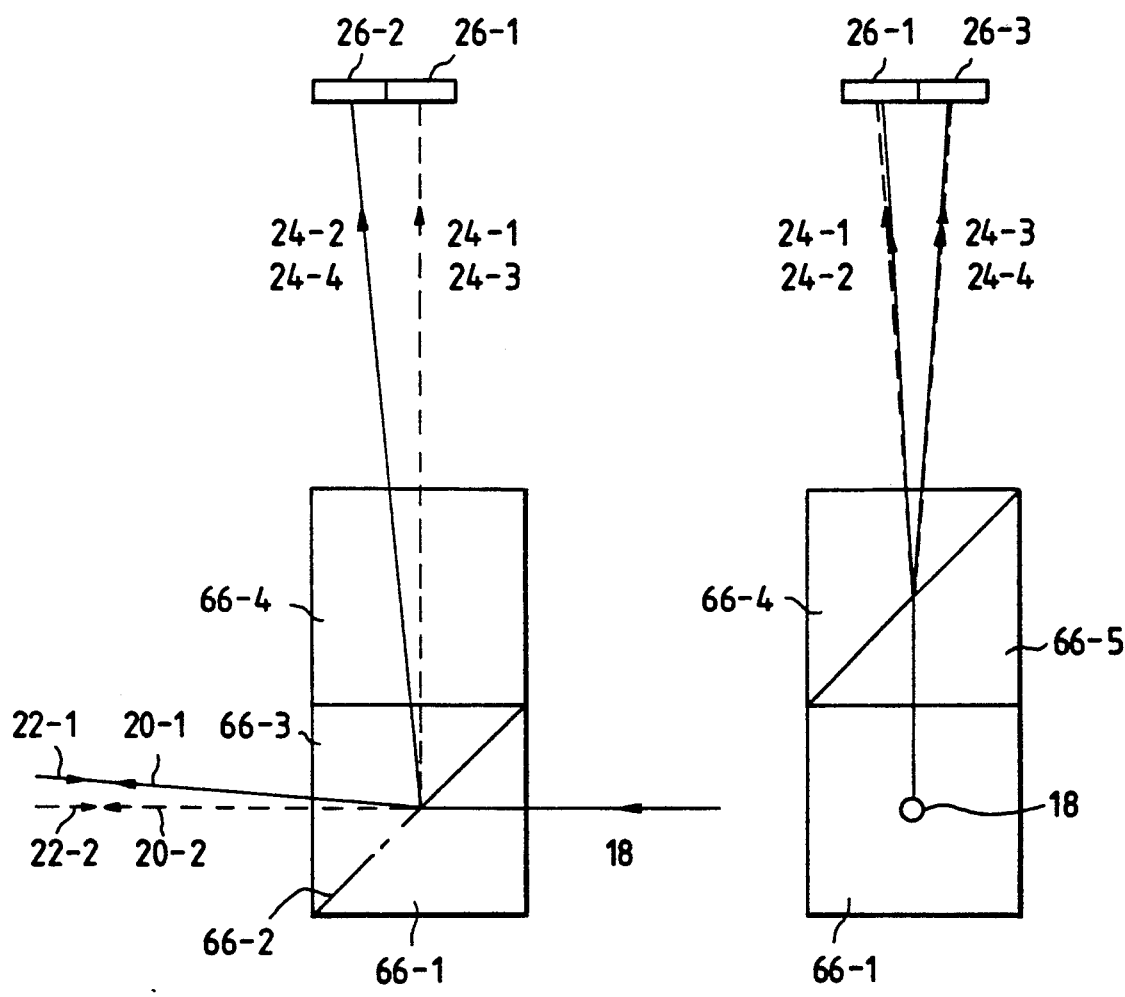
FIG. 31 is a diagram of another embodiment of the magneto-optical disk apparatus using the optical system of the present invention shown in FIG. 23.

Further, in FIG. 23, 66-3 and 66-4 may not be joined to each other. Also, 66-1, 66-3 and 66-4, 66-5 may be arranged separately. As an alternative arrangement, a joined member of 66-1 and 66-3 may be rotated 90° with respect to a joined member of 66-4 and 66-5, as shown in FIG. 31, from the joined relation of FIG. 23. This case is sometimes advantageous in layout of the light detectors because the beams 24-1 to 24-4 are not aligned on a line. In the case of FIG. 31, four beams can be obtained even if either one of 66-4 and 66-5 is formed of glass.

Figure 32:
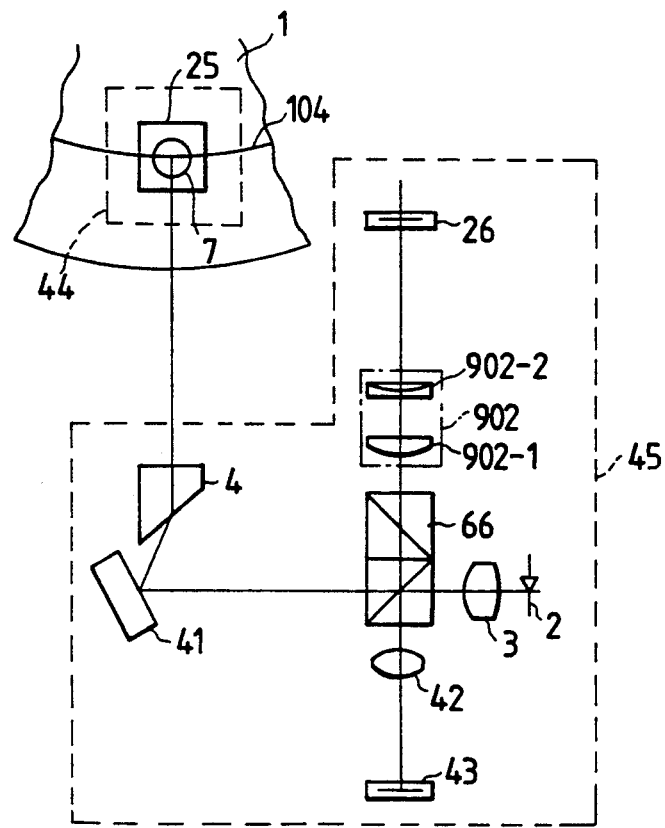
FIG. 32 is a diagram of still another embodiment of the magneto-optical disk apparatus using the optical system of the present invention shown in FIG. 23.

FIG. 32 shows another embodiment of the magneto-optical disk apparatus.

As with the embodiment of FIG. 27, light from a semiconductor laser 2 is converted by a collimator lens 3 into a parallel beam which enters a composite prism 66 of quartz and glass. The light beam having passed through 66 is separated into an overwrite beam and a verification beam (both not shown) which impinge upon a galvanic mirror 41. These two beams are deflected by the galvanic mirror 41 in a direction perpendicular to the track for tracking control. Denoted by 4 is a beam shaping prism for shaping each beam, which is emitted from the semiconductor laser 2 and has anisotropic four field patterns, into substantially isotropic patterns. With a beam shaping ratio set to about 2, the separation angle of the overwrite beam and the verification beam becomes 15', i.e., half of the angle in the embodiment of FIG. 27, enabling narrowing a spacing between two spots on a magneto-optical disk 1. FIG. 32 also shows an example of the magneto-optical disk apparatus in which the semiconductor laser and the light detector are disposed in a stationary section 45, and a movable section 44 comprising an object lens 7 and a bending mirror 25 is used for coarse seeking in the radial direction of the disk. In this type apparatus, arranging the beam shaping prism 4 at such a position gives rise to the following four advantages:

(1) The separation angle of the overwrite beam and the verification beam can be made smaller to moderate a demand on off-axial performance of the object lens 7;

(2) With the smaller separation angle, fluctuations in distribution of the light amount over the entrance pupil of the object lens 7, depending on whether the movable section 44 is in an inner peripheral area of the disk or in an outer peripheral area thereof, can be reduced so that the light spots are satisfactorily focused on the disk 1;

(3) The narrower spot spacing on the disk can moderate a demand on inclining accuracy of the bending mirror 25. (The accuracy only half of that in the embodiment of FIG. 27 is sufficient); and (4) Since the separation angle of the two beams for providing the magneto-optical signal remains the same as in the embodiment of FIG. 27, the wide beam spacing can be taken on the light detector. (This permits shortening the focal distance of the condensing lens 902 and thus makes the optical system compact).

The reflected beams from the magneto-optical disk 1 enter the composite prism 66 of quartz and glass again, like the embodiment of FIG. 27, through the object lens 7, the bending mirror 25, the beam shaping prism 4 and the galvanic mirror 41 successively. These two beams are separated into four beams each pair having the polarized directions orthogonal to each other, followed by reaching the light detector 26 through a condensing lens 902-1 and a cylindrical lens 902-2. The cylindrical lens 902-2 performs AF servo control using the astigmatism technique, and has its generatrix rotated 45° with respect to a diffraction pattern from the track.

Further, of the light emitted from the semiconductor laser 2, the beam reflected by the composite prism 66 of quartz and glass is condensed by a lens 42 onto a light detector 43 and used for monitoring output power of the semiconductor laser.

Still another embodiment according to this aspect of the present invention will be described below with reference to FIG. 33.

Figure 33:
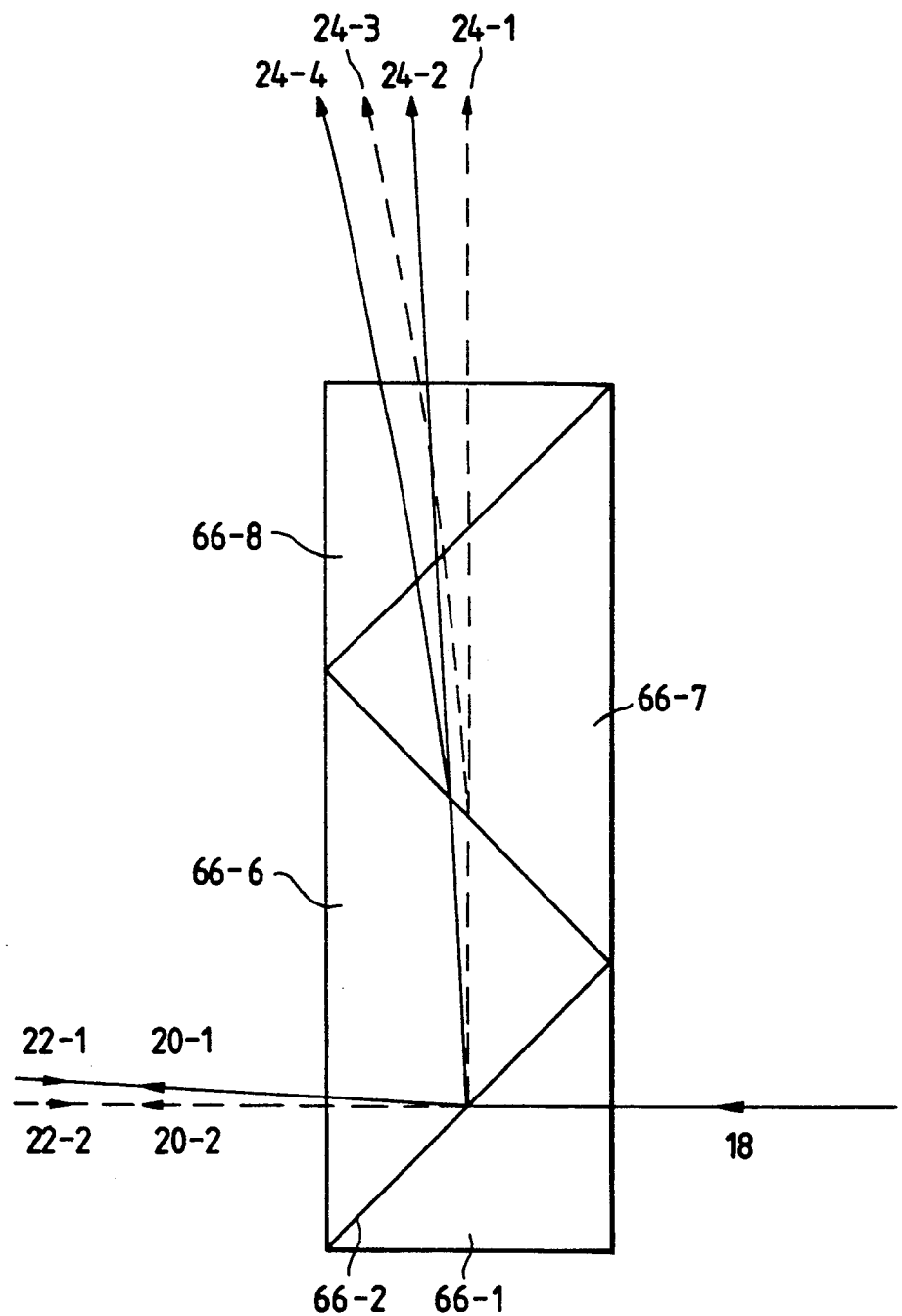
FIG. 33 is a diagram of still another embodiment of the magneto-optical disk apparatus using the optical system of the present invention shown in FIG. 23.

In FIG. 33, a uniaxial crystal right-angled prism 66-1 is the same as that in FIG. 33. Denoted by 66-6 is a glass right-angled prism. A light beam 18 from a semiconductor laser 2 (not shown) is separated into an overwrite beam 20-2 and a verification beam 20-1 after passing through the half mirror 66-2. Reflected beams 22-1 and 22-2 from a magneto-optical disk 1 enter the glass right-angled prism 66-6 again and, after being reflected by the half mirror 66-2, further enter a uniaxial crystal right-angled prism 66-7. The optical axis of 66-7 is, like 66-4 in FIG. 25, set inclined 45° from the P-axis in the plane substantially perpendicular to the reflected beams 22-1 and 22-2.

Separation of the overwrite beam 22-2 and the verification beam 22-1 will be explained below. Let it be assumed, as with the embodiment of FIG. 25, that quartz is selected as the uniaxial crystal, glass (e.g., BaFl) meeting $n_g \simeq n_e$ is selected as the vitreous material of the glass prism 66-6 for simplicity, and the semiconductor laser emits the beam of wavelength $\lambda = 790$ nm.

An amplitude component $u_e^{\pm}$ of the overwrite beam projected to the e-axis in 66-7 behaves following the Snell's law below on assumptions that the incident angle upon the joined surface between 66-6 and 66-7 is $\theta_{21}$ and the emergent angle therefrom is $\theta_{31}$:

$$\theta_{21} = 90° - \theta_{11} \tag{26}$$
$$n_e \sin\theta_{31} = n_g \sin\theta_{21}$$

$$\theta_{31} = \sin^{-1}\left(\frac{n_g \cos\theta_{11}}{n_e}\right) \approx 45°$$

An amplitude component $u_o^{\pm}$ of the overwrite beam projected to the o-axis in 66-7 behaves following the Snell's law below on assumptions that the incident angle upon the joined surface between 66-6 and 66-7 is $\theta_{22}$ and the emergent angle therefrom is $\theta_{32}$:

$$\theta_{22} = 90° - \theta_{11} \tag{27}$$

$$n_o \sin\theta_{32} = n_g \sin\theta_{22}$$

$$\theta_{32} = \sin^{-1}\left(\frac{n_g \cos\theta_{11}}{n_o}\right) \approx \sin^{-1}\left(\frac{n_e \cos 45°}{n_o}\right)$$

An amplitude component $u_e^{\pm'}$ of the verification beam projected to the e-axis in 66-7 behaves following the Snell's law below on assumptions that the incident angle upon the joined surface between 66-6 and 66-7 is $\theta_{23}$ and the emergent angle therefrom is $\theta_{33}$:

$$\theta_{23} = 90° - \theta_{12} \tag{28}$$

$$n_e \sin\theta_{33} = n_g \sin\theta_{23}$$

$$\theta_{33} = \sin^{-1}\left(\frac{n_g \sin(90° - \theta_{12})}{n_e}\right) \approx 90° - \theta_{12}$$

An amplitude component $u_o^{\pm\prime}$ of the verification beam projected to the o-axis in 66-7 behaves following the Snell's law below on assumptions that the incident angle upon the joined surface between 66-6 and 66-7 is $\theta_{24}$ and the emergent angle therefrom is $\theta_{34}$:

$$\theta_{24} = 90° - \theta_{12} \tag{29}$$

$$n_o \sin\theta_{34} = n_g \sin\theta_{24}$$

$$\theta_{34} = \sin^{-1}\left(\frac{n_g \cos\theta_{12}}{n_o}\right)$$

Furthermore, the glass right-angled prism 66-8 is joined to the uniaxial crystal right-angled prism 66-7. Beam refraction at the joined surface between 66-7 and 66-8 will be explained below.

An amplitude component $u_e^{\pm}$ of the overwrite beam projected to the e-axis in 66-7 behaves following the Snell's law below on assumptions that the incident angle upon the joined surface between 66-7 and 66-8 is $\theta_{41}$ and the emergent angle therefrom is $\theta_{51}$, and then exits as a beam 24-1 from 66-8:

$$\theta_{41} = 90° - \theta_{31} \tag{30}$$

$$n_g \sin\theta_{51} = n_e \sin\theta_{41}$$

$$\theta_{51} = \sin^{-1}\left(\frac{n_e \cos\theta_{31}}{n_g}\right) \approx 45°$$

An amplitude component $u_o^{\pm}$ of the overwrite beam projected to the o-axis in 66-7 behaves following the Snell's law below on assumptions that the incident angle upon the joined surface between 66-7 and 66-8 is $\theta_{42}$ and the emergent angle therefrom is $\theta_{52}$, and then exits as a beam 24-2 from 66-8:

$$\theta_{42} = 90° - \theta_{32} \tag{31}$$

$$n_g \sin\theta_{52} = n_o \sin\theta_{42}$$

$$\theta_{52} = \sin^{-1}\left(\frac{n_o \cos\theta_{32}}{n_g}\right)$$

An amplitude component $u_e^{\pm\prime}$ of the verification beam projected to the e-axis in 66-7 behaves following the Snell's law below on assumptions that the incident angle upon the joined surface between 66-7 and 66-8 is $\theta_{43}$ and the emergent angle therefrom is $\theta_{53}$, and then exits as a beam 24-3 from 66-8:

$$\theta_{43} = 90° - \theta_{33} \tag{32}$$

$$n_g \sin\theta_{53} = n_e \sin\theta_{43}$$

$$\theta_{53} = \sin^{-1}\left(\frac{n_e \sin(90° - \theta_{33})}{n_g}\right)$$

$$\approx 90° - \theta_{33} \approx \theta_{12}$$

An amplitude component $u_o^{\pm}$, of the verification beam projected to the o-axis in 66-7 behaves following the Snell's law below on assumptions that the incident angle upon the joined surface between 66-7 and 66-8 is $\theta_{44}$ and the emergent angle therefrom is $\theta_{54}$, and then exits as a beam 24-4 from 66-8:

$$\theta_{44} = 90° - \theta_{34} \tag{33}$$

$$n_g \sin\theta_{54} = n_o \sin\theta_{44}$$

$$\theta_{54} = \sin^{-1}\left(\frac{n_o \cos\theta_{34}}{n_g}\right)$$

As will be apparent from Equations (30) to (33), 22-1 and 22-2 are exited as the four beams 24-1 to 24-4 from 66-8.

Assuming that $n_e$ is 1.54749, $n_o$ is 1.53859, and $n_g \approx n_e$ holds, the emergent angles are given by:

$$\theta_{51} = 45.000°$$

$$\theta_{52} = 44.343°$$

$$\theta_{53} = 44.671°$$

$$\theta_{54} = 44.014°$$

A resulting separation angle between the adjacent two beams is 0.33° in the glass prism 16-8 and 0.51° in air. The magneto-optical signal can be detected in a like manner to that mentioned before by referring to FIGS. 29 and 30.

In the optical head for the magneto-optical recording/reproducing apparatus according to this aspect of the present invention, as described above, a light beam emitted from a single semiconductor laser beam source enters a first end face of a first prism made of a uniaxial crystal, partially passes through a second end face of the first prism, enters a second substantially right-angled prism made of glass from a first end face thereof which is joined to the second end face of the first prism, and then exits from the second end face of the second substantially right-angled prism for separation into first and second light beams having their polarized directions orthogonal to each other; the first prism made of the uniaxial crystal has an optical axis lying in a plane perpendicular to a propagating direction of the light beam emitted from the semiconductor laser beam source, the light beam emitted from the semiconductor laser beam source having its polarized direction inclined at a predetermined angle from the optical axis of the uniaxial crystal; the first and second light beams exiting from the second substantially right-angled prism made of glass are focused by an object lens, as small first and second light spots spaced in a track moving direction, on the same track of a magneto-optical recording medium, the first and second light spots having their polarized directions almost parallel or perpendicular to the track; first and second reflected light beams from the magneto-optical recording medium enter the second substantially right-angled prism made of glass from the second end face thereof, are partially reflected by the first end face thereof, and exit from a third end face thereof; first and second reflected light beams exiting from the third end face of the second substantially right-angled prism made of glass enter a composite member consisting of third and fourth substantially right-angled prisms both made of uniaxial crystal and joined to each other, so that the two reflected light beams are each separated into two emergent light beams having their polarized directions orthogonal to each other, i.e., so that the first reflected light beam is separated into first and second emergent light beams and the second reflected light beam is separated into third and fourth emergent light beams; and the third substantially right-angled prism made of the uniaxial crystal has an optical axis inclined 45° with respect to the polarized directions of the first and second reflected light beams exiting from the third end face of the second substantially right-angled prism made of glass, the fourth substantially right-angled prism made of the uniaxial crystal having an optical axis orthogonal to the optical axis of the third substantially right-angled prism.

With the magneto-optical recording/reproducing apparatus using the optical system of the present invention to simultaneously permit an overwrite and a verification immediately after recording by a single laser beam source, as explained above, the light beam from the semiconductor laser can be effectively allocated to an overwrite beam and a verification beam at a predetermined ratio, making it possible to employ a semiconductor laser of low output power and a collimator lens of low N.A.

Furthermore, the spots focused from two beams can be simply arranged on the same track. The light amount ratio of one spot to the other and the spacing therebetween also can be simply kept constant. In addition, the optical system for detecting a magneto-optical signal is simplified, which leads to a reduction in the production cost.

What is claimed is:

1. An optical head for a magneto-optical recording-/reproducing apparatus comprising:
   a semiconductor laser,
   ah object lens for condensing a light beam from said semiconductor laser onto a magneto-optical recording medium,
   an optical element disposed in an optical path from said semiconductor laser to said object lens, said optical element comprising three substantially right-angled prisms and being arranged such that the light beam emitted from said semiconductor laser enters a first end face of a first substantially right-angled prism made of a uniaxial crystal and part of the light beam is reflected by a second end face of said first substantially right-angled prism to exit from a third end face substantially perpendicular to the first end face for separation into first and second light beams having their polarized directions orthogonal to each other, the uniaxial crystal of said first substantially right-angled prism having an optical axis substantially coincident with a propagating direction of the reflected light beam from the second end face, the light beam emitted from said semiconductor laser having its polarized direction inclined at a predetermined angle from said optical axis of the uniaxial crystal; the first and second light beams exiting from said first substantially right-angled prism are focused by said object lens as small first and second light spots on said magneto-optical recording medium; first and second reflected light beams from said magneto-optical recording medium enter said first substantially right-angled prism from the third end face thereof, partially pass through the second end face thereof to enter a second substantially right-angled prism made of a uniaxial crystal from a first end face thereof which is joined to the second end face of said first substantially right-angled prism, emit from a second end face of said second substantially right-angled prism substantially perpendicular to the first end face thereof, enter a third substantially right-angled prism made of glass from a first end face thereof which is joined to the second end face of said second substantially right-angled prism, and then exit from a second end face of said third substantially right-angled prism substantially perpendicularly, so that the two reflected light beams are each separated into two emergent light beams having their polarized directions orthogonal to each other, so that the first reflected light beam is separated into first and second emergent light beams and the second reflected light beam is separated into third and fourth emergent light beams; and said second substantially right-angled prism has an optical axis inclined 45° with respect to the polarized directions of the first and second light beams exiting from the third end face of said first substantially right-angled prism, and
   light detectors for detecting the first, second, third and fourth emergent beams from said third substantially right-angled prism.

2. An optical head for a magneto-optical recording-/reproducing apparatus according to claim 1, wherein when said semiconductor laser is operated to emit the laser beam at high power, said first light spot is used for recording a magneto-optical signal and said second light spot is used for reproducing recorded information.

3. An optical head for a magneto-optical recording-/reproducing apparatus according to claim 2, wherein a central intensity of said first light spot is greater than a central intensity of said second light spot.

4. An optical head for a magneto-optical recording-/reproducing apparatus according to claim 2, wherein the reproduction of the recorded information using said second light spot is performed based on a differential output of said light detectors for detecting said third and fourth emergent light beams from said third prism.

5. An optical head for a magneto-optical recording-/reproducing apparatus according to claim 1, wherein when said semiconductor laser is operated to emit the laser beam at low power, the reproduction of the recorded information is performed based on a differential output of said light detectors for detecting said first and second emergent light beams from said third prism.

6. An optical head for a magneto-optical recording-/reproducing apparatus according to claim 1, wherein a half mirror meeting $R_p = R_s = 50\%$, where $R_p$ is a refractive index for P-polarized light and $R_s$ is a refractive index for S-polarized light, is provided at the joined surface between the second end face of said first substantially right-angled prism made of the uniaxial crystal and the first end face of said second substantially right-angled prism made of the uniaxial crystal.

7. An optical head for a magneto-optical recording-/reproducing apparatus according to claim 1, wherein a non-polarizing beam splitter meeting $R_p = R_s$, where $R_p$ is a refractive index for P-polarized light and $R_2$ is a refractive index for S-polarized light, is provided at the joined surface between the second end face of said first substantially right-angled prism made of the uniaxial crystal and the first end face of said second substantially right-angled prism made of the uniaxial crystal.

8. An optical head for a magneto-optical recording-/reproducing apparatus according to claim 1, wherein a polarizing beam splitter $R_p \ne R_s$, where $r_p$ is a refractive index for P-polarized light and $R_s$ is a refractive index for S-polarized light, is provided at the joined surface between the second end face of said first substantially right-angled prism made of the uniaxial crystal and the first end face of said second substantially right-angled prism made of the uniaxial crystal.

9. An optical head for a magneto-optical recording-/reproducing apparatus according to claim 1, wherein a beam shaping prism for enlarging a narrower spread angle of the light beam from said semiconductor laser, the direction of which is coincident with the polarized direction of one of said first and second beams, is disposed between said first substantially right-angled prism made of the uniaxial crystal and said object lens.

10. An optical head for a magneto-optical recording-/reproducing apparatus comprising:
    a semiconductor laser,
    an object lens for condensing a light beam from said semiconductor laser onto a magneto-optical recording medium,
    an optical element disposed in an optical path from said semiconductor laser to said object lens, said optical element comprising three substantially right-angled prisms and being arranged such that the light beam emitted from said semiconductor laser enters a first end face of a first substantially right-angled prism made of a uniaxial crystal and part of the light beam is reflected by a second end face of said first substantially right-angled prism to exit from a third end face substantially perpendicular to the first end face for separation into first and second light beams having their polarized directions orthogonal to each other, the uniaxial crystal of said first substantially right-angled prism having an optical axis substantially coincident with a propagating direction of the reflected light beam from the second end face, the light beam emitted from said semiconductor laser having its polarized direction inclined at predetermined angle from said optical axis of the uniaxial crystal; the first and second light beams exiting from said first substantially right-angled prism are focused by said object lens as small first and second light spots on said magneto-optical recording medium; first and second reflected light beams from said magneto-optical recording medium enter said first substantially right-angled prism from the third end face thereof, partially pass through the second end face thereof to enter a second substantially right-angled prism made of a uniaxial crystal from a first end face thereof which is joined to the second end face of said first substantially right-angled prism, emit from a second end face of said second substantially right-angled prism perpendicular to the first end face thereof, enter a third substantially right-angled prism made of a uniaxial crystal from a first end face thereof which is joined to the second end face of said second substantially right-angled prism, and then exit from a second end face of said third substantially right-angled prism substantially perpendicularly, so that the two reflected light beams are each separated into two emergent light beams having their polarized directions orthogonal to each other, so that the first reflected light beam is separated into first and second emergent light beams and the second reflected light beams is separated into third and fourth emergent light beams; and said second substantially right-angled prism has an optical axis inclined 45° with respect to the polarized directions of the first and second light beams exiting from the third end face of said first substantially right-angled prism, said third substantially right-angled prism having an optical axis orthogonal to the optical axis of said second substantially right-angled prism, and
    light detectors for detecting the first, second, third and fourth emergent beams from said third substantially right-angled prism.

11. An optical head for a magneto-optical recording-/reproducing apparatus according to claim 10, wherein when said semiconductor laser is operated to emit the laser beam at high power, said first light spot is used for recording a magneto-optical signal and said second light spot is sued for reproducing recorded information.

12. An optical head for a magneto-optical recording-/reproducing apparatus according to claim 10, wherein a central intensity of said first light spot is greater than a central intensity of said second light spot.

13. An optical head for a magneto-optical recording-/reproducing apparatus according to claim 11, wherein the reproduction of the recorded information using said second light spot is performed based on a differential output of said light detectors for detecting said third and fourth emergent light beams from said third prism.

14. An optical head for a magneto-optical recording-/reproducing apparatus according to claim 10, wherein when said semiconductor laser is operated to emit the laser beam at low power, the reproduction of the recorded information is performed based on a differential output of said light detectors for detecting said first and second emergent light beams from said third prism.

15. An optical head for a magneto-optical recording-/reproducing apparatus according to claim 10, wherein a half mirror meeting $R_p = R_s = 50\%$, where $R_p$ is a refractive index for P-polarized light and $R_s$ is a refractive index for S-polarized light, is provided at the joined surface between the second end face of said first substantially right-angled prism made of the uniaxial crystal and the first end face of said second substantially right-angled prism made of the uniaxial crystal.

16. An optical head for a magneto-optical recording-/reproducing apparatus according to claim 10, wherein a non-polarizing beam splitter meeting $R_p = R_s$, where $R_p$ is a refractive index for P-polarized light and R is a refractive index for S-polarized light, is provided at the joined surface between the second end face of said first substantially right-angled prism made of the uniaxial crystal and the first end face of said second substantially right-angled prism made of the uniaxial crystal.

17. An optical head for a magneto-optical recording-/reproducing apparatus according to claim 10, wherein a polarizing beam splitter meeting $r_p \ne R_s$, where $R_p$ is a refractive index for P-polarized light and $R_s$ is a refractive index for S-polarized light, is provided at the joined surface between the second end face of said first substantially right-angled prism made of the uniaxial crystal and the first end face of said second substantially right-angled prism made of the uniaxial crystal.

18. An optical head for a magneto-optical recording-/reproducing apparatus according to claim 10, wherein a beam shaping prism for enlarging a narrower spread angle of the light beam from said semiconductor laser, the direction of which is coincident with the polarized direction of one of said first and second beams, is disposed between said first substantially right-angled prism made of the uniaxial crystal and said object lens.

19. An optical head for a magneto-optical recording-/reproducing apparatus comprising:
a semiconductor laser,
an object lens for condensing a light beam from said semiconductor laser onto a magneto-optical recording medium,
an optical element disposed in an optical path from said semiconductor laser to said object lens, said optical element comprising four substantially right-angled prisms and being arranged such that the light beam emitted from said semiconductor laser enters a first end face of a first prism made of a uniaxial crystal, partially passes through a second end face of said first prism, enters a second substantially right-angled prism made of glass from a first end face thereof which is joined to the second end face of said first prism, and then exits from the second end face of said second substantially right-angled prism for separation into first and second light beams having their polarized directions orthogonal to each other; said first prism made of the uniaxial crystal has an optical axis lying in a plane perpendicular to a propagating direction of the light beam emitted from said semiconductor laser, the light beam emitted from said semiconductor laser having its polarized direction inclined at a predetermined angle from said optical axis of the uniaxial crystal; the first and second light beams exiting from said second substantially right-angled prism made of glass are focused by an object lens as small first and second light spots on a magneto-optical recording medium, the first and second light spots having their polarized directions almost parallel or perpendicular to a track of said recording medium; first and second reflected light beams from the magneto-optical recording medium enter the second substantially right-angled prism made of glass from the second end face thereof, are partially reflected by the first end face thereof, and exit from a third end face thereof; first and second reflected light beams exiting from the third end face of said second substantially right-angled prism made of glass enter a composite member comprising third and fourth substantially right-angled prisms both made of a uniaxial crystal and joined to each other, so that the two reflected light beams are each separated into two emergent light beams having their polarized directions orthogonal to each other, so that the first reflected light beam is separated into first and second emergent light beams and the second reflected light beam is separated into third and fourth emergent light beams; and said third substantially right-angled prism made of the uniaxial crystal has an optical axis inclined 45° with respect to the polarized directions of the first and second reflected light beams exiting from the third end face of said second substantially right-angled prism made of glass, said fourth substantially right-angled prism made of the uniaxial crystal having an optical axis orthogonal to the optical axis of said third substantially right-angled prism, and
light detectors for detecting the first, second, third and fourth emergent beams from said fourth substantially right-angled prism.

20. An optical head for a magneto-optical recording-/reproducing apparatus according to claim 19, wherein when said semiconductor laser is operated to emit the laser beam at high power, said first light spot is used for recording a magneto-optical signal and said second light spot is used for reproducing recorded information.

21. An optical head for a magneto-optical recording-/reproducing apparatus according to claim 20, wherein a central intensity of said first light spot is greater than a central intensity of said second light spot.

22. An optical head for a magneto-optical recording-/reproducing apparatus according to claim 20, wherein the reproduction of the recorded information using said second light spot is performed based on a differential output of said light detectors for detecting said third and fourth emergent light beams from said fourth prism.

23. An optical head for a magneto-optical recording-/reproducing apparatus according to claim 19, wherein when said semiconductor laser is operated to emit the laser beam at low power, the reproduction of the recorded information is performed based on a differential output of said light detectors for detecting said first and second emergent light beams from said fourth prism.

24. An optical head for a magneto-optical recording-/reproducing apparatus according to claim 19, wherein a half mirror meeting $R_p=R_2=50\%$, where $R_p$ is a refractive index for P-polarized light and $R_s$ is a refractive index for S-polarized light, is provided at the joined surface between the second end face of said first substantially right-angled prism made f the uniaxial crystal and the first end face of said second substantially right-angled prism made of the uniaxial crystal.

25. An optical head for a magneto-optical recording-/reproducing apparatus according to claim 19, wherein a non-polarizing beam splitter meeting $R_p=R_s$, where $R_p$ is a refractive index for P-polarized light and $R_s$ is a refractive index for S-polarized light, is provided at the joined surface between the second end face of said first substantially right-angled prism made of the uniaxial crystal and the first end face of said second substantially right-angled prism made of the uniaxial crystal.

26. An optical head for a magneto-optical recording-/reproducing apparatus according to claim 19, wherein a polarizing beam splitter meeting $R_p \neq R_s$, where $R_p$ is a refractive index for P-polarized light and $R_s$ is a refractive index for S-polarized light, is provided at the joined surface between the second end face of said first substantially right-angled prism made of the uniaxial crystal and the first end face of said second substantially right-angled prism made of the uniaxial crystal.

27. An optical head for a magneto-optical recording-/reproducing apparatus according to claim 19, wherein a beam shaping prism for enlarging a narrower spread angle of the light beam from said semiconductor laser, the direction of which is coincident with the polarized direction of one of said first and second beams, is disposed between said first substantially right-angled prism made of the uniaxial crystal and said object lens.

28. An optical head for a magneto-optical recording-/reproducing apparatus comprising:
a semiconductor laser;

an object lens for condensing a light beam from said semiconductor laser onto a magneto-optical recording medium;

an optical element disposed in an optical path from said semiconductor laser to said object lens, said optical element comprising three prisms and being arranged such that the light beam emitted from said semiconductor laser enters a first end face f a first prism made of a uniaxial crystal and part of the light beam is reflected by a second end face of said first prism to exit from a third end face for separation into first and second light beams having their polarized directions orthogonal to each other, the uniaxial crystal of said first prism having an optical axis substantially coincident with a propagating direction of the reflected light beam from the second end face, the light beam emitted from said semiconductor laser having its polarized direction inclined at a predetermined angle from said optical axis of the uniaxial crystal, the first and second light beams existing from said first prism are focused by said object lens as small first and second light spots on said magneto-optical recording medium, first and second reflected light beams from said magneto-optical recording medium enter said first prism from the third end face thereof, partially pass through the second end face thereof to enter a second prism made of a uniaxial crystal from a first end face thereof which is joined to the second end face of said first prism, emit from a second end face of said second prism, enter a third prism made of glass from a first end face thereof which is joined to the second end face of said second prism, and then exit from a second end face of said third prism, so that the two emergent light beams having their polarized directions orthogonal to each other, so that the first reflected light beam is separated into first and second emergent light beams and the second reflected light beam is separated into third and fourth emergent light beams and said second prism has an optical axis inclined 45° with respect to the polarized directions of the first and second light beams exiting from the third end face of said first prism; and light detectors for detecting the first, second, third and fourth emergent beams from said third prism.

29. An optical head for a magneto-optical recording-/reproducing apparatus according to claim 28, wherein when said semiconductor laser is operated to emit the laser beam at high power, said first light spot is used for recording a magneto-optical signal and said second light spot is used for reproducing recorded information.

30. An optical head for a magneto-optical recording-/reproducing apparatus according to claim 29, wherein a central intensity of said first light spot is greater than a central intensity of said second light spot.

31. An optical head for a magneto-optical recording-/reproducing apparatus according to claim 29, wherein the reproduction of the recorded information using said second light spot is performed based on a differential output of said light detectors for detecting said third and fourth emergent light beams from said third prism.

32. An optical head for a magneto-optical recording-/reproducing apparatus according to claim 28, wherein when said semiconductor laser is operated to emit the laser beam at low power and the reproduction of the recorded information is performed based on a differential output of said light detectors for detecting said first and second emergent light beams from said third prism.

33. An optical head for a magneto-optical recording-/reproducing apparatus according to claim 28, wherein a half mirror meeting $R_p = R_s = 50\%$, where $R_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

34. An optical head for a magneto-optical recording-/reproducing apparatus according to claim 28, wherein a non-polarizing beam splitter meeting $R_p = R_s$, where $R_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

35. An optical head for a magneto-optical recording-/reproducing apparatus according to claim 28, wherein a polarizing beam splitter meeting $R_p = R_s$, where $R_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

36. An optical head for a magneto-optical recording-/reproducing apparatus according to claim 28, wherein a beam shaping prism for enlarging a narrower spread angle of the light beam from said semiconductor laser, the direction of which is coincident with the polarized between said first prism made of the uniaxial crystal and said object lens.

37. An optical head for a magneto-optical recording-/reproducing apparatus comprising:

a semiconductor laser;

an object lens for condensing a light beam from said semiconductor laser onto a magneto-optical recording medium;

an optical element disposed in an optical path from said semiconductor laser to said object lens, said optical element comprising three prisms and being arranged such that the light beam emitted from said semiconductor laser enters a first end face of a first prism made of a uniaxial crystal and part of the light beam is reflected by a second end face of said first prism to exit from a third end face for separation into first and second light beams having their polarized directions orthogonal to each other, the uniaxial crystal of said first prism having an optical axis substantially coincident with a propagating direction of the reflected light beam from the second end face, the light beam emitted from said semiconductor laser having its polarized direction inclined at a predetermined angle from said optical axis of the uniaxial crystal, the first and second light beams exiting from said first prism are focused by said object lens as small first and second light spots on said magneto-optical recording medium, first and second reflected light beams from said magneto-optical recording medium enter said first prism from the third end face thereof, partially pass through the second end face thereof to enter a second prism made of a uniaxial crystal from a first end face thereof which is joined to the second end face of said first prism, emit from a second end face of said second prism, enter a third prism made of a uniaxial crystal from a first end face thereof which is joined to the second end face of said second prism, and then exit from a second end face of said third prism, so that the two reflected light beams are each separated into two emergent light beams having their polarized directions orthogonal to each other, so that the first reflected light beam is separated into first and second emergent light beams and the second reflected light beam is separated into third and fourth emergent light beams and said second prism has an optical axis inclined 45° with respect to the polarized directions of the first and second light beams exiting from the third end face of said first prism, said third prism having an optical axis orthogonal to the optical axis of said second prism; and light detectors for detecting the first, second, third and fourth emergent beams from said third prism.

38. An optical head for a magneto-optical recording-/reproducing apparatus according to claim 37, wherein when said semiconductor laser is operated to emit the laser beam at high power, said first light spot is used for recording a magneto-optical signal and said second light spot is sued for reproducing recorded information.

39. An optical head for a magneto-optical recording-/reproducing apparatus according to claim 37, wherein a central intensity of said first light spot is greater than a central intensity of said second light spot.

40. An optical head for a magneto-optical recording-/reproducing apparatus according to claim 38, wherein the reproduction of the recorded information using said second light spot is performed based on a differential output of said light detectors for detecting said third and fourth emergent light beams from said third prism.

41. An optical head for a magneto-optical recording-/reproducing apparatus according to claim 37, wherein when said semiconductor laser is operated to emit the laser beam at low power and the reproduction of the recorded information is performed based on a differential output of said light detectors for detecting said first and second emergent light beams from said third beams.

42. An optical head for a magneto-optical recording-/reproducing apparatus according to claim 37, wherein a half mirror meeting $R_p = R_s = 50\%$, wherein $R_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

43. An optical head for a magneto-optical recording-/reproducing apparatus according to claim 37, wherein a non-polarizing beam splitter meeting $R_p = R_s$, where $R_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

44. An optical head for a magneto-optical recording-/reproducing apparatus according to claim 37, wherein a polarizing beam splitter meeting $R_p \neq R_s$, where $R_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

45. An optical head for a magneto-optical recording-/reproducing apparatus according to claim 37, wherein a beam shaping prism for enlarging a narrower spread angle o the light beam from said semiconductor laser, the direction of which is coincident with the polarized direction of one of said first and second beams, is disposed between said first prism made of the uniaxial crystal and said object lens.

46. An optical head for a magneto-optical recording-/reproducing apparatus comprising:

a semiconductor laser;

an object lens for condensing a light beam from said semiconductor laser onto a magneto-optical recording medium;

an optical element disposed in an optical path from said semiconductor laser to said object lens, said optical element comprising four prisms and being arranged such that the light beam emitted from semiconductor laser enters a first end face of a first prism made of a uniaxial crystal, partially passes through a second end face of said first prism, enters through a second end face of said first face thereof which is joined to the second end face of said first prism, and then exits from the second end face of said second prism for separation into first and second light beam having their polarized directions orthogonal to each other, said first prism made of the uniaxial crystal has an optical axis lying in a plane perpendicular to a propagating direction of the light beam emitted from said semiconductor laser, the light beam emitted from said semiconductor laser having its polarized direction inclined at a predetermined angle from said optical axis of the uniaxial crystal, the first and second light beams exiting from said second prism made of glass are focused by an object lens as small first and second light spots on said magneto-optical recording medium, the first and second light spots having their polarized directions being one of substantially parallel and perpendicular to a track of said recording medium, first and second reflected light beams from said magneto-optical recording medium enter the second prism made of glass from the second end face thereof, and exit from a third end face thereof, first and second reflected light beams exiting from the third end face of said second prism made of glass enter a composite member comprising third and fourth prisms both made of a uniaxial crystal and joined to each other, so that the two reflected light beams are each separated into two emergent light beams having their polarized directions orthogonal to each other, so that the first reflected light beam is separated into first and second emergent light beams and the second reflected light beam is separated into third and fourth emergent light beams and said third prism made of the uniaxial crystal has an optical axis inclined 45° with respect to the polarized directions of the first and second reflected light beams exiting from the third end face of said second prism made of glass, said fourth prism made of the uniaxial crystal having an optical axis orthogonal to the optical axis of said third prism; and light detectors for detecting the first, second, third and fourth emergent beams from said fourth prism.

47. An optical head for a magneto-optical recording-/reproducing apparatus according to claim 46, wherein when said semiconductor laser is operated to emit the laser beam at high power, said first light spot is used for recording a magneto-optical signal and said second light spot is used for reproducing recorded information.

48. An optical head for a magneto-optical recording-/reproducing apparatus according to claim 47, wherein a central intensity of said first light spot is greater than a central intensity of said second light spot.

49. An optical head for a magneto-optical recording-/reproducing apparatus according to claim 47, wherein the reproduction of the recorded information using said second light spot is performed based on a differential output of said light detectors for detecting said third and fourth emergent light beams from said fourth prism.

50. An optical head for a magneto-optical recording-/reproducing apparatus according to claim 46, wherein when said semiconductor laser is operated to emit the laser beam at low power and the reproduction of the recorded information is performed based on a differential output of said light detectors for detecting said first and second emergent light beams from said fourth prism.

51. An optical head for a magneto-optical recording-/reproducing apparatus according to claim 46, wherein a half mirror meeting $R_p = R_s = 50\%$, where $R_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

52. An optical head for a magneto-optical recording-/reproducing apparatus according to claim 46, wherein a non-polarizing beam splitter meeting $R_p = R_s$, where $R_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

53. An optical head for a magneto-optical recording-/reproducing apparatus according to claim 46, wherein a polarizing beam splitter meeting $R_p \neq R_s$, where $r_p$ is a refractive index for P-polarized light and $R_s$ is a refractive index for S-polarized light, is provided at the joined surface between the second end face of said first prism made of the uniaxial crystal and the first end face of said second prism made of the uniaxial crystal.

54. An optical head for a magneto-head recording/reproducing apparatus according to claim 46, wherein a beam shaping prism for enlarging a narrower spread angle of the light beam from said semiconductor laser, the direction of which is coincident with the polarized direction of one of said first and second beams, is disposed between said first prism made of the uniaxial crystal and said object lens.

55. An optical head for producing light spots on a magneto-optical recording medium comprising:
a semiconductor laser;
an object lens for condensing a light beam from said semiconductor laser onto a magneto-optical recording medium; and
an optical element disposed in an optical path from said semiconductor laser to said object lens, said optical element being arranged such that the light beam emitted from said semiconductor laser enters a first end face of a first prism made of a uniaxial crystal and part of the light beam is reflected by a second end face of said first prism to exit from a third end face for separation into first and second light beams having their polarized directions orthogonal to each other, the uniaxial crystal of said first prism having an optical axis substantially coincident with a propagating direction of the reflected light beam from the second end face, the light beam emitted from said semiconductor laser having its polarized direction inclined at a predetermined angle from said optical axis of the uniaxial crystal, the first and second light beams exiting from said first prism being focused by said object lens as small first and second light spots on said magneto-optical recording medium.

56. An optical head for producing light spots on a magneto-optical recording medium according to claim 55, wherein a beam shaping prism for enlarging a narrower spread angle of the light beam from said semiconductor laser, the direction of which is coincident with the polarized direction of one of said first and second beams, is disposed between said first prism made of the uniaxial crystal and said object lens.

57. An optical head for producing light spots on a magneto-optical recording medium comprising:
a semiconductor laser;
an object lens for condensing a light beam from said semiconductor laser onto the magneto-optical recording medium; and
an optical element disposed in an optical path from said semiconductor laser to said object lens, said optical element comprising two prisms and being arranged such that the light beam emitted from said semiconductor laser enters a first end face of a first prism made of a uniaxial crystal, partially passes through a second end face of said first prism, enters a second prism made of glass from a first end face thereof which is joined to the second end face of said first prism, and then exits from the second end face of said second prism for separation into first and second light beams having their polarized directions orthogonal to each other, said first prism made of the uniaxial crystal having an optical axis lying in a plane perpendicular to a propagating direction of the light beam emitted from said semiconductor laser having its polarized direction inclined at a predetermined angle from said optical axis of the uniaxial crystal, the first and second light beams exiting from said second prism made of glass being focused by an object lens as small first and second light spots on a magneto-optical recording medium, the first and second light spots having their polarized directions being one of substantially parallel and perpendicular to a track of the recording medium.

58. An optical head for producing light spots on a magneto-optical recording medium according to claim 57, wherein a beam shaping prism for enlarging a narrower spread angle of the light beam from said semiconductor laser, the direction of which is coincident with the polarized direction of one of said first and second beams, is disposed between said first prism made of the uniaxial crystal and said object lens.

* * * * *

UNITED STATES PATENT AND TRADEMARK OFFICE
CERTIFICATE OF CORRECTION

PATENT NO. : 5,293,569
DATED : March 8, 1994
INVENTOR(S) : Osamu KOYAMA

It is certified that error appears in the above-indentified patent and that said Letters Patent is hereby corrected as shown below:

COLUMN 1:

Line 31, "and 2" should read --and 2.--.

COLUMN 2:

Line 42, "the detection" should read --the magneto-optical signal is detected by a differential detection--;
   Line 53, "recording/ erasing" should read --recording/erasing--; and
   Line 55, "has produced" should read --has been produced--.

COLUMN 8:

Line 45, "o" should read --$\alpha$--; and
   Line 52, "$Y_s$," should read --$\gamma_s$,--.

COLUMN 9:

Line 4, "$(\gamma_p^2 \neq \gamma_s^2)$" should read --$(\gamma_p^2 = \gamma_s^2)$--; and
   Line 27, "period:" should read --period.--.

COLUMN 10:

Line 7, ", that" should read --that--;
   Line 42, "no" should read --$n_o$--;
   Line 45, "component $u_o^\pm$" should read --component $u_o'$--.

UNITED STATES PATENT AND TRADEMARK OFFICE
CERTIFICATE OF CORRECTION

PATENT NO. : 5,293,569
DATED : March 8, 1994
INVENTOR(S) : Osamu KOYAMA

It is certified that error appears in the above-indentified patent and that said Letters Patent is hereby corrected as shown below:

COLUMN 11:

Line 30, "surface" should read --surface is $\theta_{31}$--.

COLUMN 12:

Line 39, "(24-1" should read --24-1--;
Line 44, "$I_3^{\pm}\{u_e^{\pm}\}^2=\frac{1}{2}(R+K)^2=\frac{1}{2}(R^2)$" should read --$I_3^{\pm}=\{u_e^{\pm}\}^2=\frac{1}{2}(R\pm K)^2=\frac{1}{2}(R^2)\pm RK$--;
Line 50 "$I_4^4$," should read --$I_4^{\pm}$--; and "(beams 24'and" should read --(beams 24-2 and--; and
Line 54, In equation (21), "$\frac{1}{2}(R\mp k)^2$" should read --$\frac{1}{2}(R\pm K)^2$--.

COLUMN 13:

Line 28, "$\gamma_2^2=0.5$)" should read --$\gamma_s^2=0.5$)--.

COLUMN 16:

Line 67, "constant" should read --constant.--.

COLUMN 17:

Line 9, "together" should read --together.--; and
Line 41, "the has" should read --the action of the refractive index for extraordinary rays has--.

UNITED STATES PATENT AND TRADEMARK OFFICE
CERTIFICATE OF CORRECTION

PATENT NO. : 5,293,569
DATED : March 8, 1994
INVENTOR(S) : Osamu KOYAMA

It is certified that error appears in the above-indentified patent and that said Letters Patent is hereby corrected as shown below:

COLUMN 18:

Line 1, "index $n_c$" should read --index $n_0$--; and
Line 66, "inclination o" should read --inclination $\alpha$--.

COLUMN 19:

Line 1, "$(\gamma_p^2 \neq \gamma_s^2)$" (first occurrence) should read --$\gamma_p^2 = \gamma_s^2)$--; and
Line 26 ""optical axis" should be deleted.

COLUMN 20:

Line 50, "$\pm\theta_l$" should read --$\pm\theta_k$--.

COLUMN 21:

Line 21, "$u_0^{35}$" should read --$u_0^\pm$--.

COLUMN 22:

Line 9, "the there-" should read --the above joined surface is $\theta_{34}$ and the emergent angle there- --;
Line 10, "844," should read --$\theta_{44}$,--;
Line 23, "index ne" should read --index $n_e$--;
Line 24, "index no" should read --index $n_0$--;
Line 54, "$r^2>>K^2$" should read $R^2>>K^2$;
Line 64, In equation (22), "$\{U_{o-e}^{\pm'}\}^2$" should read --$\{u_{c-o}^{\pm'}\}^2$-- and
Line 66, "$r^2>>K^2$" should read --$R^2>>K^2$--.

UNITED STATES PATENT AND TRADEMARK OFFICE
CERTIFICATE OF CORRECTION

PATENT NO. : 5,293,569
DATED : March 8, 1994
INVENTOR(S) : Osamu KOYAMA

It is certified that error appears in the above-indentified patent and that said Letters Patent is hereby corrected as shown below:

COLUMN 23:

Line 49, "spot $SP_3$" should read --spot $SP_1$--; and
Line 56, "20" should be deleted.

COLUMN 24:

Line 37, "4-2" should read --24-2--; and
Line 60, "Then," should read --¶Then,--.

COLUMN 26:

Line 36, "$u_{o-c}\pm$" should read --$u_{o-c}^{\pm}$--; and
Line 53, "above is" should read --above joined surface $\theta_{32}$ and the emergent angle therefrom is--.

COLUMN 27:

Line 22, "24-4" should read --24-4 from--;
Line 23, "Assuming" should read --¶Assuming--; and
Line 30, "$\theta_{41}$=44.343+" should read --$\theta_{41}$=44.343°--.

COLUMN 29:

Line 6, "crystal 66-I" should read --crystal 66-1--;
Line 11, "though" should read --thought--;
Line 31, "$\theta_0$:" should read --$\theta_0$:--;
Line 39, "angle θhd 12" should read --angle $\theta_{12}$--; and
Line 65, "angle $\theta_0$" should read --angle $\theta_0$--.

UNITED STATES PATENT AND TRADEMARK OFFICE
CERTIFICATE OF CORRECTION

PATENT NO. : 5,293,569
DATED : March 8, 1994
INVENTOR(S) : Osamu KOYAMA

It is certified that error appears in the above-indentified patent and that said Letters Patent is hereby corrected as shown below:

COLUMN 30:

Line 33, "O-polarized" should read --P-polarized--; and
Line 47, In equation (2'), "x-axis:" should read --o-axis:--.

COLUMN 31:

Line 53, "+o$_k$;" should read --+$\theta_k$--.

COLUMN 32:

In equation (13'), "$u_c^\pm=$" should read --$u_c^{\pm'}=$--.

COLUMN 34:

Line 2, "exit" should read --exits--;
Line 29, "$\theta_{44}=45.554°$" should read --$\theta_{44}=45.665°$--;
In equation (19), "$\{u_{o\text{-}c}^\pm\}^2=\frac{1}{2}(R\mp K^2$" should read --$\{u_{o\text{-}c}^\pm\}^2=\frac{1}{2}(R\mp K)^2$--;
In equation (20), "$\{u_{c\text{-}o}^{2\pm}\}^2$" should read --$\{u_{c\text{-}o}^\pm\}^2$--;
Line 50, "$I_4^{35}$" should read --$I_4^\pm$--;
In equation (21), "$\{u_{o\text{-}c}^{\pm'}\}^2$" should read --$\{u_{o\text{-}c}^{\pm'}\}^2$--; and
In equation (22), "$\{u_{c\text{-}o}^{\pm'}\}^2=\frac{1}{2}(R\pm K)^2$" should read --$\{u_{c\text{-}o}^{\pm'}\}^2=\frac{1}{2}(R\mp K)^2$--.

UNITED STATES PATENT AND TRADEMARK OFFICE
CERTIFICATE OF CORRECTION

PATENT NO. : 5,293,569
DATED : March 8, 1994
INVENTOR(S) : Osamu KOYAMA

It is certified that error appears in the above-indentified patent and that said Letters Patent is hereby corrected as shown below:

COLUMN 35:

Line 5, "disk" should read --disk.--; and
Line 47, "disk 1" should read --disk 1.--.

COLUMN 36:

Line 21, "beams 24-I" should read --beams 24-1--.

COLUMN 37:

Line 58, "disk I;" should read --disk 1;--.

COLUMN 39:

Line 2, "023" should read --$\theta_{23}$--; and
Line 12, "Am" should read --An--.

COLUMN 40:

Line 7, "component $u_o^{\pm}$," should read --component $u_o^{\pm'}$--.

COLUMN 41:

Line 44, "ah" should read --an--.

COLUMN 42:

Line 59, "$R_p=_{Rs}=50\%$," should read --$R_p=R_s=50\%$,--.

UNITED STATES PATENT AND TRADEMARK OFFICE
CERTIFICATE OF CORRECTION

PATENT NO. : 5,293,569
DATED : March 8, 1994
INVENTOR(S) : Osamu KOYAMA

It is certified that error appears in the above-indentified patent and that said Letters Patent is hereby corrected as shown below:

COLUMN 43:

Line 1, "$R_2$" should read --$R_s$--;
Line 9, "splitter" should read --splitter meeting-- and "$r_p$" should read --$R_p$--;
Line 48, "at" should read --at a--; and
Line 63, "prism" should read --prism substantially--.

COLUMN 44:

Line 7, "beams" should read --beam--;
Line 25, "sued" should read --used--;
Line 55, "R" should read --$R_s$--; and
Line 64, "$r_p$" should read --$R_p$--.

COLUMN 46:

Line 32, "$R_p=R_2=50\%$," should read --$R_p=R_s=50\%$,--; and
Line 36, "f the" should read --of the--.

COLUMN 47:

Line 8, "f a" should read --of a--; and
Line 35, "two emergent" should read --two reflected light beams are each separated into two emergent--.

UNITED STATES PATENT AND TRADEMARK OFFICE
CERTIFICATE OF CORRECTION

PATENT NO. : 5,293,569

DATED : March 8, 1994

INVENTOR(S) : Osamu KOYAMA

It is certified that error appears in the above-identified patent and that said Letters Patent is hereby corrected as shown below:

COLUMN 48:

Line 21, "$R_p=R_s,$" should read --$R_p \neq R_s,$--; and
    Line 31, "polarized" should read --polarized direction of one of said first and second beams, is disposed--.

COLUMN 49:

Line 23, "sued" should read --used--;
    Line 37, "power and" should read --power, the--;
    Line 40, "beams." should read --prism.--; and
    Line 68, "o the" should read --of the--.

COLUMN 50:

Line 14, "from" should read --from said--;
    Line 17, "enters" should read --enters a second prism made of glass from a first end--;
    Line 18, "through a second end face of said first" should be deleted; and
    Line 22, "beam" should read --beams--.

UNITED STATES PATENT AND TRADEMARK OFFICE
CERTIFICATE OF CORRECTION

PATENT NO. : 5,293,569

DATED : March 8, 1994

INVENTOR(S) : Osamu KOYAMA

It is certified that error appears in the above-identified patent and that said Letters Patent is hereby corrected as shown below:

COLUMN 51:

Line 39, "$r_p$" should read --$R_p$--.

Signed and Sealed this

First Day of November, 1994

Attest:

BRUCE LEHMAN

Attesting Officer

Commissioner of Patents and Trademarks